US012760803B2

(12) United States Patent
Johnson et al.

(10) Patent No.: US 12,760,803 B2
(45) Date of Patent: Oct. 13, 2026

(54) PRESSURE REGULATION VALVES

(71) Applicants: General Electric Company, Cincinnati, OH (US); GE AVIO S.R.L, Turin (IT)

(72) Inventors: Steven Douglas Johnson, Milford, OH (US); Grant Portune, Cincinnati, OH (US); Matthew Misch, Cincinnati, OH (US); David Justin Brady, Rockport, MA (US); Mirko Gernone, Noicattaro (IT)

(73) Assignees: General Electric Company, Evendale, OH (US); GE AVIO S.R.L., Turin (IT)

( * ) Notice: Subject to any disclaimer, the term of this patent is extended or adjusted under 35 U.S.C. 154(b) by 99 days.

(21) Appl. No.: 18/745,712

(22) Filed: Jun. 17, 2024

(65) Prior Publication Data

US 2025/0383024 A1 Dec. 18, 2025

(51) Int. Cl.

*F16K 11/07* (2006.01)
*F01D 11/20* (2006.01)
*F16K 31/122* (2006.01)
*G05D 16/10* (2006.01)

(52) U.S. Cl.

CPC .......... *F16K 11/0716* (2013.01); *F01D 11/20* (2013.01); *F16K 31/1223* (2013.01); *G05D 16/103* (2013.01)

(58) Field of Classification Search

CPC .............. G05D 16/103; F16K 31/1223; F16K 11/0716; F01D 11/20

See application file for complete search history.

(56) References Cited

U.S. PATENT DOCUMENTS

| | | | | |
|---|---|---|---|---|
| 3,294,106 | A | 12/1966 | Ludwig et al. | |
| 3,642,020 | A | 2/1972 | Payne | |
| 4,128,113 | A | 12/1978 | Hart | |
| 5,873,438 | A | 2/1999 | Osterberg et al. | |
| 6,196,252 | B1 | 3/2001 | Martin et al. | |
| 7,147,430 | B2 | 12/2006 | Wiggins et al. | |
| 7,159,605 | B2 | 1/2007 | Thrash, Jr. et al. | |
| 8,596,417 | B2 | 12/2013 | Barrett et al. | |
| 9,810,342 | B2 | 11/2017 | Tamba | |
| 10,007,276 | B2 | 6/2018 | Franzen | |
| 10,948,044 | B2 | 3/2021 | McCallister et al. | |
| 2017/0016555 | A1* | 1/2017 | Franconi | F16K 31/1225 |
| 2018/0348797 | A1* | 12/2018 | Kamiya | B60T 13/686 |
| 2019/0271407 | A1* | 9/2019 | Scopesi | F16K 31/1223 |
| 2023/0228342 | A1* | 7/2023 | Shimada | F16K 11/0716 251/63.5 |

* cited by examiner

*Primary Examiner* — Kelsey E Cary
(74) *Attorney, Agent, or Firm* — Hanley, Flight & Zimmerman, LLC

(57) ABSTRACT

Pressure regulation valves are disclosed. An example pressure regulation valve includes a valve housing, and a control body positioned in the valve housing. The control body is movable between a first position and a second position based on (a) a first pressure differential between a first variable-pressure location and a second variable-pressure location and (b) a second pressure differential between the second variable-pressure location and a control volume of the valve housing. The control body when in the first position fluidly couples the first variable-pressure location to the control volume. The control body when in the second position restricts fluid flow between the first variable-pressure location and the control volume.

19 Claims, 34 Drawing Sheets

PRESSURE REGULATION VALVES

FIELD OF THE DISCLOSURE

This disclosure relates generally to valves and, more particularly, to pressure regulation valves.

BACKGROUND

In some applications, such as the control and/or operation of a gas turbine engine, it may be desirable to maintain a constant and/or near constant pressure ratio between two or more locations. For instance, one or more components of a gas turbine engine may operate based on pressure of fluid in and/or around the component(s). Commonly, pressure control devices such as pressure regulating valves, pressure relief valves, and/or shuttle valves can be used to regulate the pressure of the fluid.

Figure 1:
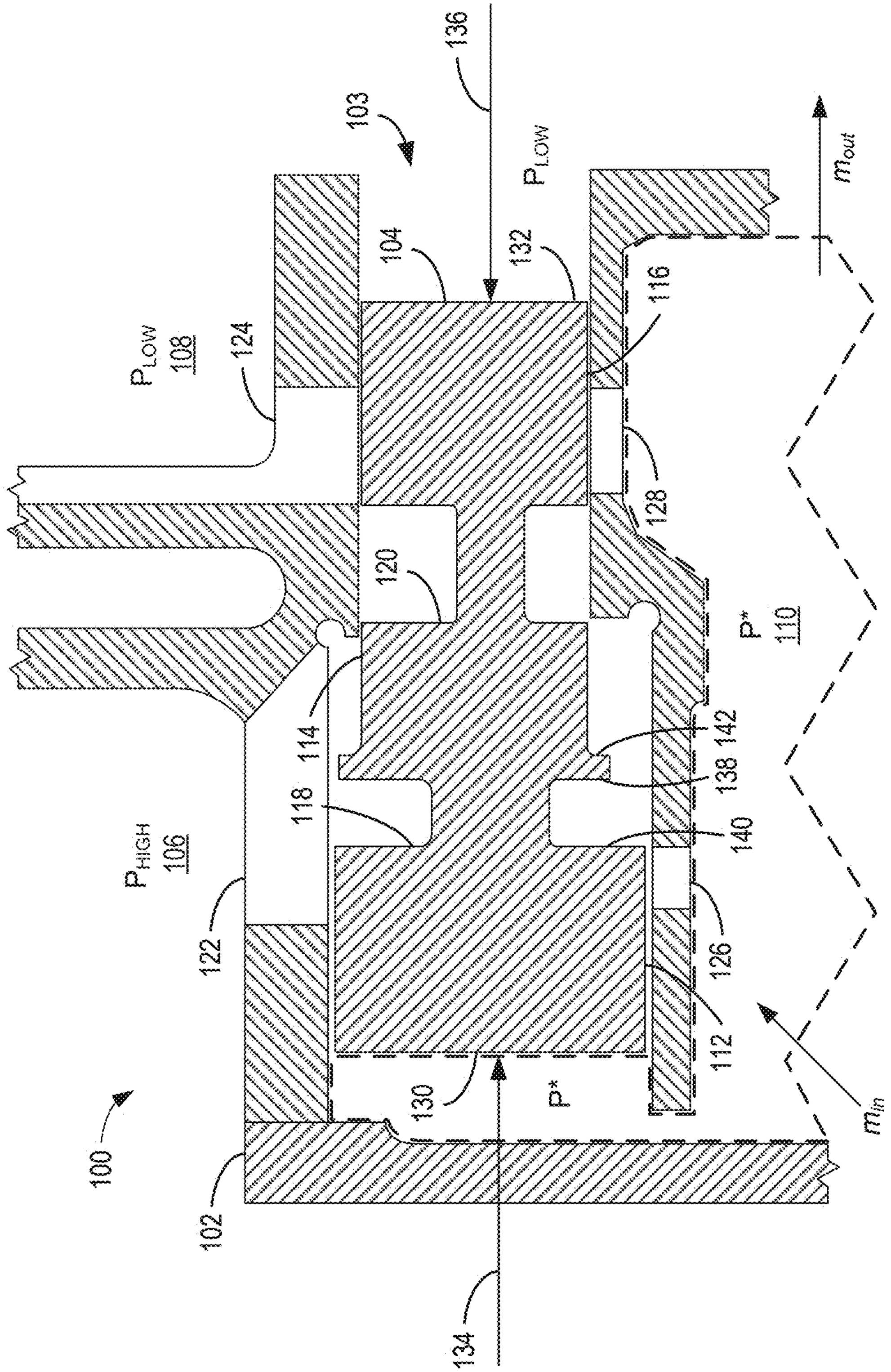
FIG. 1 illustrates a first example valve constructed in accordance with teachings of this disclosure.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "substantially," "approximately," and "about" may indicate such dimensions may be within a tolerance range of +/−10% unless otherwise specified herein.

In some applications (e.g., gas turbine applications), fluid (e.g., air, fuel, oil, supercritical carbon dioxide ($CO_2$), etc.) may enter and/or pass through one or more components of a system (e.g., a gas turbine engine). Such fluid flow may result in pressures that vary between two or more locations of the system. In some instances, it may be desirable to maintain a substantially constant pressure ratio between the two or more locations to facilitate operation of the system. For instance, a rotor of a gas turbine engine may be exposed to relatively high-pressure (e.g., 5 pounds per square inch absolute (psia) or more, up to 1000 psia, etc.) from a first location of the gas turbine engine, and relatively low-pressure (e.g., 4 psia or more, up to 550 psia, etc.) from a second location of the gas turbine engine. A seal (e.g., a radial seal) can be operatively coupled to the rotor to restrict and/or regulate fluid flow between the first and second locations, where the seal is positioned in a carrier proximate the rotor. The carrier defines a control volume, and pressure from the control volume is applied on the seal. In some instances, a target pressure ratio (e.g., 0.2, 0.5, 0.8, etc.) between the first location, the second location, and the control volume may be desirable to restrict and/or prevent undesirable movement (e.g., rotation and/or translation) of the seal with respect to the rotor.

Pressure control devices (e.g., pressure regulating valves, pressure relief valves, shuttle valves, etc.) are commonly utilized to maintain pressures at or near a target value. For instance, pressure regulating valves can adjust (e.g., increase and/or reduce) an inlet pressure to output a constant (e.g., substantially constant) outlet pressure. Pressure relief valves can also be used to restrict and/or prevent the outlet pressure from exceeding a set threshold. Shuttle valves can receive fluid from multiple inlets, and enable fluid flow from the higher pressure inlet to the outlet. In some instances, to maintain a target pressure ratio between multiple locations in a system, multiple pressure control devices may be necessary to regulate individual pressures at respective ones of the locations. Implementing multiple such pressure control devices may increase part costs and/or manufacturing costs associated with the system, and/or may not satisfy size and/or weight constraints of the system.

Example pressure regulation valves disclosed herein can be used to regulate and/or maintain example pressure ratios between two or more locations. An example pressure regulation valve includes a housing, and a flow control member (e.g., a control body, a piston, a rotating vane, etc.) positioned in and/or movable (e.g., slidable, translatable, rotatable) in the housing. In some examples, the flow control member is movable based on an example pressure ratio (e.g., a pressure differential) between a first pressure of a first variable-pressure location (e.g., a high-pressure location), a second pressure of a second variable-pressure location (e.g., a low-pressure location), and a third pressure of a control volume. For example, when the third pressure in the control volume is less than a threshold (e.g., such that a target pressure ratio is not satisfied), a resulting pressure ratio causes the flow control member to move to a first position (e.g., a pressure increase position) in which the flow control member enables fluid flow from the first variable-pressure location to the control volume. Conversely, in some examples, when the third pressure in the control volume is greater than the threshold, the resulting pressure ratio causes the flow control member to move to a second position (e.g., a pressure relief position) in which the flow control member enables fluid flow from the control volume to the second variable-pressure location. In some examples, as a result of fluid flow to and/or from the control volume, the pressure ratio between the first variable-pressure location, the second variable-pressure location, and/or the control volume can return and/or remain at or near the target pressure ratio.

In examples disclosed herein, the flow control member is sized such that the position of the flow control member in the housing is based on the pressure ratio between two or more locations in a system. As a result, examples disclosed herein can passively (e.g., without the use of external control device(s) and/or controls signal(s)) regulate and/or maintain the pressure ratio and, thus, can reduce design complexity and/or part costs associated with the system. Additionally, examples disclosed herein can utilize a single pressure regulation valve to regulate the pressure ratio between multiple locations (e.g., instead of using multiple pressure control devices to regulate individual pressures at the respective locations). Accordingly, examples disclosed herein can reduce a size, weight, and/or part costs associated with the system.

FIG. 1 illustrates a first example valve (e.g., a first pressure regulation valve) 100 constructed in accordance with teachings of this disclosure. In the illustrated example of FIG. 1, the first valve 100 includes a housing (e.g., a valve housing, a casing, a carrier) 102 defining a channel 103, and a first piston (e.g., a first control body, a stepped piston) 104 positioned in the channel 103. In some examples, the first piston 104 is movable (e.g., slidable, translatable) with respect to the housing 102 based on pressure differential(s) between a first variable-pressure location (e.g., a high-pressure location) 106 at a first pressure (e.g., $P_{high}$), a second variable-pressure location (e.g., a low-pressure location) 108 at a second pressure (e.g., $P_{low}$), and/or a control volume 110 at a third pressure (e.g., a control pressure P*). In this example, the second pressure is less than the first pressure, and the third pressure can be between the first and second pressures.

In the illustrated example of FIG. 1, the first piston 104 includes a first cylindrical section 112, a second cylindrical section 114, and a third cylindrical section 116. Further, a first groove 118 extends around a first circumference of the first piston 104 between the first and second cylindrical sections 112, 114, and a second groove 120 extends around a second circumference of the first piston 104 between the second and third cylindrical sections 114, 116. In the illustrated example of FIG. 1, a first diameter of the first cylindrical section 112 (e.g., 0.362 inches) is greater than a second diameter of the second cylindrical section 114 and/or a third diameter of the third cylindrical section 116 (e.g., 0.256 inches). Further, the second diameter of the second cylindrical section 114 is approximately equal to the third example diameter of the third cylindrical section 116. In some examples, relative sizes of the first cylindrical section 112, the second cylindrical section 114, and/or the third cylindrical section 116 may be different (e.g., the first diameter of the first cylindrical section 112 may be less than or equal to the second diameter of the second cylindrical section 114 and/or the third diameter of the third cylindrical section 116, the third diameter of the third cylindrical section 116 can be greater than or less than the second diameter of the second cylindrical section 114, etc.).

In some examples, the first piston 104 is sized based on an example target pressure ratio (e.g., a pressure eta ($P^*_{eta}$)) between the first variable-pressure location 106, the second variable-pressure location 108, and the control volume 110. For example, the target pressure ratio can be between 0.2 and 0.8. In some examples, the target pressure ratio may be different (e.g., less than 0.2, greater than 0.8, etc.). In some examples, based on the pressure ratio between the control volume 110 and the first and second variable-pressure locations 106, 108, the first piston 104 can move (e.g., slide, translate) within the channel 103 to control fluid flow to and/or from the control volume 110. As a result, the first piston 104 can vary the first pressure at the first variable-pressure location 106, the second pressure at the second variable-pressure location 108, and/or the third pressure in the control volume 110 to maintain the pressure ratio at or near the target pressure ratio. In some examples, the pressure ratio corresponds to a first pressure differential between the third pressure of the control volume 110 and the second pressure of the second variable-pressure location 108, relative to a second pressure differential between the first pressure of the first variable-pressure location 106 and the second pressure of the second variable-pressure location 108. For example, the pressure ratio can be represented based on example Equation 1 below.

$$P^*_{eta} = \frac{P^* - P_{low}}{P_{high} - P_{low}}. \quad \text{(Equation 1)}$$

In Equation 1 above, Peta represents the pressure ratio, $P_{high}$ represents the first pressure of the first variable-pressure location 106, $P_{low}$ represents the second pressure of the second variable-pressure location 108, and P* represents the third pressure of the control volume 110. In some examples, the target pressure ratio is between 0.2 and 0.8. In some examples, the target pressure ratio may be different (e.g., less than 0.2, greater than 0.8, etc.).

In the example of FIG. 1, the housing 102 includes a first opening 122 fluidly coupled to the first variable-pressure location 106, a second opening 124 fluidly coupled to the second variable-pressure location 108, and third and fourth openings 126, 128 fluidly coupled to the control volume 110. In this example, the first piston 104 is in a neutral position in which the first cylindrical section 112 of the first piston 104 blocks (e.g., covers) the third opening 126, and the third cylindrical section 116 blocks the second opening 124 and/or the fourth opening 128. As a result, the first piston 104 in the neutral position of FIG. 1 restricts and/or prevents fluid flow from the first variable-pressure location 106 and/or the second variable-pressure location 108 to the control volume 110 and, conversely, from the control volume 110 to the first variable-pressure location 106 and/or the second variable-pressure location 108.

In the illustrated example of FIG. 1, a first surface 130 at a first end of the first piston 104 is exposed to the third pressure from the control volume 110, and a second surface 132 at a second end (e.g., opposite the first end) of the first piston 104 is exposed to the second pressure from the second variable-pressure location 108. Further, third, fourth, and fifth surfaces 138, 140, 142 of the first piston 104 are exposed to the first pressure from the first variable-pressure location 106 (e.g., via fluid flowing the first variable-pressure location 106 to the channel 103 via the first opening 122). As a result of the first, second, and/or third pressures being applied on respective surfaces of the first piston 104, a first force (e.g., a first thrust force) 134 is applied on the first piston 104 in a first direction (e.g., a first longitudinal direction, rightward in FIG. 1), and a second force (e.g., a second thrust force) 136 is applied on the first piston 104 in a second direction (e.g., a second longitudinal direction, leftward in FIG. 1) opposite the first direction. In some examples, the first force 134 is based on the first and third pressures (e.g., $P_{high}$ and P*), and based on first and third surface areas of the respective first and third surfaces 130, 138. Further, the second force 136 is based on the first and second pressures (e.g., $P_{high}$ and $P_{low}$), and based on second, fourth, and fifth surface areas of the respective second, fourth, and fifth surfaces 132, 140, 142. In some examples, the cylindrical sections 112, 114, 116 are sized (e.g., the corresponding diameter(s) and/or surface area(s) are selected) such that a thrust balance on the first piston 104 is approximately zero (e.g., the first force 134 is substantially equal to the second force 136) when the pressure ratio is substantially equal to (e.g., within 10% of) the target pressure ratio.

In some examples, when a thrust balance on the first piston 104 is approximately zero (e.g., the first force 134 is substantially equal to the second force 136), the first piston 104 remains in the neutral position of FIG. 1. In some examples, the thrust balance may vary as a result of variation in the first, second, and/or third pressures. For example, mass (e.g., fluid) can flow into and/or out of the control volume 110 to increase and/or decrease the third pressure. As a result of pressure variation(s) at the first variable-pressure location 106, the second variable-pressure location 108, and/or the control volume 110, the first force 134 on the first piston 104 may increase and/or decrease relative to the second force 136 and, thus, may result in movement (e.g., translation) of the piston 104 within the housing 102.

Figure 2:
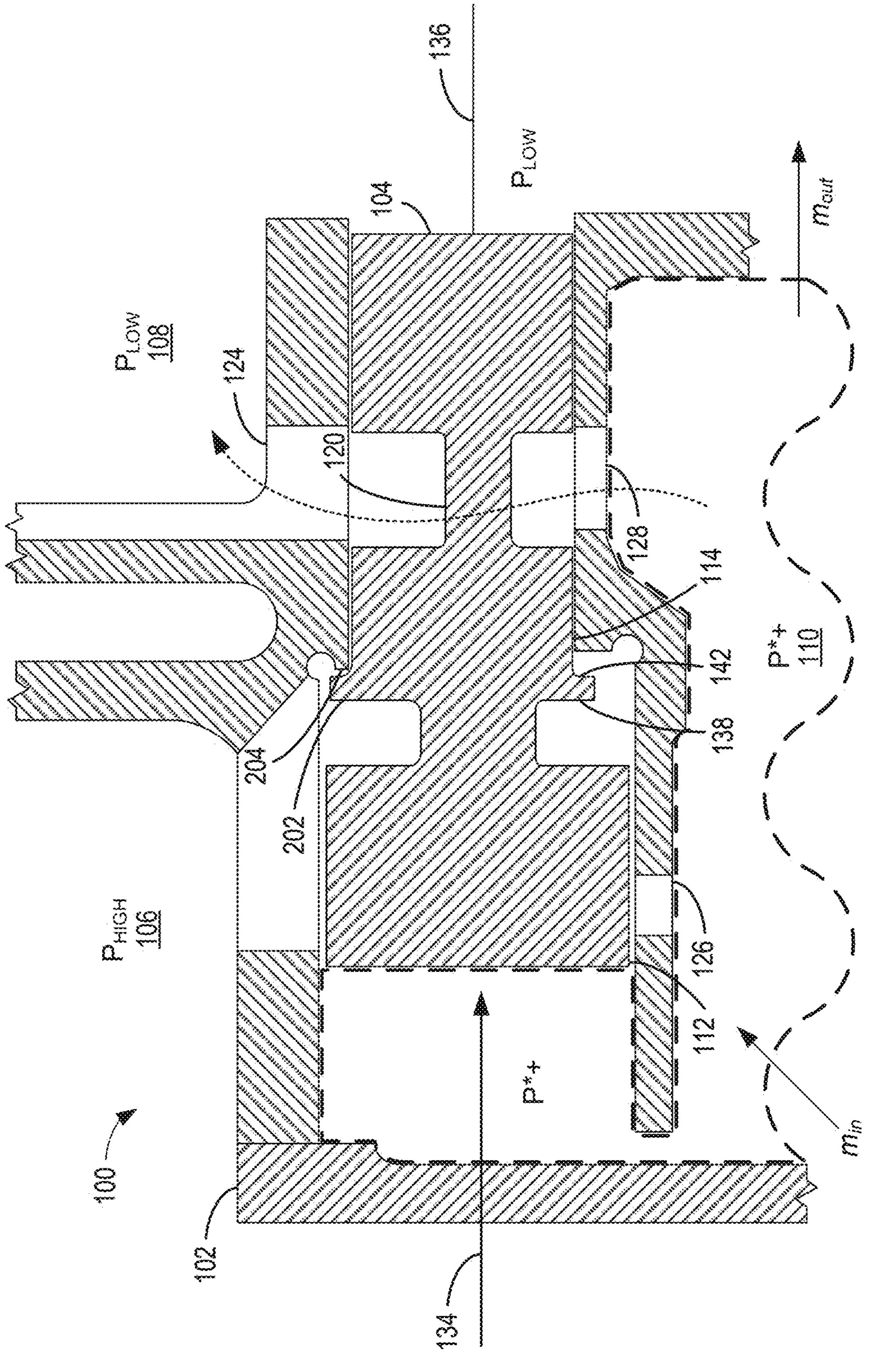
FIG. 2 illustrates the first valve of FIG. 1 including a first piston in a pressure relief position.

FIG. 2 illustrates the first valve 100 of FIG. 1 including the first piston 104 in a first position (e.g., a pressure relief position). In some examples, the first piston 104 moves to the first position shown in FIG. 2 (e.g., from the neutral position shown in FIG. 1) when the first force 134 is greater (e.g., by a threshold amount, greater than 10%) compared the second force 136. For example, when the third pressure in the control volume 110 increases (e.g., as a result of fluid and/or mass flowing into the control volume 110), a resulting increase in the first force 134 can cause the first piston 104 to move (e.g., translate, slide) rightward toward the first position of FIG. 2.

When the first piston 104 is in the first position of FIG. 2, the third opening 126 is blocked by the first cylindrical section 112, and the second groove 120 overlaps with at least a portion of the second opening 124 and/or the fourth opening 128 of the housing 102. As such, the second groove 120 fluidly couples the second opening 124 to the fourth opening 128 to enable fluid flow between the second variable-pressure location 108 and the control volume 110. For example, fluid can flow via the second groove 120 from the control volume 110 to the second variable-pressure location 108 to relieve excess pressure from the control volume 110 and/or increase the second pressure at the second variable-pressure location 108. In some such examples, by relieving the excess pressure from the control volume 110, the first piston 104 can maintain the target pressure ratio between the first variable-pressure location 106, the second variable-pressure location 108, and the control volume 110. In particular, the first piston 104 can passively maintain the target pressure ratio (e.g., without external control device(s) and/or control signal(s)).

In the illustrated example of FIG. 2, the first piston 104 includes a rib (e.g., a protrusion) 202 between the third and fifth surfaces 138, 142 of the piston 104. In this example, a diameter of the piston 104 at the rib 202 is greater than the second diameter of the second cylindrical section 114. In some examples, when the first piston 104 moves rightward in FIG. 2 (e.g., past the first position), the rib 202 contacts a first inner surface 204 of the housing 102 to restrict further rightward movement and, thus, to prevent the first piston 104 from being pushed out of the housing 102 by the first force 134.

Figure 3:
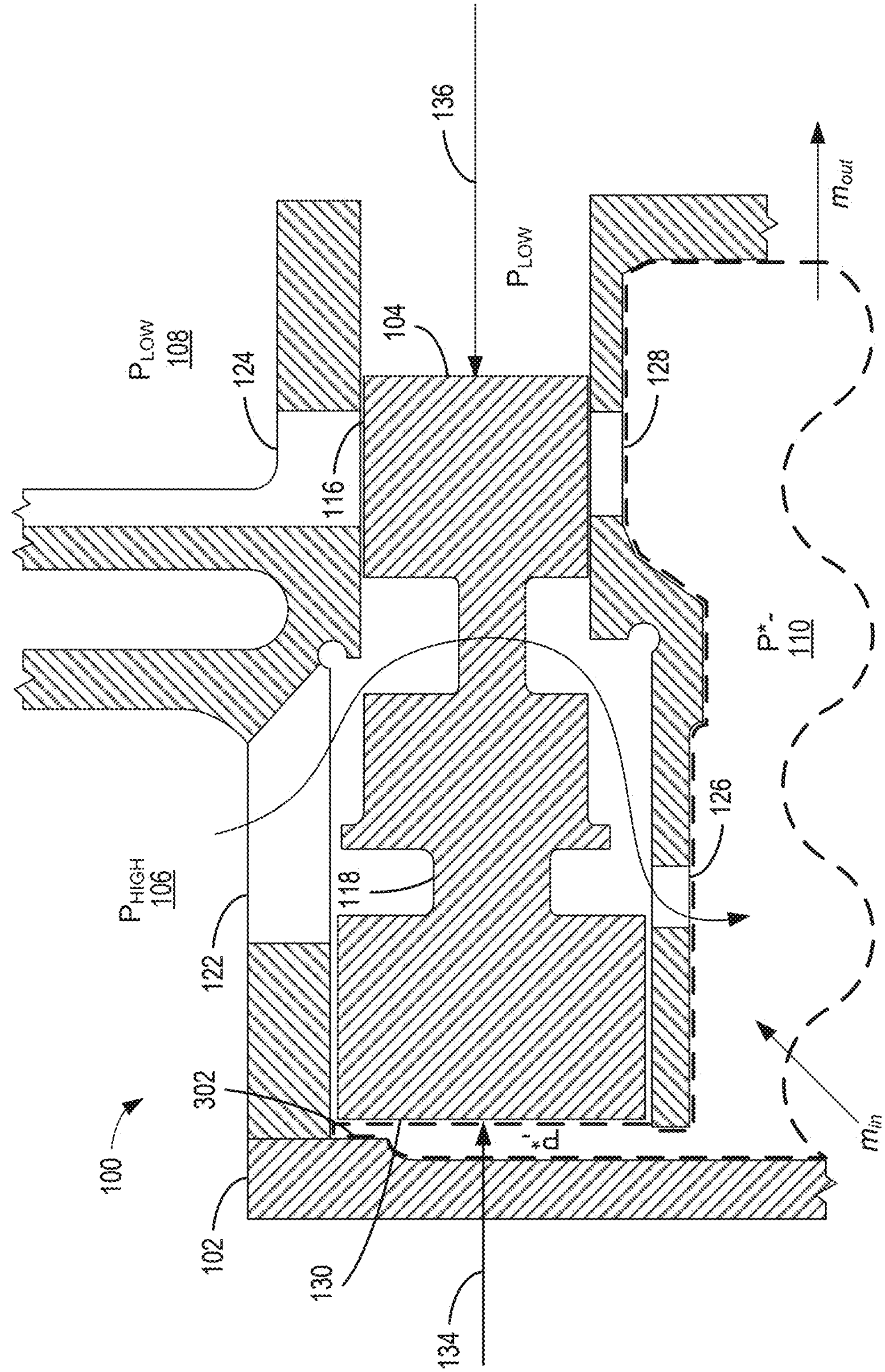
FIG. 3 illustrates the first valve of FIGS. 1 and/or 2 with the first piston in a pressure increase position.

FIG. 3 illustrates the first valve 100 of FIGS. 1 and/or 2 including the first piston 104 in a second position (e.g., a pressure increase position). In some examples, the first piston 104 moves to the second position shown in FIG. 3 (e.g., from the neutral position shown in FIG. 1 and/or from the first position shown in FIG. 2) when the first force 134 is less than (e.g., by a threshold amount, by 10%, etc.) the second force 136. For example, when the third pressure in the control volume 110 decreases (e.g., as a result of fluid and/or mass flowing out of the control volume 110), a resulting reduction in the first force 134 can cause the first piston 104 to move (e.g., translate, slide) leftward to the second position of FIG. 3.

When the first piston 104 is in the second position of FIG. 3, the second and fourth openings 124, 128 are blocked by the third cylindrical section 116, and the first groove 118 overlaps with at least a portion of the first opening 122 and/or the third opening 126 of the housing 102. As such, the first groove 118 fluidly couples the first opening 122 to the third opening 126 to enable fluid flow between the first variable-pressure location 106 and the control volume 110. For example, fluid can flow via the first groove 118 from the first variable-pressure location 106 to the control volume 110 to increase the third pressure in the control volume 110 and/or reduce the first pressure at the first variable-pressure location 106. In some such examples, by increasing the third pressure in the control volume 110, the first piston 104 can maintain the target pressure ratio between the first variable-pressure location 106, the second variable-pressure location 108, and the control volume 110. In some examples, when the first piston 104 moves leftward in FIG. 3 (e.g., past the first position), the first surface 130 of the piston 104 contacts a second inner surface 302 of the housing 102 to restrict further leftward movement by the second force 136.

Figure 4:
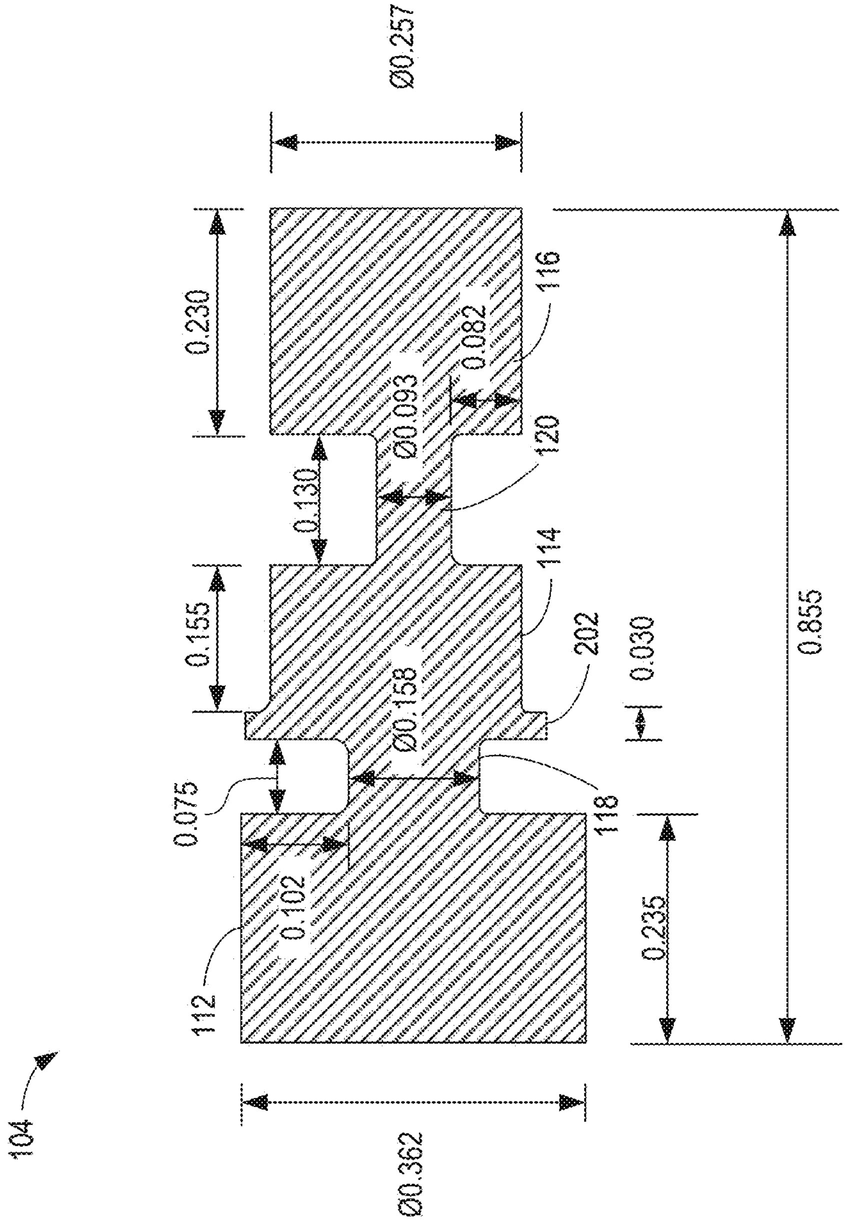
FIG. 4 illustrates the first piston of FIGS. 1, 2, and/or 3 with dimensions shown.

FIG. 4 illustrates the first piston 104 of FIGS. 1, 2, and/or 3 with example dimensions shown (e.g., in inches). In the illustrated example of FIG. 4, a first length (e.g., a total length) of the first piston 104 is approximately 0.855 inches, where a second length of the first cylindrical section 112 is approximately 0.235 inches, a third length of the first groove 118 is approximately 0.075 inches, a fourth length of the rib 202 is approximately 0.030 inches, a fifth length of the second cylindrical section 114 is approximately 0.155 inches, a sixth length of the second groove 120 is approximately 0.130 inches, and a seventh length of the third cylindrical section 116 is approximately 0.230 inches. Further, in FIG. 4, a first diameter of the first cylindrical section 112 is approximately 0.362 inches, a second diameter of the second and third cylindrical sections 114, 116 is approximately 0.257 inches, a third diameter of the first groove 118 is approximately 0.158 inches, and a fourth diameter of the second groove 120 is approximately 0.093 inches. In FIG. 4, a first radial distance between the first groove 118 and the first cylindrical section 112 is approximately 0.102 inches, and a second radial distance between the second groove 120 and the third cylindrical section 116 is approximately 0.082 inches. While example dimensions for the first piston 104 are shown in FIG. 4, one or more of the dimensions may be different.

Figure 5:
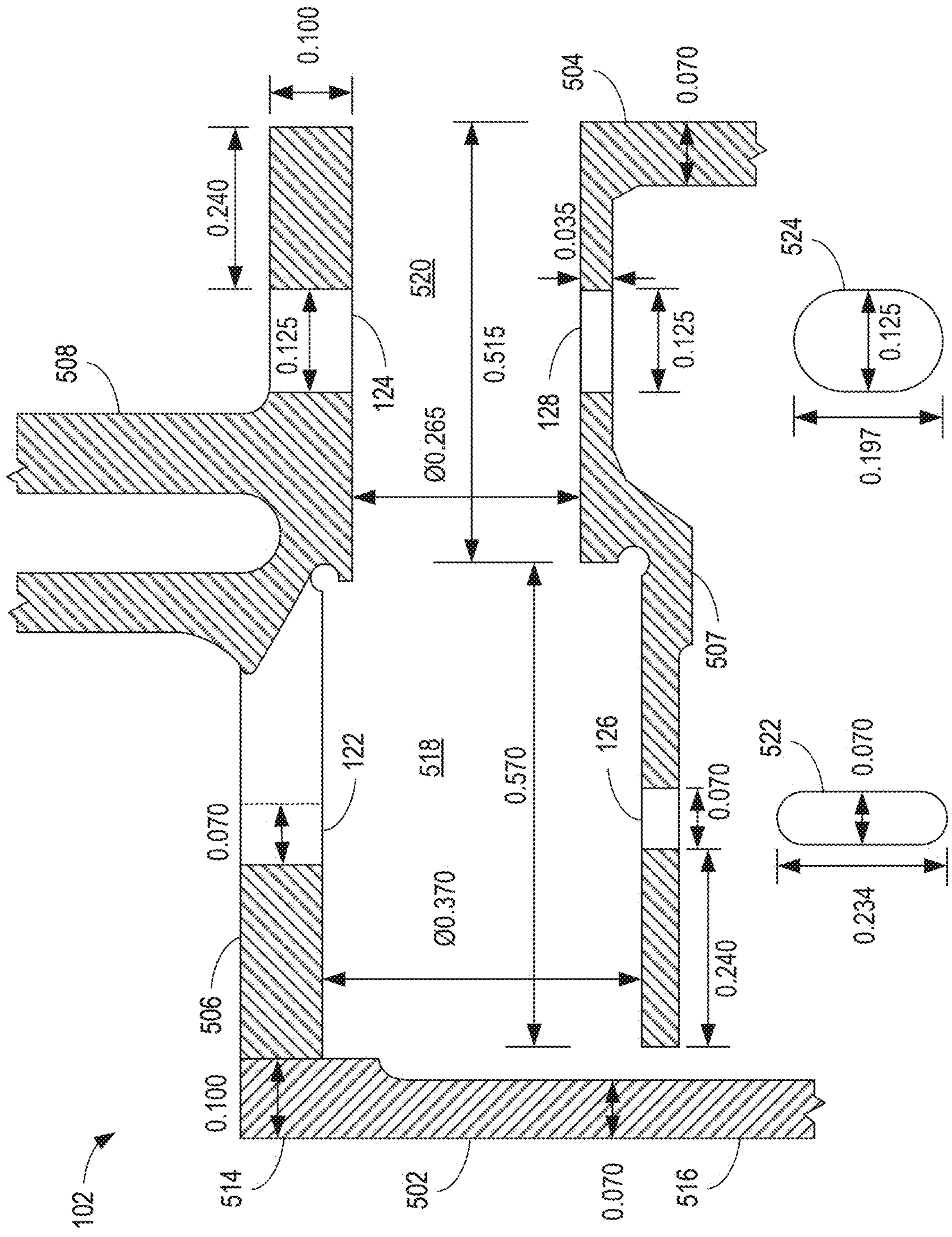
FIG. 5 illustrates a housing of the first valve of FIGS. 1, 2, and/or 3, with dimensions shown.

FIG. 5 is a cross-sectional view of the housing 102 of FIGS. 1, 2, and/or 3 with example dimensions shown (e.g., in inches). In FIG. 5, the housing 102 includes a forward carrier wall 502, an aft carrier wall 504, first and second walls 506, 506, and a nozzle 508 extending from the first wall 506. In this example, the first wall 506 has a first thickness of approximately 0.100 inches, and the second wall 507 has a second thickness of approximately 0.035 inches. Further, the forward carrier wall 502 has a third thickness (e.g., 0.100 in) at a first portion 514 of the forward carrier wall 502, and a fourth thickness (e.g., 0.070 in) at a second portion 516 of the forward carrier wall 502. In this example, the art carrier wall 504 has a fifth thickness (e.g., 0.070 in).

In FIG. 5, the first and second walls 506, 507 define a first channel portion 518 in which the first cylindrical section 112 of the piston 104 is to be positioned, and a second channel portion 520 in which the third cylindrical section 116 of the piston 104 is to be positioned. In this example, the first channel portion 518 has a first length of approximately 0.570 inches and a first diameter of approximately 0.370 inches, and the second channel portion 520 has a second length of approximately 0.515 inches and a second diameter of approximately 0.265 inches.

In FIG. 5, a first cross-sectional shape 522 represents a top view of the first opening 122 and/or the third opening 126, and a second cross-sectional shape 524 represents a top view the second opening 124 and/or the fourth opening 128. In this example, the first and second cross-sectional shapes 522, 524 are stadium-shaped, where the first cross-sectional shape 522 has a first height of approximately 0.234 inches and a first width of approximately 0.070 inches, and the second cross-sectional shape 524 has a second length of approximately 0.197 inches and a second width of approximately 0.125 inches. In some examples, a shape of the first cross-sectional shape 522 and/or the second cross-sectional shape 524 may be different (e.g., circular, triangular, rectangular, etc.). In FIG. 5, a first distance between the first portion 514 of the forward carrier wall 502 and the first and third openings 122, 126 is approximately 0.240 inches, and a second distance between a surface of the aft carrier wall 504 and the second and fourth openings 124, 128 is approximately 0.240 inches. While example dimensions for the housing 102 are shown in FIG. 5, one or more of the dimensions may be different.

Figure 6:
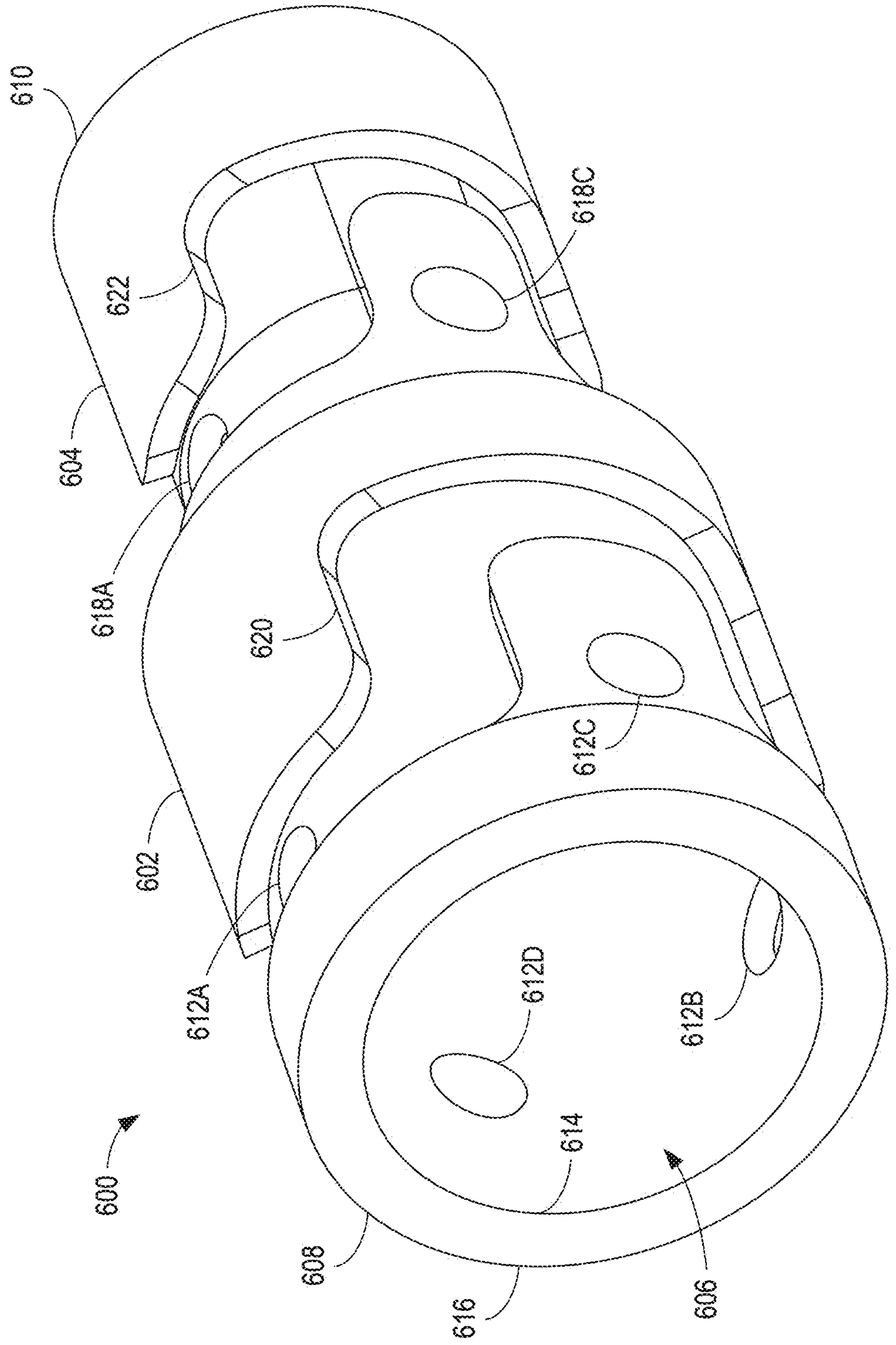
FIG. 6 illustrates a sleeve that may be implemented in the first valve of FIGS. 1, 2, and/or 3.

FIG. 6 illustrates an example sleeve 600 that may be implemented in the first valve 100 of FIGS. 1, 2, and/or 3. The sleeve 600 can be positioned (e.g., fixed) in the channel 103 of the housing 102 and/or can extend around a circumference of the piston 104, such that the piston 104 is movable (e.g., slidable, translatable) with respect to the sleeve 600. In FIG. 6, the sleeve 600 includes a first sleeve portion 602 and a second sleeve portion 604, where the first and second sleeve portions 602, 604 have a circular cross-sectional shape. A through-hole 606 extends between first and second ends 608, 610 of the sleeve 600, where the through-hole 606 has a first diameter along the first sleeve portion 602 and a second diameter (e.g., less than the first diameter) along the second sleeve portion 604. In some examples, the first diameter of the through-hole 606 is substantially the same as and/or is greater (e.g., by up to 10%) than the first diameter of the first cylindrical section 112 of the piston 104, and the second diameter of the through-hole 606 is substantially the same as and/or is greater (e.g., by up to 10%) than the second diameter of the second cylindrical section 114 and/or the third diameter of the third cylindrical section 116 of the piston 104.

In FIG. 6, the first sleeve portion 602 includes first, second, third, and fourth ports 612A, 612B, 612C, 612D spaced along a first circumference of the first sleeve portion 602 and extending between inner and outer surfaces 614, 616 of the sleeve 600. Further, the second sleeve portion 604 includes fifth, sixth, seventh, and eighth ports 618A, 618B, 618C, 618D (two of which are shown in FIG. 6) spaced along a second circumference of the second sleeve portion 604 and extending between the inner and outer surfaces 614, 616. In this example, the first and second ports 612A, 612B are diametrically opposed, the third and fourth ports 612C, 612D are diametrically opposed, the fifth and sixth ports 618A, 618B are diametrically opposed, and the seventh and eighth ports 618C, 618D are diametrically opposed. The ports 612A, 612B, 612C, 612D, 618A, 618B, 618C, 618D have a circular cross-sectional shape. In some examples, a cross-sectional shape of one or more of the ports 612A, 612B, 612C, 612D, 618A, 618B, 618C, 618D may be different.

In some examples, the sleeve 600 is positioned in the housing 102 of FIGS. 1, 2, and/or 3 such that the first port 612A is fluidly coupled to the first variable-pressure location 106 (e.g., via the first opening 122), and the fifth port 618A is fluidly coupled to the second variable-pressure location 108 (e.g., via the second opening 124). In FIG. 6, the sleeve 600 includes a first recess 620 in the outer surface 616 of the first sleeve portion 602, where the first recess 620 extends between and/or fluidly couples the first and second ports 612A, 612B. Further, the sleeve 600 includes a second recess 622 in the outer surface 616 of the second sleeve portion 604, where the second recess 622 extends between and/or fluidly couples the fifth and sixth ports 618A, 618B. In some examples, one(s) of the ports 612A, 612B, 612C, 612D, 618A, 618B, 618C, 618D can be pressurized with fluid from the respective first and second variable-pressure locations 106, 108 to balance radial pressures (e.g., thrust) applied on the piston 104 and, thus, reduce a likelihood of lockup of the piston 104 in the sleeve 600.

Figure 7:
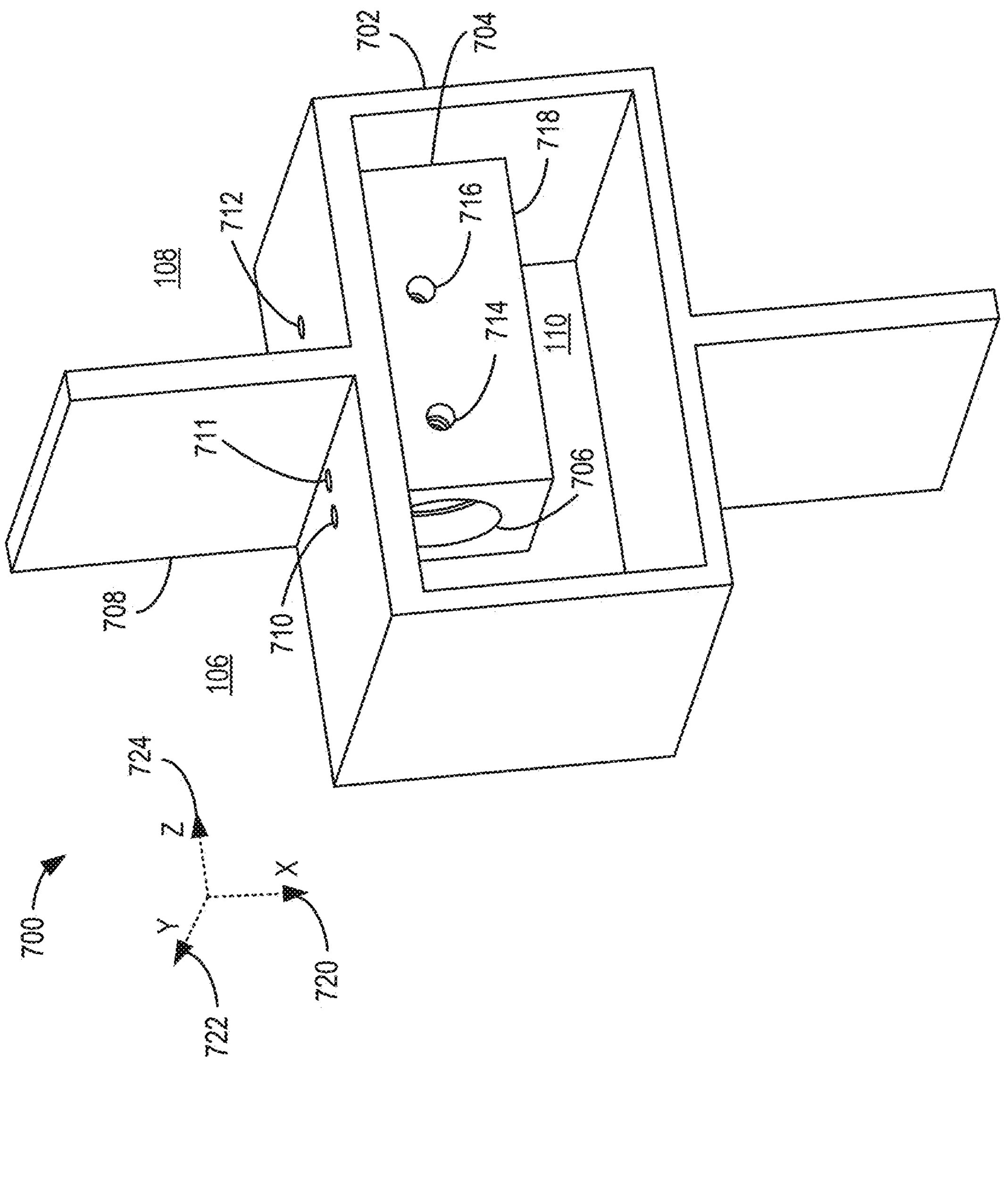
FIG. 7 is a perspective view of a second example housing in which the piston of FIGS. 1, 2, 3, and/or 4 and/or the sleeve of FIG. 6 may be implemented.

FIG. 7 is a perspective view of a second housing 700 in which the piston 104 of FIGS. 1, 2, 3, and/or 4 and/or the sleeve 600 of FIG. 6 may be implemented. In the illustrated example of FIG. 7, the second housing 700 includes a first casing 702 defining the control volume 110, and a second casing 704 positioned in the first casing 702. The second casing 704 includes a through-hole 706 in which the sleeve 600 and the piston 104 can be positioned. In FIG. 7, the second housing 700 includes a wall 708 separating the first and second variable-pressure locations 106, 108.

In FIG. 7, the first casing 702 includes a first opening 710 and a second opening 711 fluidly coupled between the first variable-pressure location 106 and the through-hole 706 in the second casing 704, and further includes a third opening 712 fluidly coupled between the second variable-pressure location 108 and the through-hole 706. The second casing 704 includes fourth and fifth openings 714, 716 extending through a sidewall 718 of the second casing 704 to fluidly couple the through-hole 706 to the control volume 110. In some examples, the first, second, and third openings 710, 711, 712 extend along a first direction (e.g., an X-direction) 720, and the fourth and fifth openings 714, 716 extend along a second direction (e.g., a Y-direction) 722 perpendicular (e.g., orthogonal) to the first direction 720. Further, the first and fourth openings 710, 714 are aligned along a first circumference of the through-hole 706, and the third and fifth openings 712, 716 are aligned along a second circumference of the through-hole 706, where the first and second circumferences are offset along a third direction (e.g., a Z-direction) 724 perpendicular (e.g., orthogonal) to the first and second directions 720, 722.

Figure 8A:
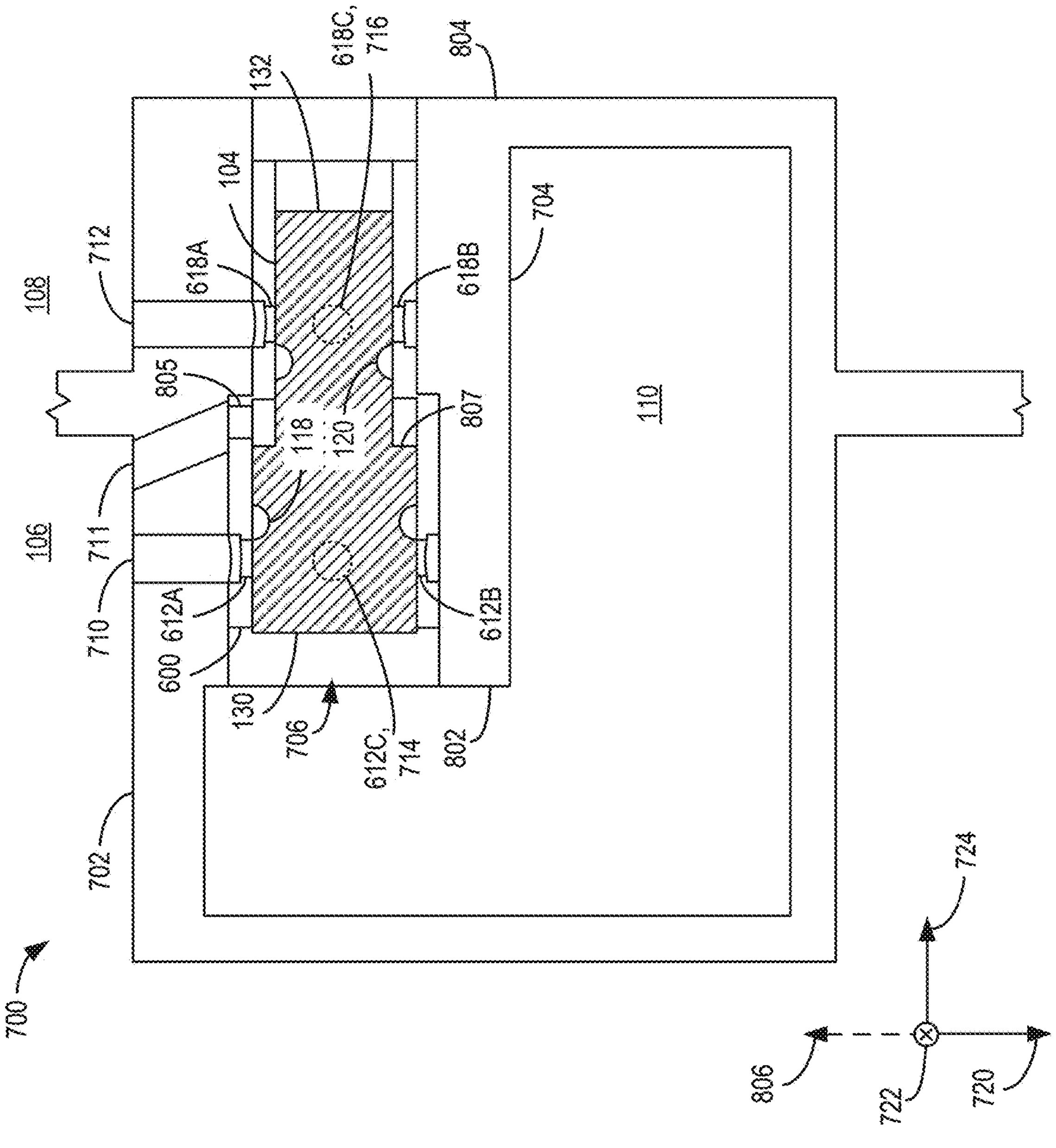
FIG. 8A is a cross-sectional view of the second housing of FIG. 7 including the sleeve and the piston positioned therein.

FIG. 8A is a cross-sectional view of the example housing 700 of FIG. 7 including the sleeve 600 and the piston 104 positioned therein. The sleeve 600 and the piston 104 are positioned in the through-hole 706 extending between first and second ends 802, 804 of the second casing 704. In FIG. 8A, the sleeve 600 is positioned in the through-hole 706 such that the first port 612A of the sleeve 600 is fluidly coupled to and/or is substantially aligned with the first opening 710 of the first casing 702, and the fifth port 618A is fluidly coupled to and/or is substantially aligned with the third opening 712 of the first casing 702. Further, the third port 612C is substantially aligned with the fourth opening 714 of the second casing 704, and the seventh port 618C is substantially aligned with the fifth opening 716 of the second casing 704 (e.g., where the third and seventh ports 612C, 618C and the fourth and fifth openings 714, 716 extend along the Y-direction 722 into the page of FIG. 8A). In FIG. 8A, the second opening 711 is fluidly coupled to a ninth port 805 of the sleeve 600. In some examples, first fluid from the first variable-pressure location 106 can enter the sleeve 600 via the second opening 711 and the ninth port 805. The first fluid can apply pressure on an annular surface 807 of the piston 104 in a leftward direction of FIG. 8A (e.g., opposite to the Z-direction 724).

In FIG. 8A, the piston 104 is in a neutral position. For example, the piston 104 is in the neutral position when the pressure ratio between the first variable-pressure location 106, the second variable-pressure location 108, and the control volume 110 (e.g., represented in example Equation 1 above) is satisfied (e.g., is substantially equal to a target pressure ratio) and/or a thrust balance on the first and second surfaces 130, 132 and the annular surface 807 of the piston 104 is approximately zero. When the piston 104 is in the neutral position of FIG. 8A, the first groove 118 does not overlap the first port 612A and the second groove 120 does not overlap the fifth port 618A. As a result, the piston 104 restricts and/or prevents fluid flow between the first variable-pressure location 106, the second variable-pressure location 108, and/or the control volume 110 via the respective grooves 118, 120.

When the piston 104 is in the neutral position of FIG. 8A, first fluid from the first variable-pressure location 106 can enter the sleeve 600 via the first port 612A, and the first fluid can further flow to the second port 612B via the first recess 620 of FIG. 6. Similarly, second fluid from the second variable-pressure location 108 can enter the sleeve 600 via the fifth port 618A, and the second fluid can further flow to the sixth port 618B via the second recess 622 of FIG. 6. The first fluid in the first port 612A applies a first radial force on the piston 104 in the first direction 720, and the first fluid in the second port 612B applies a second radial force on the piston 104 in a fourth direction 806 (e.g., opposite the first direction 720). Further, the second fluid in the fifth port 618B applies a third radial force on the piston 104 in the first direction 720, and the second fluid in the sixth port 618B applies a fourth radial force on the piston 104 in the fourth direction 806. In some examples, the first and second radial forces are substantially equal in magnitude and opposite in direction, and the third and fourth radial forces are substantially equal in magnitude and opposite in direction. As a result, a radial thrust balance on the piston 104 (e.g., a moment in the clockwise direction and/or the counterclockwise direction of FIG. 8A) is substantially zero, reducing rotation of the piston 104 in the clockwise and/or counterclockwise directions of FIG. 8A and, thus, reducing risk of lockup of the piston 104.

Figure 8B:
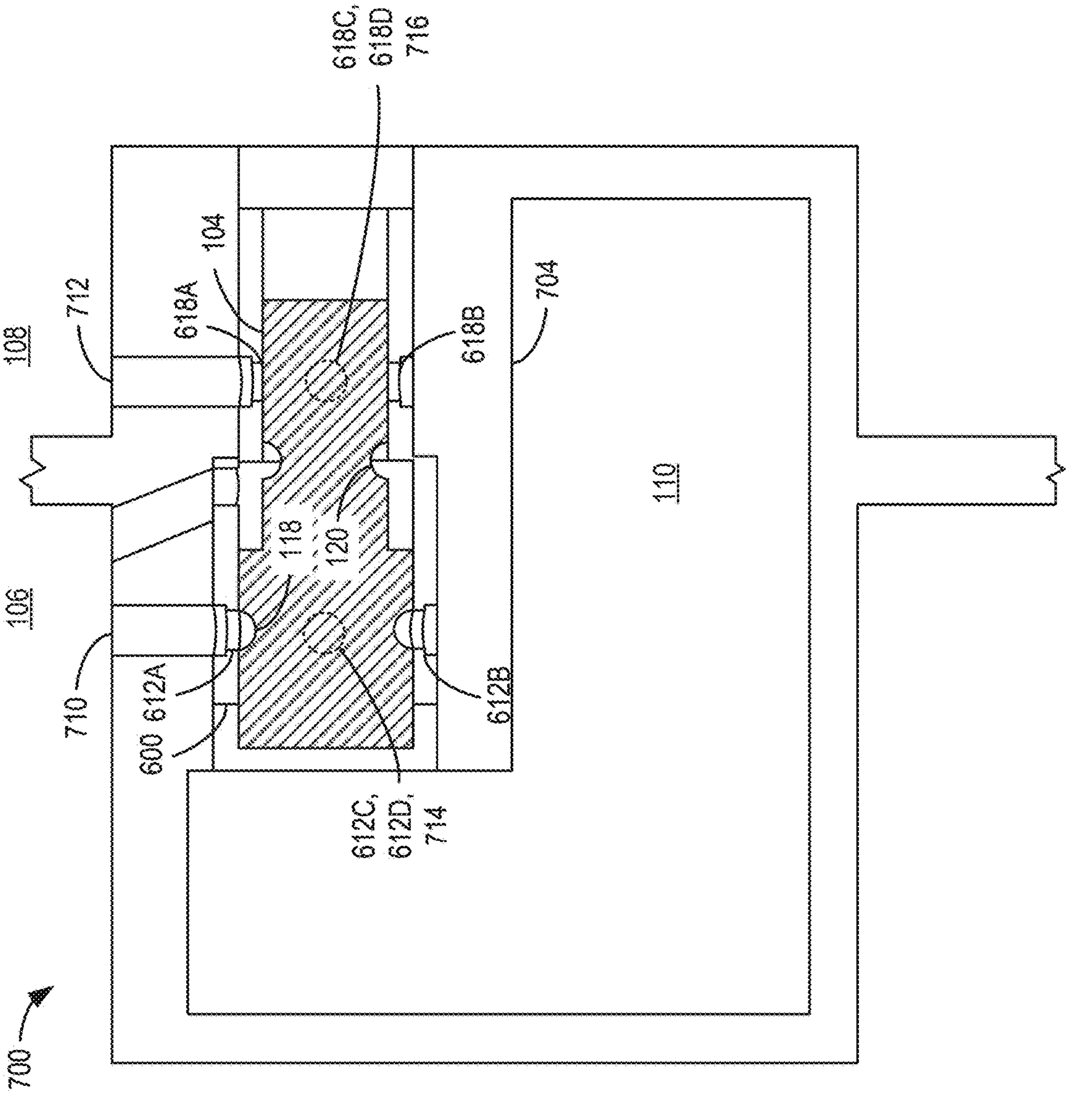
FIG. 8B is a cross-sectional view of the second housing of FIGS. 7 and/or 8A with the piston in a pressure increase position.

FIG. 8B is a cross-sectional view of the second housing 700 of FIGS. 7 and/or 8A with the piston 104 in a first position (e.g., a pressure increase position). In some examples, the piston 104 moves to the first position of FIG. 8B (e.g., from the neutral position of FIG. 8A) when the pressure ratio between the first variable-pressure location 106, the second variable-pressure location 108, and the control volume 110 is not satisfied (e.g., the third pressure in the control volume 110 is less than a threshold pressure). In FIG. 8B, when the piston 104 is in the first position, the first groove 118 of the piston 104 overlaps and/or is substantially aligned with the first port 612A of the sleeve 600, and the second groove 120 of the piston 104 is offset from (e.g., does not overlap) the fifth port 618A of the sleeve 600. First fluid from the first variable-pressure location 106 can enter the first groove 118 via the first opening 710 and the first port 612A, such that the first fluid can flow to the third and fourth ports 612C, 612D and to the control volume 110 via the fourth opening 714 of the second casing 704 of FIG. 7. As a result, the first fluid from the first variable-pressure location 106 can increase the third pressure in the control volume 110 (e.g., until the pressure ratio is satisfied). Further, when the first piston 104 is in the first position of FIG. 8B, the first fluid from the first variable-pressure location 106 and second fluid from the second variable-pressure location 108 enter the sleeve 600 (e.g., via the respective ports 612A, 612B, 618A, 618B and recesses 620, 622 of FIG. 6) to produce a balanced radial thrust (e.g., zero net radial thrust) on the piston 104.

Figure 8C:
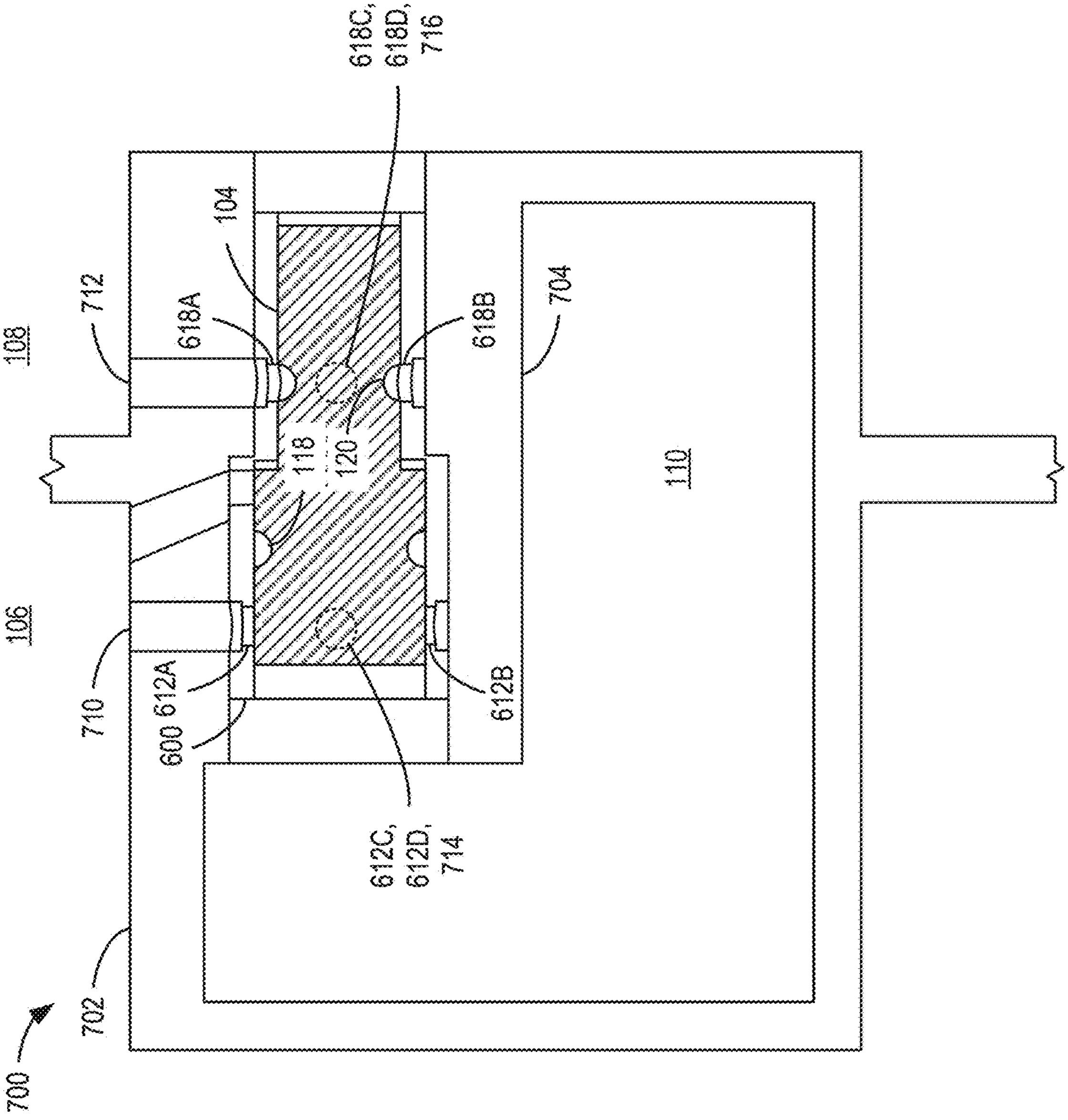
FIG. 8C is a cross-sectional view of the second housing of FIGS. 7, 8A, and/or 8B with the piston in a pressure relief position.

FIG. 8C is a cross-sectional view of the second housing 700 of FIGS. 7, 8A, and/or 8B with the piston 104 in a second position (e.g., a pressure relief position). In some examples, the piston 104 moves to the second position of FIG. 8C (e.g., from the neutral position of FIG. 8A and/or from the first position of FIG. 8B) when the pressure ratio between the first variable-pressure location 106, the second variable-pressure location 108, and the control volume 110 is not satisfied (e.g., the third pressure in the control volume 110 is greater than a threshold pressure). In FIG. 8C, when the piston 104 is in the second position, the second groove 120 of the piston 104 overlaps and/or is substantially aligned with the fifth port 618A of the sleeve 600, and the first groove 118 of the piston 104 is offset from (e.g., does not overlap with) the first port 612A of the sleeve 600. In such examples, third fluid from the control volume 110 can enter the second groove 120 via the fifth opening 716 of FIG. 7 and the seventh port 612C, and the third fluid can further flow to the second variable-pressure location 108 via the fifth port 618A and/or the third opening 712 of the first casing 702. As a result of the third fluid exiting the control volume 110, the third pressure in the control volume 110 can be reduced (e.g., until the pressure ratio is satisfied). Further, when the first piston 104 is in the second position of FIG. 8C, the first fluid from the first variable-pressure location 106, second fluid from the second variable-pressure location 108, and/or the third fluid from the control volume 110 can enter the sleeve 600 (e.g., via the respective ports 612A, 612B, 618A, 618B, 618C and recesses 620, 622 of FIG. 6) to produce a balanced radial thrust (e.g., zero net radial thrust) on the piston 104.

Figure 9:
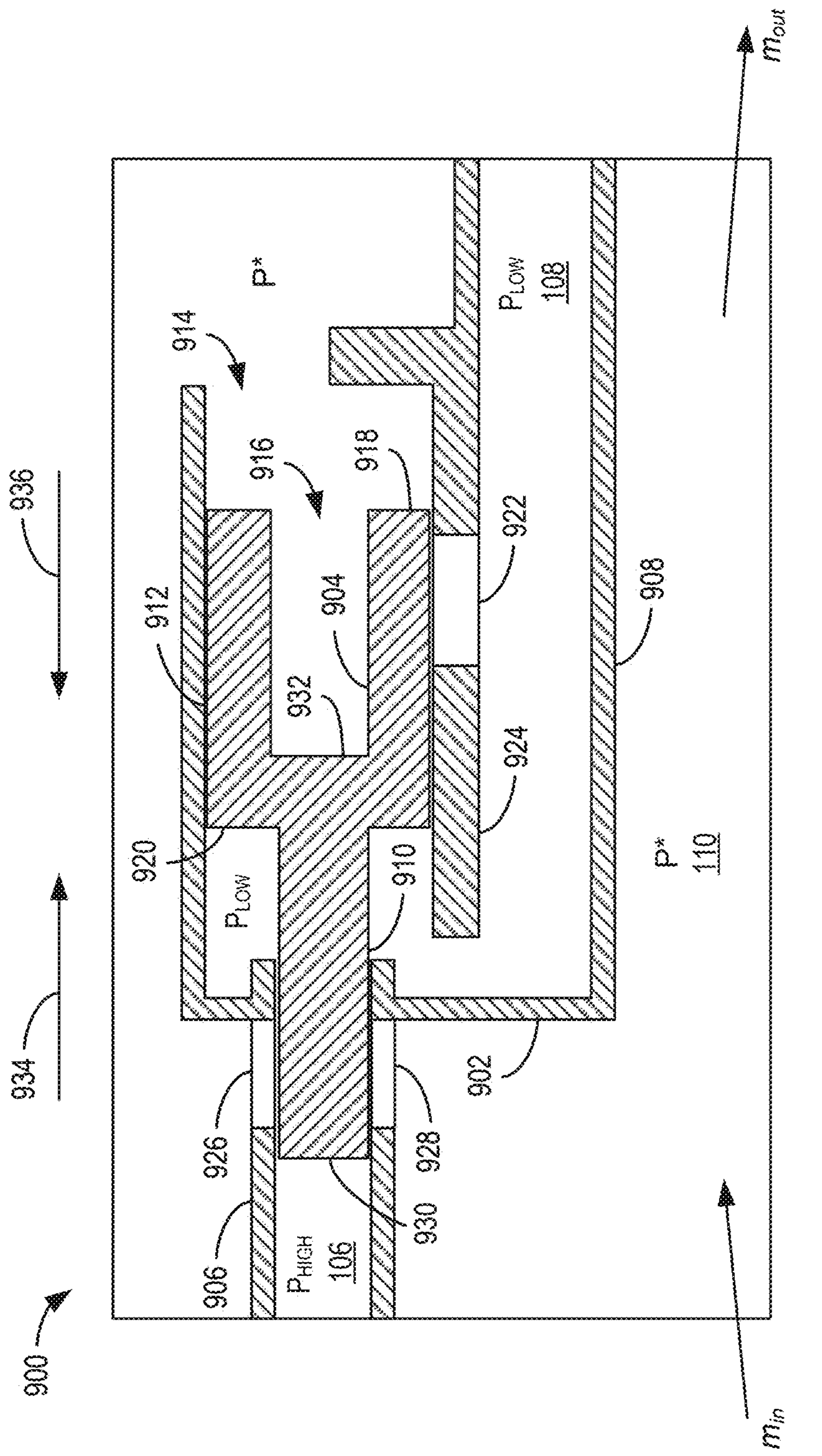
FIG. 9 is a cross-sectional view of a second example valve constructed in accordance with teachings of this disclosure.

FIG. 9 is a cross-sectional view of a second example valve (e.g., a second pressure regulation valve) 900 constructed in accordance with teachings of this disclosure. In some examples, the second valve 900 of FIG. 9 can be used in addition to or instead of the first valve 100 of FIGS. 1, 2, and/or 3 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume 110. In FIG. 9, the second valve 900 includes a second housing 902, and a second piston 904 positioned in and/or movable (e.g., slidable, translatable) within the housing 902.

In FIG. 9, the second housing 902 includes a supply line (e.g., a supply tube) 906 fluidly coupled to the first variable-pressure location 106, and a vent line 908 fluidly coupled to the second variable-pressure location 108. The supply line 906 and the vent line 908 extend into the control volume 110. The second piston 904 includes a first cylindrical section 910 positioned at least partially in the supply line 906, and a second cylindrical section 912 positioned in a first channel 914 of the second housing 902. Further, the second piston 904 includes an aperture 916 extending into the second cylindrical section 912 from a first surface 918 of the second piston 904. In some examples, the aperture 916 may be omitted (e.g., the second cylindrical section 904 is substantially solid between the first surface 918 and a second surface (e.g., an annular surface) 920 of the second piston 904). The second housing 902 includes a first opening (e.g., a vent hole) 922 in a wall 924 of the second housing 902. Further, the second housing 902 includes second and third openings (e.g., feed holes) 926, 928 in the supply line 906.

In FIG. 9, first fluid from the first variable-pressure location 106 applies the first pressure on a third surface 930 of the second piston 904, second fluid from the second variable-pressure location 108 apples the second pressure on the second surface 920 of the second piston 904, and third fluid from the control volume 110 applies the third pressure on the first surface 918 and/or a fourth surface 932 of the second piston 904 (e.g., inside the aperture 916). In this example, the second piston 904 is in a neutral position when the pressure ratio between the first, second, and third pressures satisfies the target pressure ratio (e.g., represented in example Equation 1 above) and a thrust force balance on the second piston 904 is substantially zero. For example, the thrust force balance is substantially zero when a first thrust force on the second piston 904 in a first direction 934 (e.g., a first longitudinal direction, rightward in FIG. 9) is substantially equal (e.g., within 10%) to a second thrust force on the second piston 904 in a second direction 936 (e.g., a second longitudinal direction, leftward in FIG. 9) opposite the first direction 934. The first thrust force is based on the first pressure corresponding to the first variable-pressure location 106 and a third surface area of the third surface 930, and is further based on the second pressure corresponding to the second variable-pressure location 108 and a second surface area of the second surface 920. Additionally, the second thrust force is based on the third pressure corresponding to the control volume 110, a first surface area of the first surface 918, and a fourth surface area of the fourth surface 932.

When the second piston 904 is in the neutral position of FIG. 9, the second piston 904 blocks (e.g., restricts fluid flow through) the first opening 922, the second opening 926, and the third opening 928. As a result, first fluid from the supply line 906 is restricted (e.g., prevented) from flowing into the control volume 110 via the second and third openings 926, 928, and third fluid from the control volume 110 is restricted (e.g., prevented) from flowing to the vent line 908 via the first opening 922. The second piston 904 can move from the neutral position of FIG. 9 when the third pressure in the control volume 110 increases or decreases (e.g., as a result of mass flow into and/or out of the control volume 110), resulting in a non-zero thrust force balance on the second piston 904.

Figure 10:
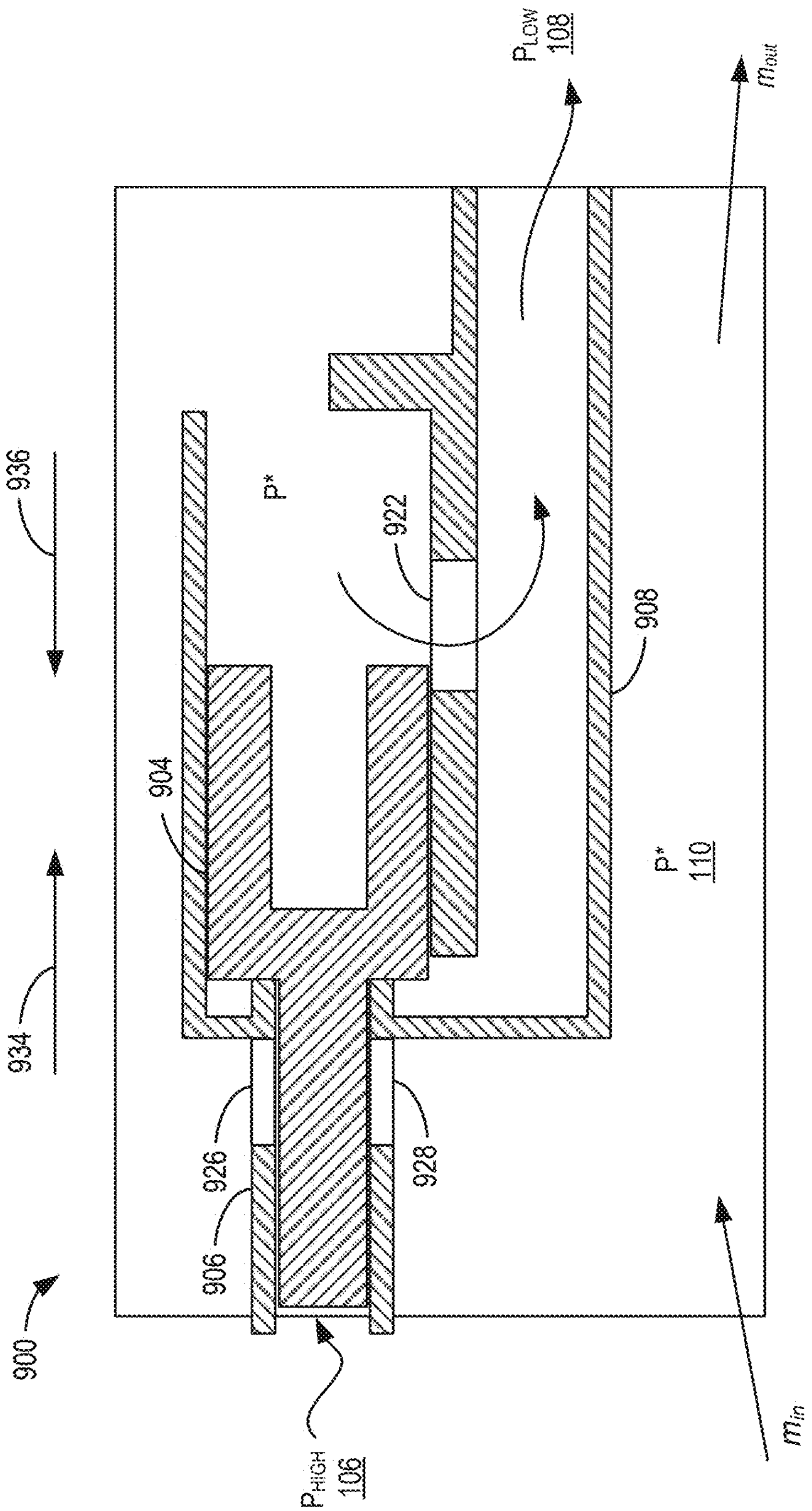
FIG. 10 illustrates the second valve of FIG. 9 with a second piston in a pressure relief position.

FIG. 10 illustrates the second valve 900 of FIG. 9 with the second piston 904 in a first position (e.g., a pressure relief position). The second piston 904 moves to the first position of FIG. 10 (e.g., from the neutral position of FIG. 9) when the third pressure in the control volume 110 increases (e.g., such that the first thrust force on the second piston 904 in the first direction 934 is less than the second thrust force on the second piston 904 in the second direction 936), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 10, when the second piston 904 is in the first position, the second piston 904 blocks (e.g., restricts fluid flow through) the second and third openings 926, 928, and enables fluid flow through the first opening 922. As a result, first fluid from the supply line 906 is restricted (e.g., prevented) from flowing into the control volume 110 via the second and third openings 926, 928. Further, third fluid from the control volume 110 can flow to the vent line 908 via the first opening 922, reducing the third pressure in the control volume 110.

Figure 11:
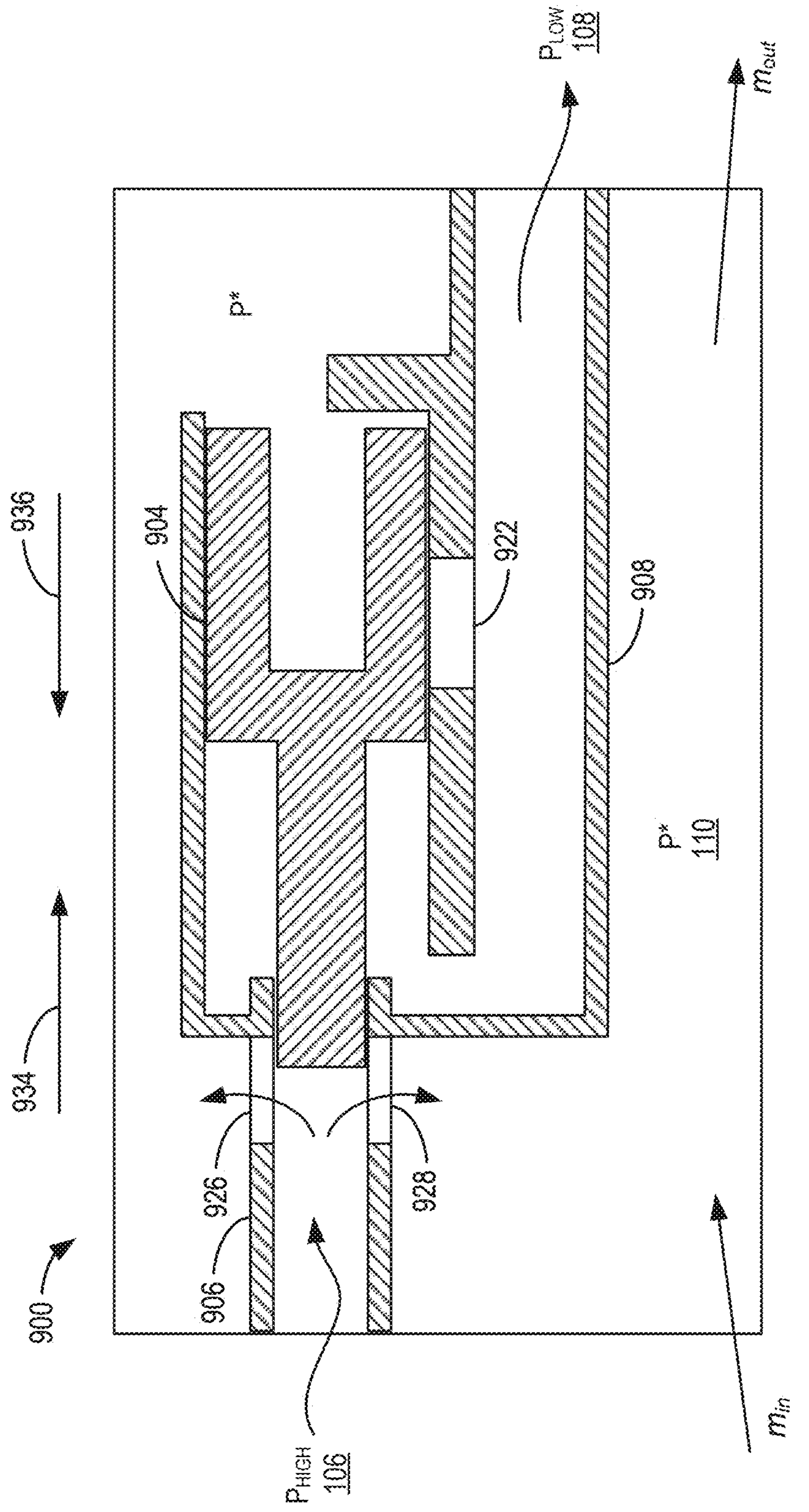
FIG. 11 illustrates the second valve of FIGS. 9 and/or 10 with the second piston in a pressure increase position.

FIG. 11 illustrates the second valve 900 of FIG. 9 with the second piston 904 in a second position (e.g., a pressure increase position). The second piston 904 moves to the second position of FIG. 11 (e.g., from the neutral position of FIG. 9 and/or the first position of FIG. 10) when the third pressure in the control volume 110 decreases (e.g., such that the first thrust force on the second piston 904 in the first direction 934 is greater than the second thrust force on the second piston 904 in the second direction 936), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 11, when the second piston 904 is in the second position, the second piston 904 blocks (e.g., restricts fluid flow through) the first opening 922, and enables fluid flow through the second and third openings 926, 928. As a result, third fluid from the control volume 110 is restricted (e.g., prevented) from flowing to the vent line 908 via the first opening 922. Further, first fluid from the supply line 906 can flow to the control volume 110 via the second and third openings 926, 928, increasing the third pressure in the control volume 110.

Figure 12:
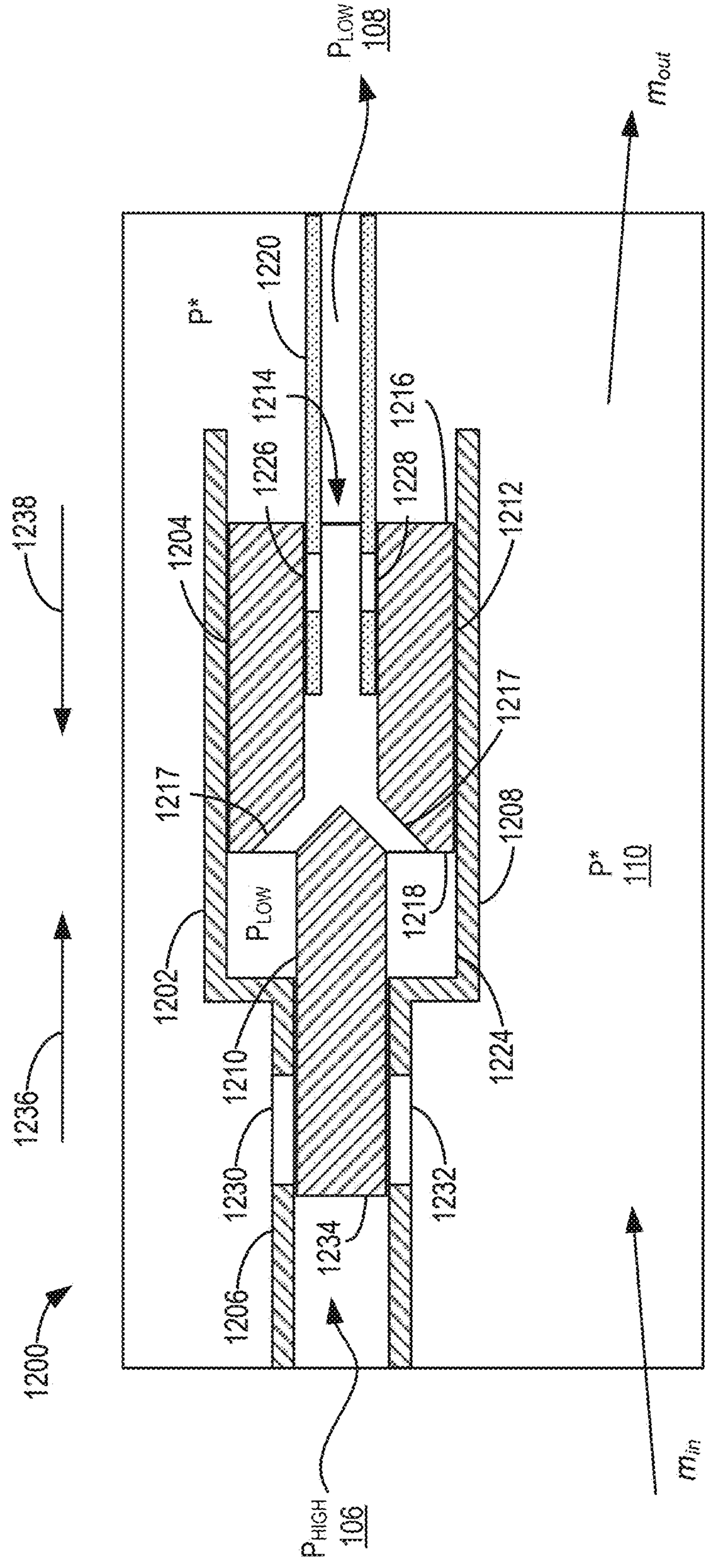
FIG. 12 is a cross-sectional view of a third example valve constructed in accordance with teachings of this disclosure.

FIG. 12 is a cross-sectional view of a third example valve (e.g., a third pressure regulation valve) 1200 constructed in accordance with teachings of this disclosure. The third valve 1200 of FIG. 12 can be used in addition to or instead of the first valve 100 of FIGS. 1, 2, and/or 3 and/or the second valve 900 of FIGS. 9, 10, and/or 11 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume

110. In FIG. 12, the third valve 1200 includes a third housing 1202, and a third piston 1204 positioned in and/or movable (e.g., slidable, translatable) within the third housing 1202.

In FIG. 12, the third housing 1202 includes a supply line (e.g., a supply tube) 1206 to receive first fluid from the first variable-pressure location 106, and a piston casing 1208 to receive second fluid from the second variable-pressure location 108. The third piston 1204 includes a first cylindrical section 1210 positioned at least partially in the supply line 1206, and a second cylindrical section 1212 positioned in the piston casing 1208. The first cylindrical section 1210 has a first diameter, and the second cylindrical section 1212 has a second diameter greater than the first diameter. Further, the third piston 1204 includes an aperture 1214 extending into the second cylindrical section 1212 from a first surface 1216 of the second cylindrical section 1212, and one or more holes 1217 extending from the aperture 1214 to a second surface (e.g., an annular surface) 1218 of the second cylindrical section 1212 (e.g., opposite the first surface 1216). Stated differently, the aperture 1214 and the hole(s) 1217 provide a fluid passageway through the second cylindrical section 1212 between the first and second surfaces 1216, 1218.

In FIG. 12, a vent line 1220 of the third valve 1200 extends into the piston casing 1208 and/or the aperture 1214. Second fluid from the second variable-pressure location 108 can flow through the aperture 1214 and the hole(s) 1217 and, thus, to a chamber 1224 defined in the piston casing 1208. The vent line 1220 includes first and second openings (e.g., vent holes) 1226, 1228 extending radially through the vent line 1220, and the supply line 1206 includes third and fourth openings (e.g., feed holes) 1230, 1232 extending radially through the supply line 1206.

In FIG. 12, first fluid from the first variable-pressure location 106 applies the first pressure on a third surface 1234 of the third piston 1204, second fluid from the second variable-pressure location 108 apples the second pressure on the second surface 1218 of the third piston 1204, and third fluid from the control volume 110 applies the third pressure on the first surface 1216 of the third piston 1204. In the example of FIG. 12, the third piston 1204 is in a neutral position in which the pressure ratio between the first, second, and third pressures satisfies the target pressure ratio (e.g., represented in example Equation 1 above) and a thrust force balance on the third piston 1204 is substantially zero. The thrust force balance is substantially zero when a first thrust force on the third piston 1204 in a first direction 1236 (e.g., a first longitudinal direction, rightward in FIG. 12) is substantially equal to a second thrust force on the third piston 1204 in a second direction 1238 (e.g., a second longitudinal direction, leftward in FIG. 12) opposite the first direction 1236. The first thrust force is based on the first pressure (e.g., corresponding to the first variable-pressure location 106) and a third surface area of the third surface 1234, and is further based on the second pressure (e.g., corresponding to the second variable-pressure location 108) and a second surface area of the second surface 1218. Additionally, the second thrust force is based on the third pressure (e.g., corresponding to the control volume 110) and a first surface area of the first surface 1216.

When the third piston 1204 is in the neutral position of FIG. 12, the third piston 1204 blocks (e.g., restricts fluid flow through) the first and second openings 1226, 1228 of the vent line 1220 and the third and fourth openings 1230, 1232 of the supply line 1206. As a result, the first fluid from the supply line 1206 is restricted (e.g., prevented) from flowing into the control volume 110 via the third and fourth openings 1230, 1232, and third fluid from the control volume 110 is restricted (e.g., prevented) from flowing to the vent line 1220 via the first and second openings 1226, 1228. The third piston 1204 can move from the neutral position of FIG. 12 when the third pressure in the control volume 110 increases or decreases (e.g., as a result of mass flow into and/or out of the control volume 110), resulting in a non-zero thrust force balance on the third piston 1204.

Figure 13:
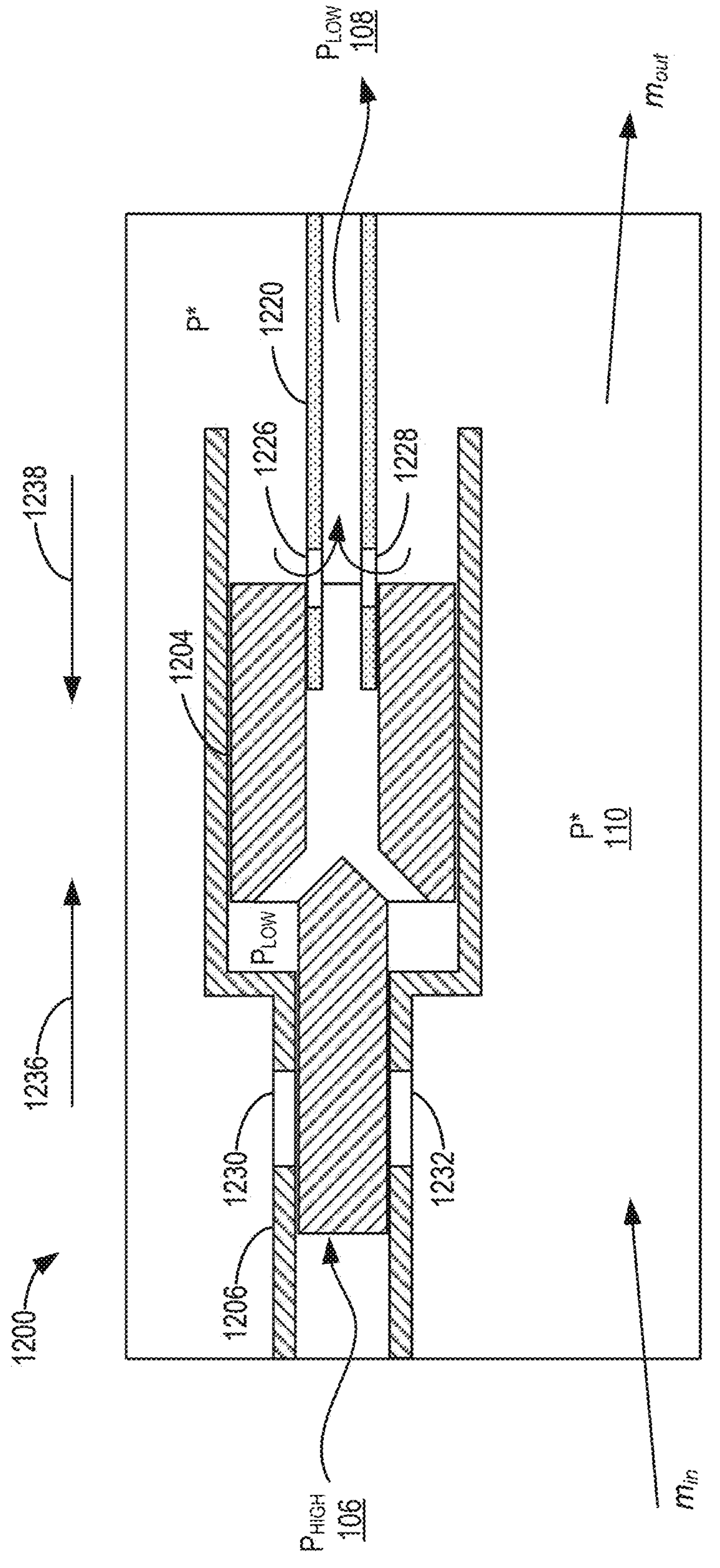
FIG. 13 illustrates the third valve of FIG. 12 with a third piston in a pressure relief position.

FIG. 13 illustrates the third valve 1200 of FIG. 12 with the third piston 1204 in a first position (e.g., a pressure relief position). In some examples, the third piston 1204 moves to the first position of FIG. 13 (e.g., from the neutral position of FIG. 12) when the third pressure in the control volume 110 increases (e.g., such that the first thrust force on the third piston 1204 in the first direction 1236 is less than the second thrust force on the third piston 1204 in the second direction 1238), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 13, when the third piston 1204 is in the first position, the third piston 1204 blocks (e.g., restricts fluid flow through) the third and fourth openings 1230, 1232 of the supply line 1206, and enables fluid flow through the first and second openings 1226, 1228 of the vent line 1220. As a result, the first fluid from the supply line 1206 is restricted (e.g., prevented) from flowing into the control volume 110 via the third and fourth openings 1230, 1232. Further, third fluid from the control volume 110 can flow to the vent line 1220 via the first and second openings 1226, 1228, reducing the third pressure in the control volume 110.

Figure 14:
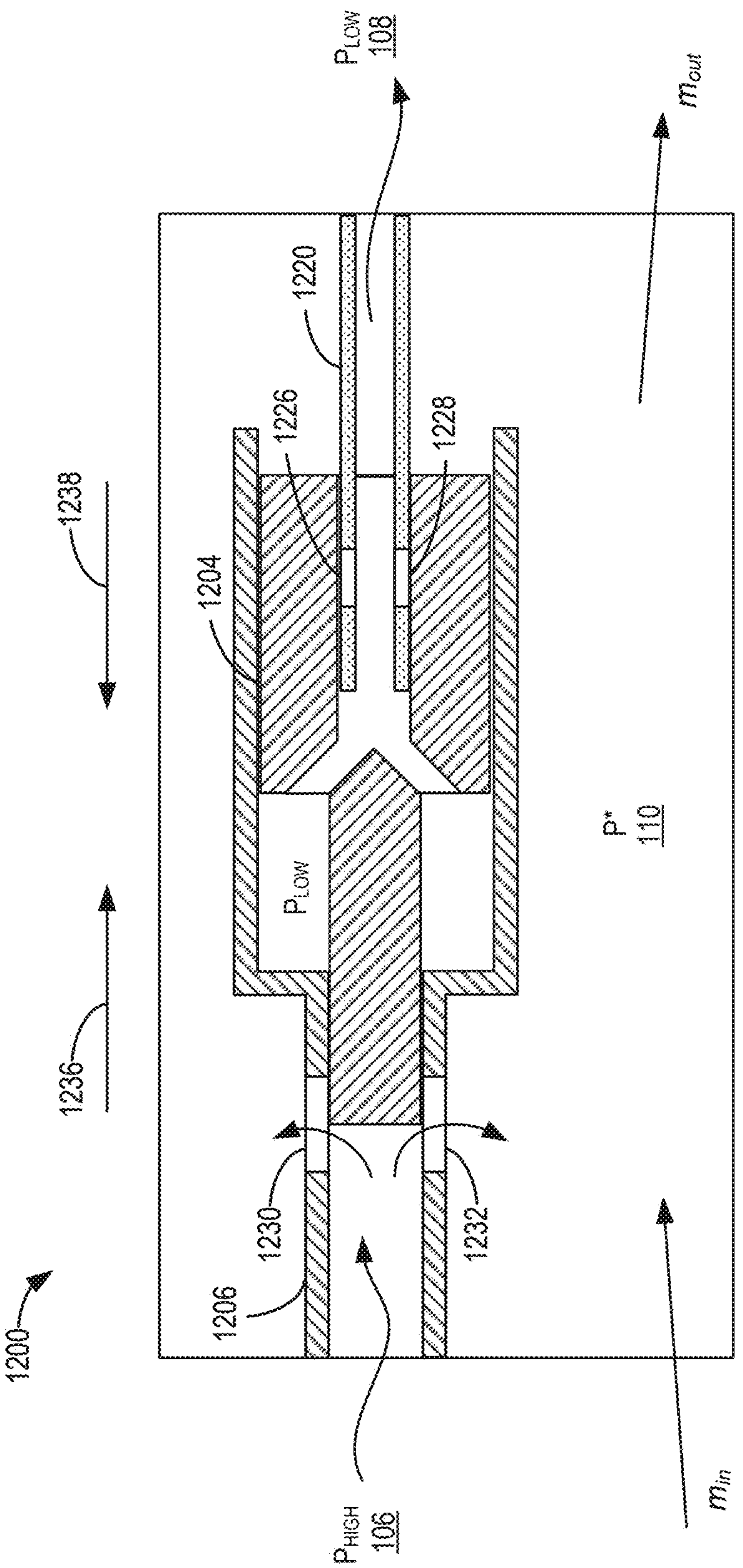
FIG. 14 illustrates the third valve of FIGS. 12 and/or 13 with the third piston in a pressure increase position.

FIG. 14 illustrates the third valve 1200 of FIGS. 12 and/or 13 with the third piston 1204 in a second position (e.g., a pressure increase position). The third piston 1204 moves to the second position of FIG. 14 (e.g., from the neutral position of FIG. 12 and/or the first position of FIG. 13) when the third pressure in the control volume 110 increases (e.g., the first thrust force on the third piston 1204 in the first direction 1236 is greater than the second thrust force on the third piston 1204 in the second direction 1238), such that a target pressure ratio between the first pressure of the first variable-pressure location 106, a second pressure of the second variable-pressure location 108, and the third pressure of the control volume 110 is not satisfied (e.g., an actual pressure ratio differs from the target pressure ratio by a threshold amount).

In FIG. 14, when the third piston 1204 is in the second position, the third piston 1204 blocks (e.g., restricts fluid flow through) the first and second openings 1226, 1228 of the vent line 1220, and enables fluid flow through the third and fourth openings 1230, 1232 of the supply line 1206. As a result, the third fluid from the control volume 110 is restricted (e.g., prevented) from flowing into the vent line 1220 via the first and second openings 1230, 1232. Further, first fluid from the supply line 1206 can flow to the control volume 110 via the third and fourth openings 1230, 1232, increasing the third pressure in the control volume 110.

Figure 15:
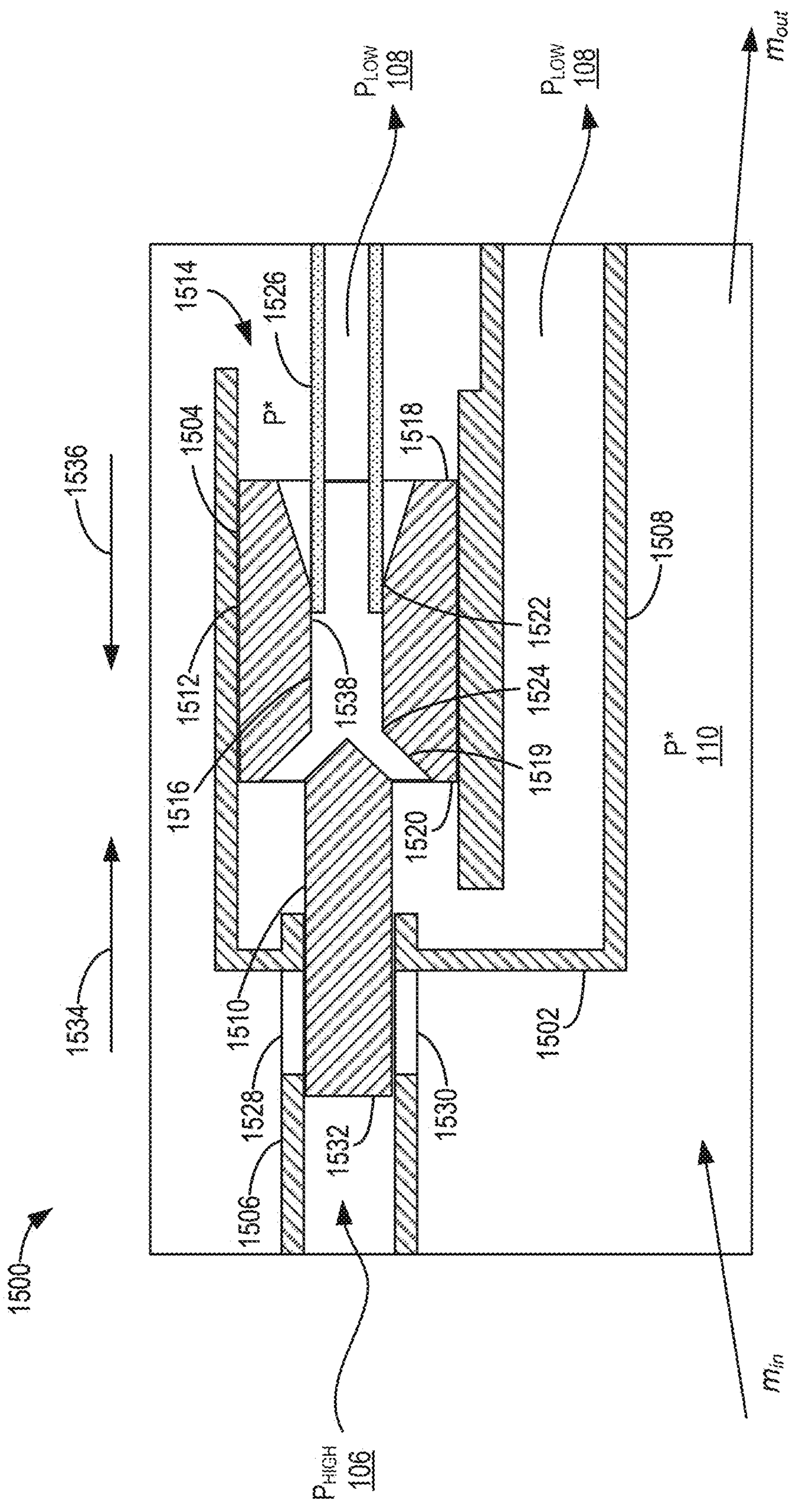
FIG. 15 is a cross-sectional view of a fourth example valve constructed in accordance with teachings of this disclosure.

FIG. 15 is a cross-sectional view of a fourth example valve (e.g., a fourth pressure regulation valve) 1500 constructed in accordance with teachings of this disclosure. The fourth valve 1500 of FIG. 15 can be used in addition to or instead of the first valve 100 of FIGS. 1, 2, and/or 3, the second valve 900 of FIGS. 9, 10, and/or 11, and/or the third valve 1200 of FIGS. 12, 13, and/or 14 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume 110. In FIG. 15, the fourth valve 1500 includes a fourth housing 1502, and a fourth piston 1504 positioned in and/or movable (e.g., slidable, translatable) within the fourth housing 1502.

In FIG. 15, the fourth housing 1502 includes a supply line (e.g., a supply tube) 1506 fluidly coupled to the first variable-pressure location 106, and a first vent line 1508 fluidly coupled to the second variable-pressure location 108. The fourth piston 1504 includes a first cylindrical section 1510 positioned at least partially in the supply line 1506, and a second cylindrical section 1512 positioned in a channel 1514 of the fourth housing 1502. The first cylindrical section 1510 has a first diameter, and the second cylindrical section 1512 has a second diameter greater than the first diameter. Further, the fourth piston 1504 includes an aperture 1516 extending into the second cylindrical section 1512 from a first surface (e.g., a first annular surface) 1518 of the second cylindrical section 1512, and one or more holes 1519 extending from the aperture 1516 to a second surface (e.g., a second annular surface) 1520 of the second cylindrical section 1512 (e.g., opposite the first surface 1518).

In FIG. 15, the aperture 1516 is tapered proximate the first surface 1518. The diameter of the aperture 1516 decreases from the first surface 1518 to a first point 1522 in the second cylindrical section 1512, and the diameter is constant (e.g., not measurably increasing or decreasing) between the first point 1522 and a second point 1524 (e.g., between the first point 1522 and the second surface 1520) in the second cylindrical section 1512. In FIG. 15, a second vent line 1526 of the fourth valve 1500 extends into the channel 1514 and/or the aperture 1516. In some examples, second fluid from the second variable-pressure location 108 can flow between the first and second vent lines 1508, 1526 via the aperture 1516 and the hole(s) 1519. The supply line 1506 includes first and second openings (e.g., feed holes) 1528, 1530 extending radially through the supply line 1506.

In FIG. 15, first fluid from the first variable-pressure location 106 applies the first pressure on a third surface 1532 of the fourth piston 1504, second fluid from the second variable-pressure location 108 apples the second pressure on the second surface 1520 of the fourth piston 1504, and third fluid from the control volume 110 applies the third pressure on the first surface 1518 of the fourth piston 1504. In FIG. 15, the fourth piston 1504 is in a neutral position in which the pressure ratio between the first, second, and third pressures satisfies the target pressure ratio (e.g., represented in example Equation 1 above) and a thrust force balance on the fourth piston 1504 is substantially zero. The thrust force balance is substantially zero when a first thrust force on the fourth piston 1504 in a first direction 1534 (e.g., a first longitudinal direction, rightward in FIG. 15) is substantially equal to a second thrust force on the fourth piston 1504 in a second direction 1536 (e.g., a second longitudinal direction, leftward in FIG. 15) opposite the first direction 1534. The first thrust force is based on the first pressure (e.g., corresponding to the first variable-pressure location 106) and a third surface area of the third surface 1532, and is further based on the second pressure (e.g., corresponding to the second variable-pressure location 108) and a second surface area of the second surface 1520. Additionally, the second thrust force is based on the third pressure (e.g., corresponding to the control volume 110) and a first surface area of the first surface 1518.

When the fourth piston 1504 is in the neutral position of FIG. 15, the fourth piston 1504 blocks (e.g., restricts fluid flow through) the first and second openings 1528, 1530 of the supply line 1506. Additionally, when the fourth piston 1504 is in the neutral position of FIG. 15, the second vent line 1526 contacts an inner surface 1538 (e.g., defining the aperture 1516) of the second cylindrical section 1512. As a result, the first fluid from the supply line 1506 is restricted (e.g., prevented) from flowing into the control volume 110 via the first and second openings 1528, 1530, and third fluid from the control volume 110 is restricted (e.g., prevented) from flowing to the first vent line 1508 and/or the second vent line 1526. The fourth piston 1504 can move from the neutral position of FIG. 15 when the third pressure in the control volume 110 increases or decreases (e.g., as a result of mass flow into and/or out of the control volume 110), resulting in a non-zero thrust force balance on the fourth piston 1504.

Figure 16:
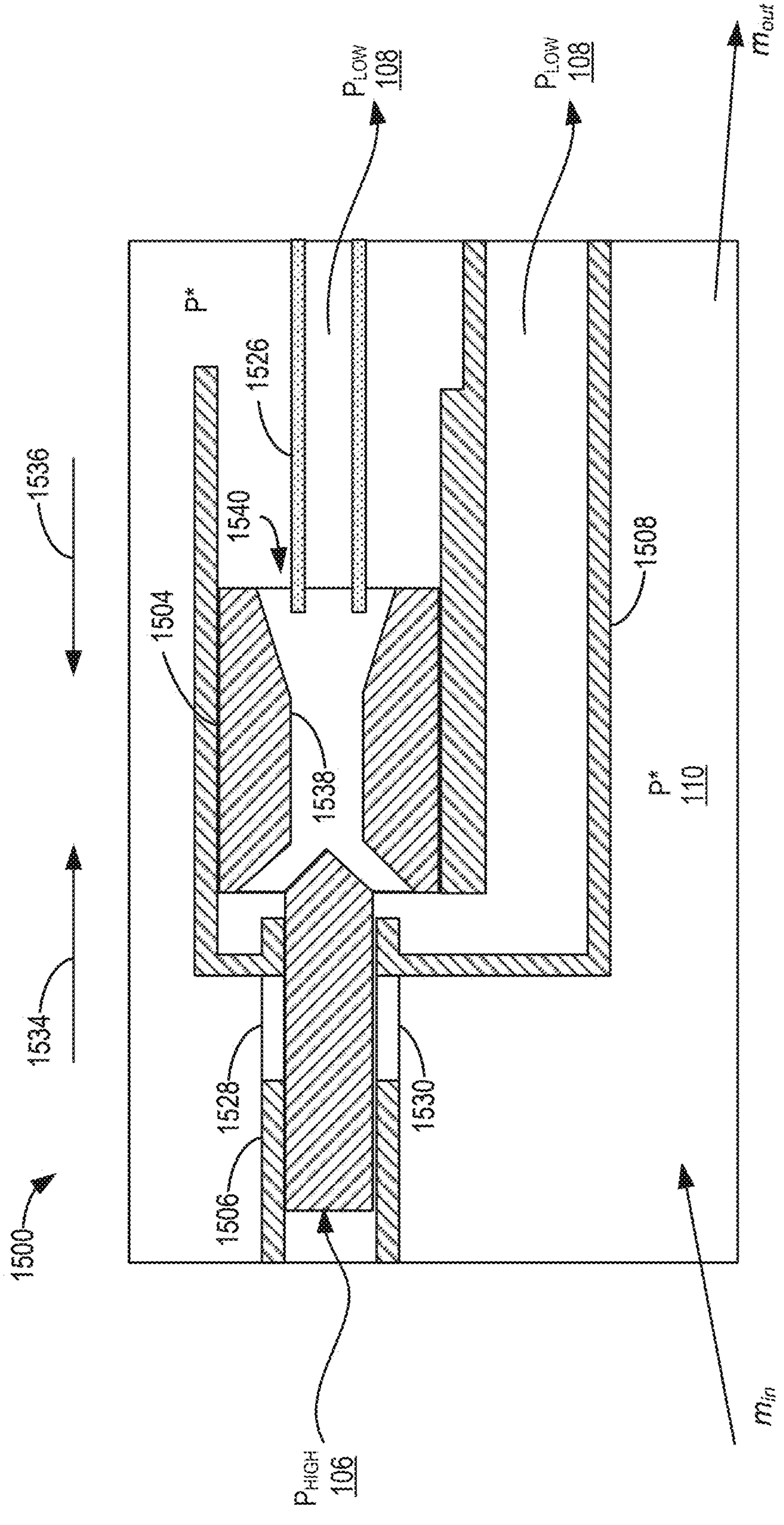
FIG. 16 illustrates the fourth valve of FIG. 15 with a fourth piston in a pressure relief position.

FIG. 16 illustrates the fourth valve 1500 of FIG. 15 with the fourth piston 1504 in a first position (e.g., a pressure relief position). In some examples, the fourth piston 1504 moves to the first position of FIG. 16 (e.g., from the neutral position of FIG. 15) when the third pressure in the control volume 110 increases (e.g., such that the first thrust force on the fourth piston 1504 in the first direction 1534 is less than the second thrust force on the fourth piston 1504 in the second direction 1536), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 16, when the fourth piston 1504 is in the first position, the fourth piston 1504 blocks (e.g., restricts fluid flow through) the first and second openings 1528, 1530 of the supply line 1506. Further, when the fourth piston 1504 is in the first position of FIG. 16, the second vent line 1526 is spaced apart from (e.g., does not contact) the inner surface 1538 of the fourth piston 1504. As a result, the first fluid from the supply line 1506 is restricted (e.g., prevented) from flowing into the control volume 110 via the first and second openings 1528, 1530. Further, third fluid from the control volume 110 can flow to the first vent line 1508 and/or the second vent line 1526 via a gap 1540 between the second vent line 1526 and the inner surface 1538 and, as a result, can reduce the third pressure in the control volume 110.

Figure 17:
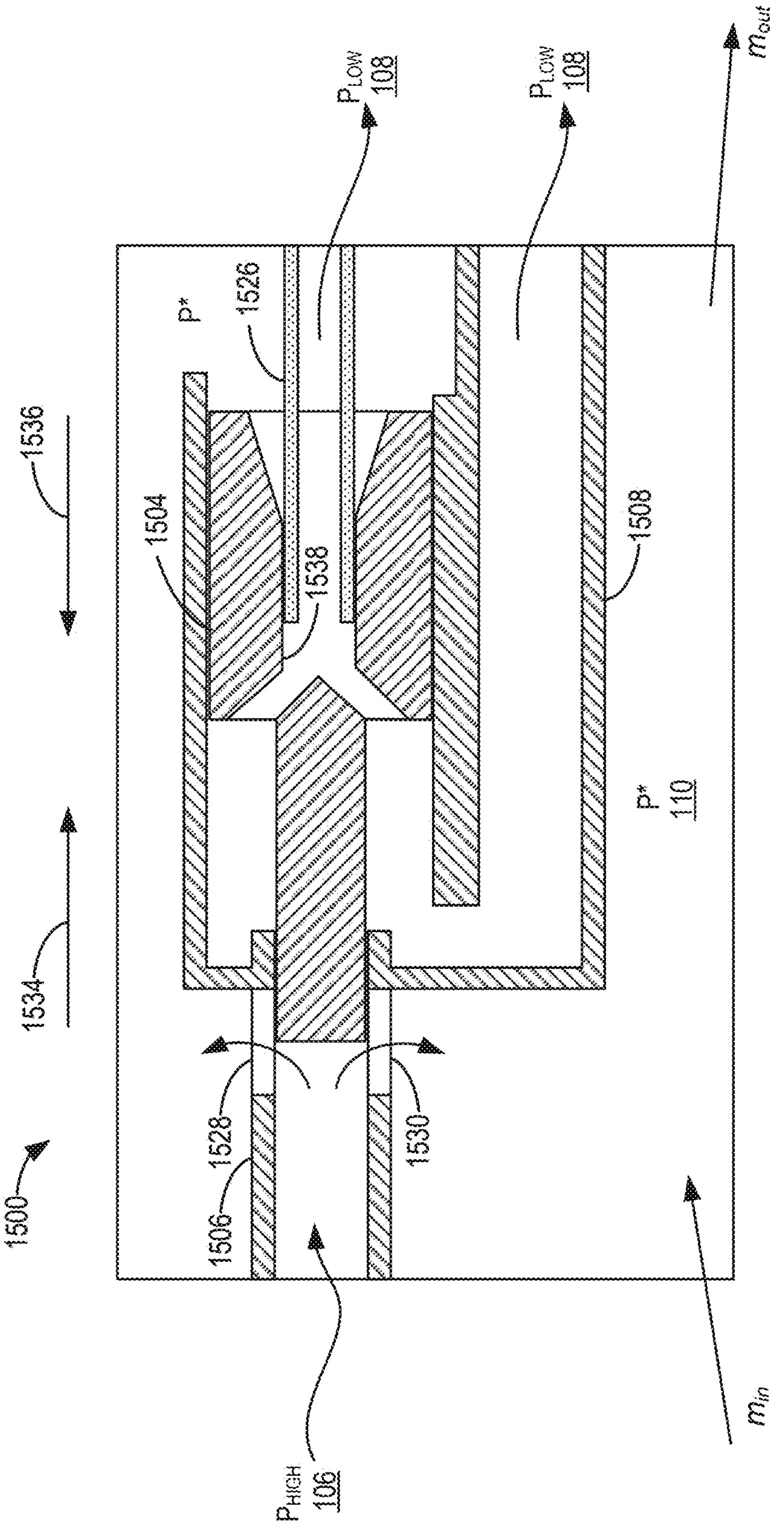
FIG. 17 illustrates the fourth valve of FIGS. 15 and/or 16 with the fourth piston in a pressure increase position.

FIG. 17 illustrates the fourth valve 1500 of FIGS. 15 and/or 16 with the fourth piston 1504 in a second position (e.g., a pressure increase position). The fourth piston 1504 moves to the first position of FIG. 17 (e.g., from the neutral position of FIG. 15 and/or the first position of FIG. 16) when the third pressure in the control volume 110 decreases (e.g., such that the first thrust force on the fourth piston 1504 in the first direction 1534 is greater than the second thrust force on the fourth piston 1504 in the second direction 1536), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 17, when the fourth piston 1504 is in the second position, the fourth piston 1504 enables fluid flow through the first and second openings 1528, 1530 of the supply line 1506. Further, when the fourth piston 1504 is in the second position of FIG. 17, the second vent line 1526 contacts the inner surface 1538 of the fourth piston 1504. As a result, the third fluid from the control volume 110 is restricted (e.g., prevented) from flowing into the first vent line 1508 and/or the second vent line 1526. Further, first fluid from the supply line 1506 can flow to the control volume 110 via the first and second openings 1528, 1530, increasing the third pressure in the control volume 110.

Figure 18:
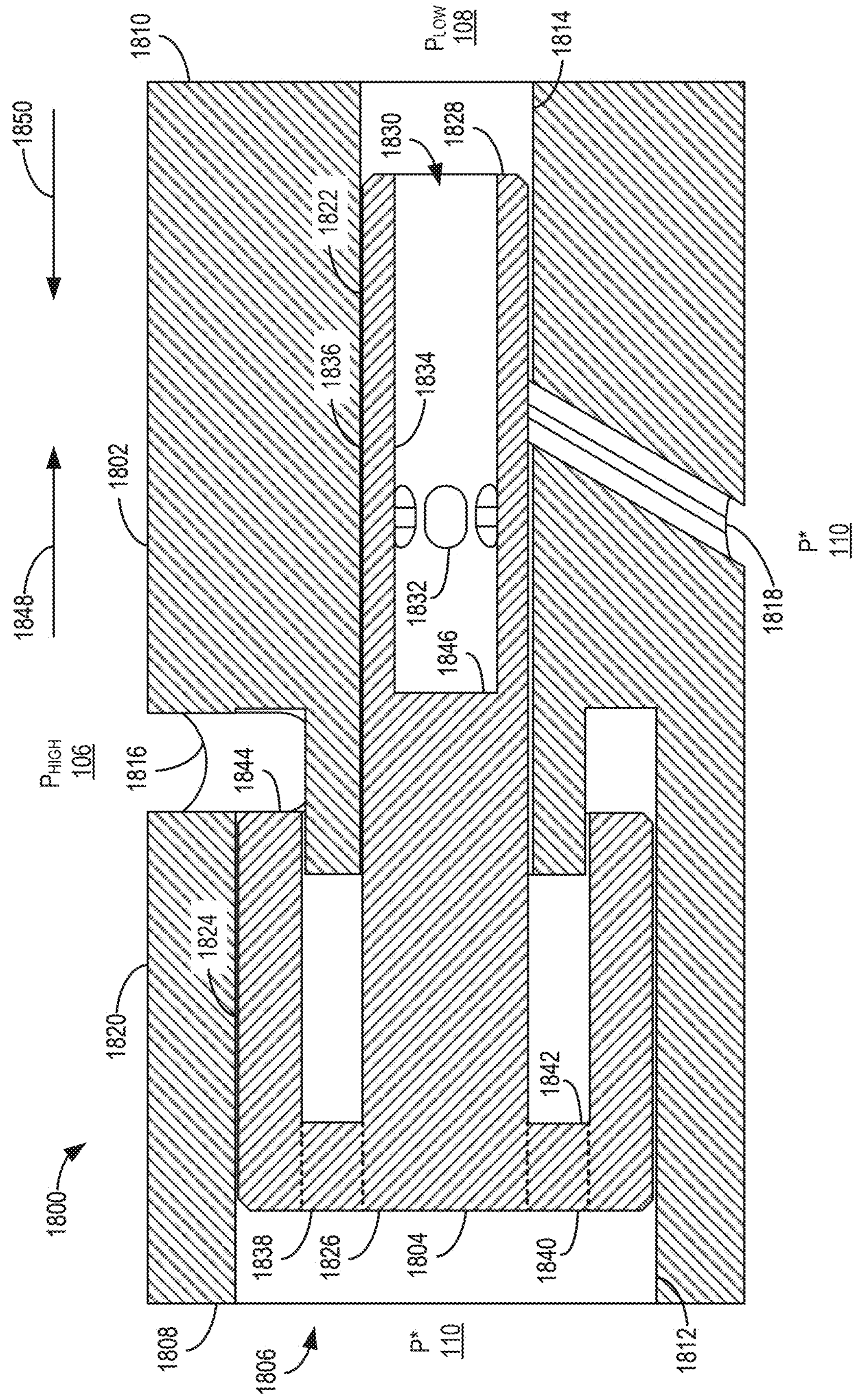
FIG. 18 is a cross-sectional view of a fifth example valve constructed in accordance with teachings of this disclosure.

FIG. 18 is a cross-sectional view of a fifth example valve (e.g., a fifth pressure regulation valve) 1800 constructed in accordance with teachings of this disclosure. The fifth valve 1800 of FIG. 18 can be used in addition to or instead of the first valve 100 of FIGS. 1, 2, and/or 3, the second valve 900 of FIGS. 9, 10, and/or 11, the third valve 1200 of FIGS. 12, 13, and/or 14, and/or the fourth valve 1500 of FIGS. 15, 16, and/or 17 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume 110. In FIG. 18, the fifth valve 1800 includes a fifth housing 1802, and a fifth piston 1804 positioned in and/or movable (e.g., slidable, translatable) within the fifth housing 1802.

In FIG. 18, the fifth housing 1802 includes a through-hole 1806 extending between first and second ends 1808, 1810 of the fifth housing 1802. A first portion 1812 of the through-hole 1806 has a first diameter, and a second portion 1814 of the through-hole 1806 has a second diameter less than the first diameter. Further, the fifth housing 1802 includes a first port 1816 extending from an outer surface 1820 of the fifth housing 1802 to the first portion 1812 of the through-hole 1806, and includes a second port 1818 extending from the outer surface 1820 to the second portion 1814 of the through-hole 1806. In some examples, the first port 1816 is to receive first fluid from the first variable-pressure location 106, and the second port 1818 is to receive third fluid from the control volume 110. Additionally, the first portion 1812 of the through-hole 1806 is to receive the third fluid (e.g., from the control volume 110) at the first end 1808 of the fifth housing 1802, and the second portion 1814 of the through-hole 1806 is to receive second fluid (e.g., from the second variable-pressure location 108) at the second end 1810 of the fifth housing 1802.

In FIG. 18, the fifth piston 1804 includes an inner portion (e.g., an inner cylindrical portion, a stem) 1822 and an outer portion (e.g., an outer cylindrical portion) 1824 extending from the inner portion 1822 at a third end 1826 of the fifth piston 1804. In this example, the inner portion 1822 is positioned in and movable (e.g., slidable, translatable) within the second portion 1814 of the through-hole 1806, and the outer portion 1824 is positioned in and movable (e.g., slidable, translatable) within the first portion 1812 of the through-hole 1806. At a fourth end 1828 of the fifth piston 1804 (e.g., opposite the third end 1826), the fifth piston 1804 includes an aperture 1830 extending a distance into the inner portion 1822 (e.g., where the distance is less than a length of the fifth piston 1804). Further, the fifth piston 1804 includes vent holes 1832 extending between inner and outer surfaces 1834, 1836 of the inner portion 1822. The vent holes 1832 are spaced along a circumference of the inner portion 1822. While three of the vent holes 1832 are shown in this example, a different number of the vent holes 1832 may be used instead (e.g., one, two, four or more, etc.).

Figure 19:
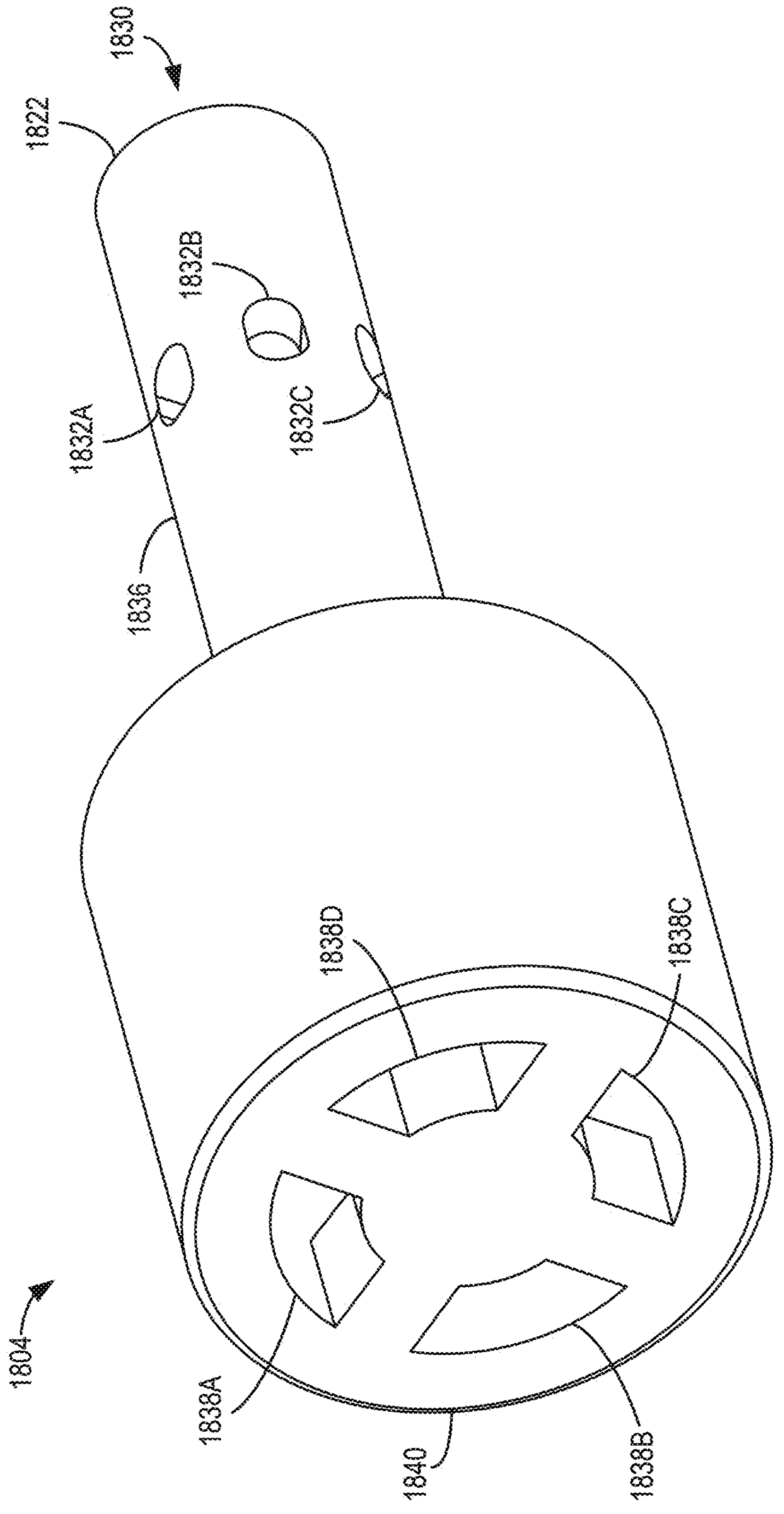
FIG. 19 is a perspective view of a fifth piston of the fifth valve of FIG. 18.

In FIG. 18, the fifth piston 1804 includes one or more supply holes 1838 at the third end 1826 of the fifth piston 1804, where the supply holes 1838 extend from a first surface 1840 to a second surface (e.g., an annular surface) 1842 (e.g., between the inner and outer portions 1822, 1824) of the fifth piston 1804. Further, FIG. 19 is a perspective view of the fifth piston 1804 of FIG. 18. In FIG. 19, the fifth piston 1804 includes four of the supply holes 1838 (e.g., a first supply hole 1838A, a second supply hole 1838B, a third supply hole 1838C, and a fourth supply hole 1838D) in the first surface 1840 of the fifth piston 1804. In some examples, a different number of the supply holes 1838 may be used instead (e.g., three or less, five or more). A cross-sectional shape of the supply holes 1838 corresponds to an annular sector. In some examples, the cross-sectional shape of the supply holes 1838 may be different (e.g., circular, rectangular, etc.).

In FIG. 19, the vent holes 1832 (e.g., a first vent hole 1832A, a second vent hole 1832B, and a third vent hole 1832C) are shown in the outer surface 1836 of the inner portion 1822 of the fifth piston 1804. The vent holes 1832 can be positioned in diametrically-opposed pairs along a circumference of the inner portion 1822. The inner portion 1822 can further include fourth, fifth, and sixth vent holes (not shown), where the fourth vent hole is diametrically-opposed to the first vent hole 1832A, the fifth vent hole is diametrically-opposed to the second vent hole 1832B, and the sixth vent hole 1832C is diametrically-opposed to the third vent hole 1832C. In some examples, fluid entering the aperture 1830 can exit via one(s) of the vent holes 1832 to apply a radial pressure on the fifth housing 1802 of FIG. 18. By positioning the vent holes 1832 of FIG. 19 in diametrically-opposed pairs, the radial pressure can be evenly distributed along a circumference of the through-hole 1806 of FIG. 18. As a result, a radial thrust balance on the fifth housing 1802 is substantially zero, reducing risk of lockup of the fifth piston 1804 in the through-hole 1806 of FIG. 18.

Returning to FIG. 18, first fluid from the first variable-pressure location 106 enters the first port 1816 and applies a first pressure on a third surface 1844 of the fifth piston 1804, second fluid from the second variable-pressure location 108 enters the aperture 1830 and applies a second pressure on a fourth surface 1846 of the fifth piston 1804, and third fluid from the control volume 110 applies a third pressure on the first surface 1840 of the fifth piston 1804. In FIG. 18, the fifth piston 1804 is in a neutral position in which the pressure ratio between the first, second, and third pressures satisfies the target pressure ratio (e.g., represented in example Equation 1 above) and a thrust force balance on the fifth piston 1804 is substantially zero. The thrust force balance is substantially zero when a first thrust force on the fifth piston 1804 in a first direction 1848 (e.g., a first longitudinal direction, rightward in FIG. 18) is substantially equal to a second thrust force on the fifth piston 1804 in a second direction 1850 (e.g., a second longitudinal direction, leftward in FIG. 18) opposite the first direction 1848. The first thrust force is based on the third pressure (e.g., corresponding to the control volume 110) and a first surface area of the first surface 1840. Additionally, the second thrust force is based on the first pressure (e.g., corresponding to the first variable-pressure location 106) and a third surface area of the third surface 1844, and is further based on the second pressure (e.g., corresponding to the second variable-pressure location 108) and a fourth surface area of the fourth surface 1846.

When the fifth piston 1804 is in the neutral position of FIG. 18, the fifth piston 1804 restricts and/or prevents fluid flow between the first port 1816 and the control volume 110. Additionally, when the fifth piston 1804 is in the neutral position of FIG. 18, the fifth piston 1804 restricts and/or prevents fluid flow between the control volume 110 and the second variable-pressure location 108. The fifth piston 1804 can move from the neutral position of FIG. 18 when the third pressure in the control volume 110 increases or decreases (e.g., as a result of mass flow into and/or out of the control volume 110), resulting in a non-zero thrust force balance on the fifth piston 1804.

Figure 20:
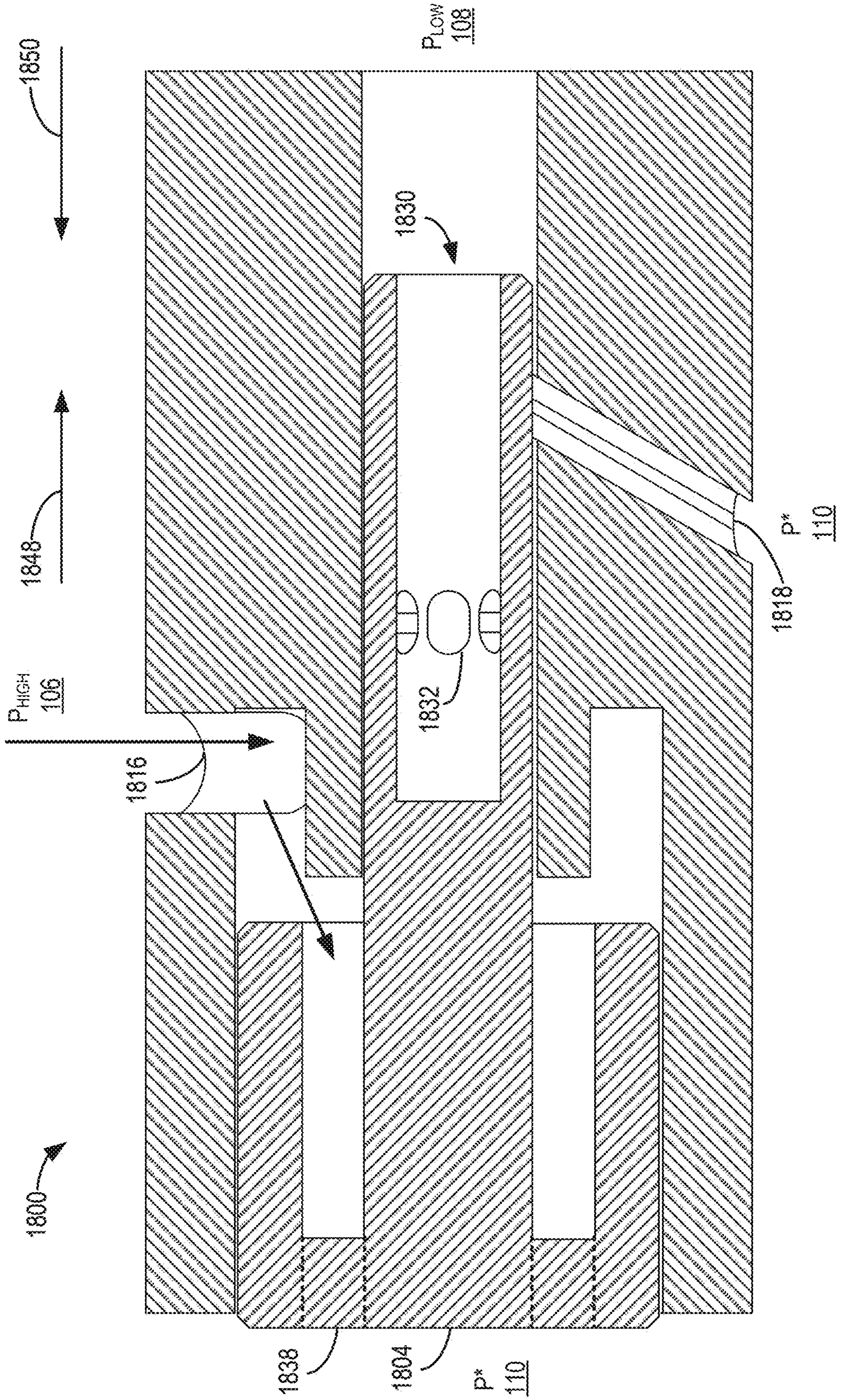
FIG. 20 illustrates the fifth valve of FIG. 18 with the fifth piston in a pressure increase position.

FIG. 20 illustrates the fifth valve 1800 of FIG. 18 with the fifth piston 1804 in a first position (e.g., a pressure increase position). The fifth piston 1804 moves to the first position of FIG. 20 (e.g., from the neutral position of FIG. 18) when the third pressure in the control volume 110 decreases (e.g., such that the first thrust force on the fifth piston 1804 in the first direction 1848 is less than the second thrust force on the fifth piston 1804 in the second direction 1850), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 20, when the fifth piston 1804 is in the first position, the fifth piston 1804 enables fluid flow through the supply holes 1838 (e.g., from the first port 1816 to the control volume 110). Further, when the fifth piston 1804 is in the first position of FIG. 20, the third fluid from the control volume 110 is restricted (e.g., prevented) from flowing (e.g., via the vent holes 1832 and/or the aperture 1830) from the second port 1818 to the second variable-pressure location 108. In FIG. 20, first fluid from the first variable-pressure location 106 can flow to the control volume 110 via the supply holes 1838 and, as a result, can increase the third pressure in the control volume 110.

Figure 21:
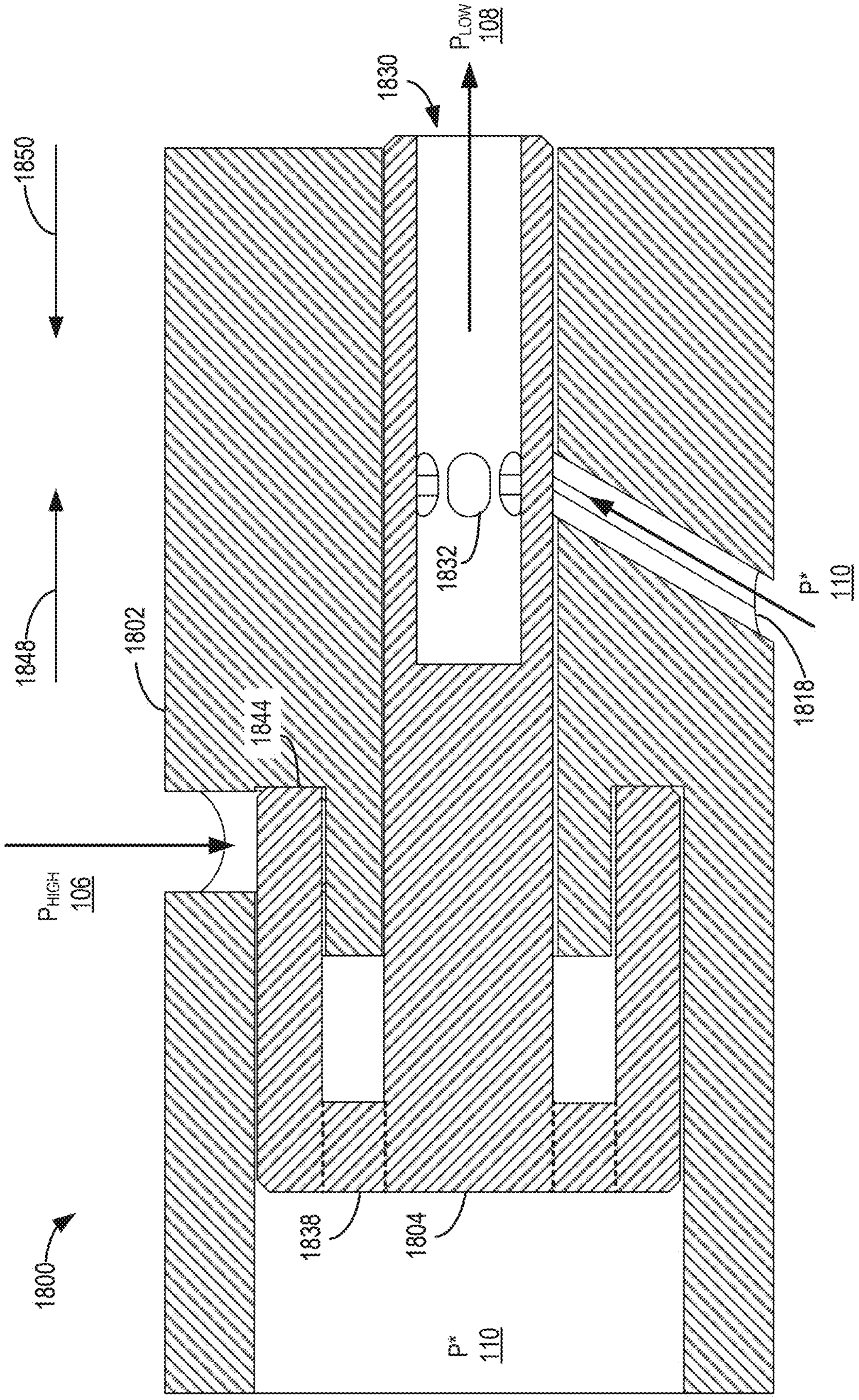
FIG. 21 illustrates the fifth valve of FIGS. 18 and/or 20 with the fifth piston in a pressure relief position.

FIG. 21 illustrates the fifth valve 1800 of FIGS. 18 and/or 20 with the fifth piston 1804 in a second position (e.g., a pressure relief position). The fifth piston 1804 moves to the second position of FIG. 21 (e.g., from the neutral position of FIG. 18 and/or from the first position of FIG. 20) when the third pressure in the control volume 110 increases (e.g., such that the first thrust force on the fifth piston 1804 in the first direction 1848 is greater than the second thrust force on the fifth piston 1804 in the second direction 1850), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 21, when the fifth piston 1804 is in the second position, the fifth piston 1804 restricts and/or prevents flow of first fluid from the first variable-pressure location 106 to the control volume 110 (e.g., via the supply holes 1838). The third surface 1844 of the fifth piston 1804 contacts the fifth housing 1802 to prevent further movement of the fifth piston 1804 in the first direction 1848. Further, when the fifth piston 1804 is in the second position of FIG. 21, one(s) of the vent holes 1832 overlap and/or are substantially aligned with the second port 1818. As a result, third fluid from the control volume 110 can flow to the second variable-pressure location 108 via the second port 1818, the supply hole(s) 1838, and the aperture 1830 and, as a result, can reduce the third pressure in the control volume 110.

Figure 22:
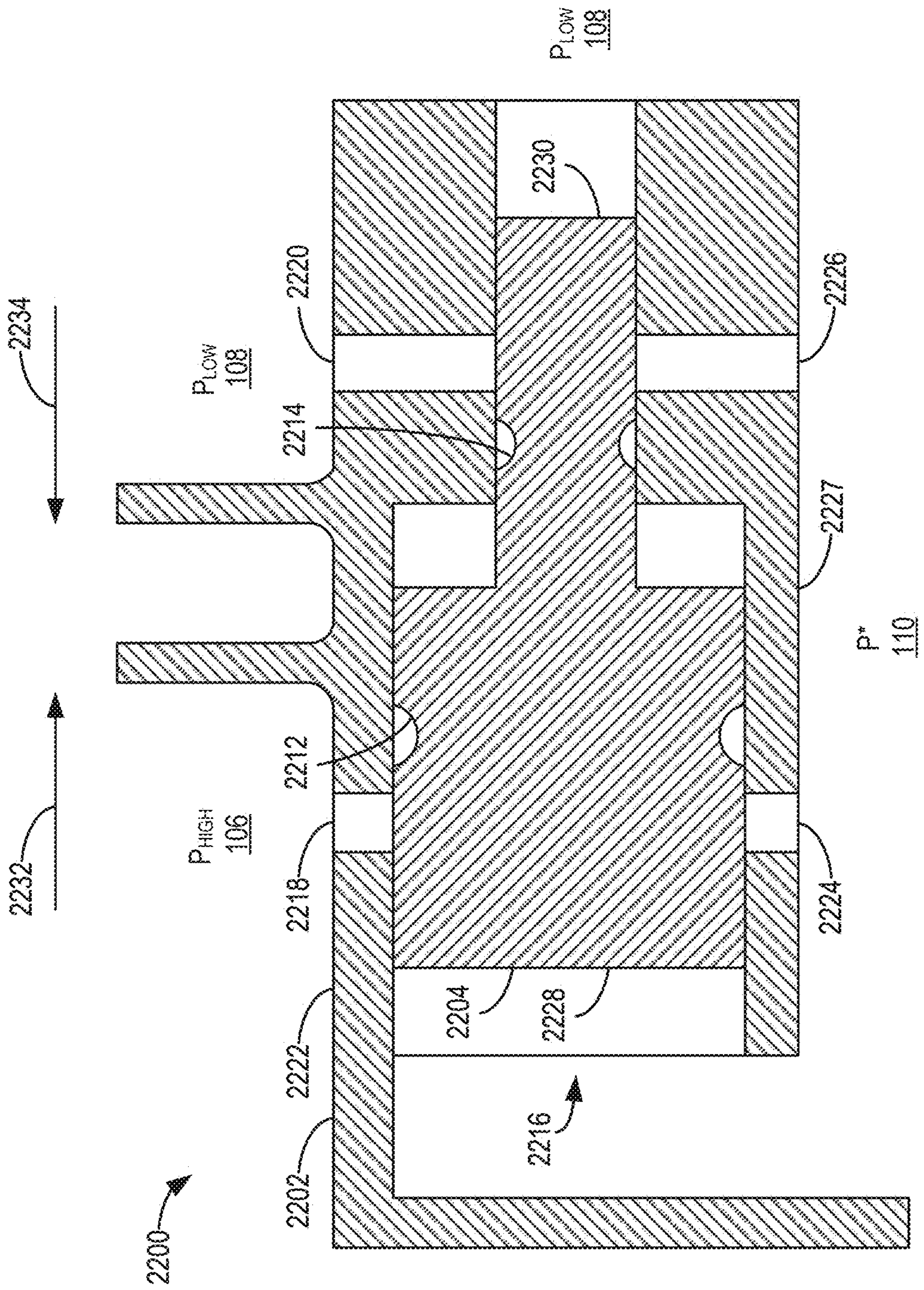
FIG. 22 is a cross-sectional view of a sixth example valve constructed in accordance with teachings of this disclosure.

FIG. 22 is a cross-sectional view of a sixth example valve (e.g., a sixth pressure regulation valve) 2200 constructed in accordance with teachings of this disclosure. The sixth valve 2200 of FIG. 22 can be used in addition to or instead of the first valve 100 of FIGS. 1, 2, and/or 3, the second valve 900 of FIGS. 9, 10, and/or 11, the third valve 1200 of FIGS. 12, 13, and/or 14, the fourth valve 1500 of FIGS. 15, 16, and/or 17, and/or the fifth valve 1800 of FIGS. 18, 20, and/or 21 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume 110. In FIG. 22, the sixth valve 2200 includes a sixth housing 2202, and a sixth piston (e.g., a stepped piston, a sixth control body) 2204 positioned in and/or movable (e.g., slidable, translatable) within the sixth housing 2202.

Figure 23:
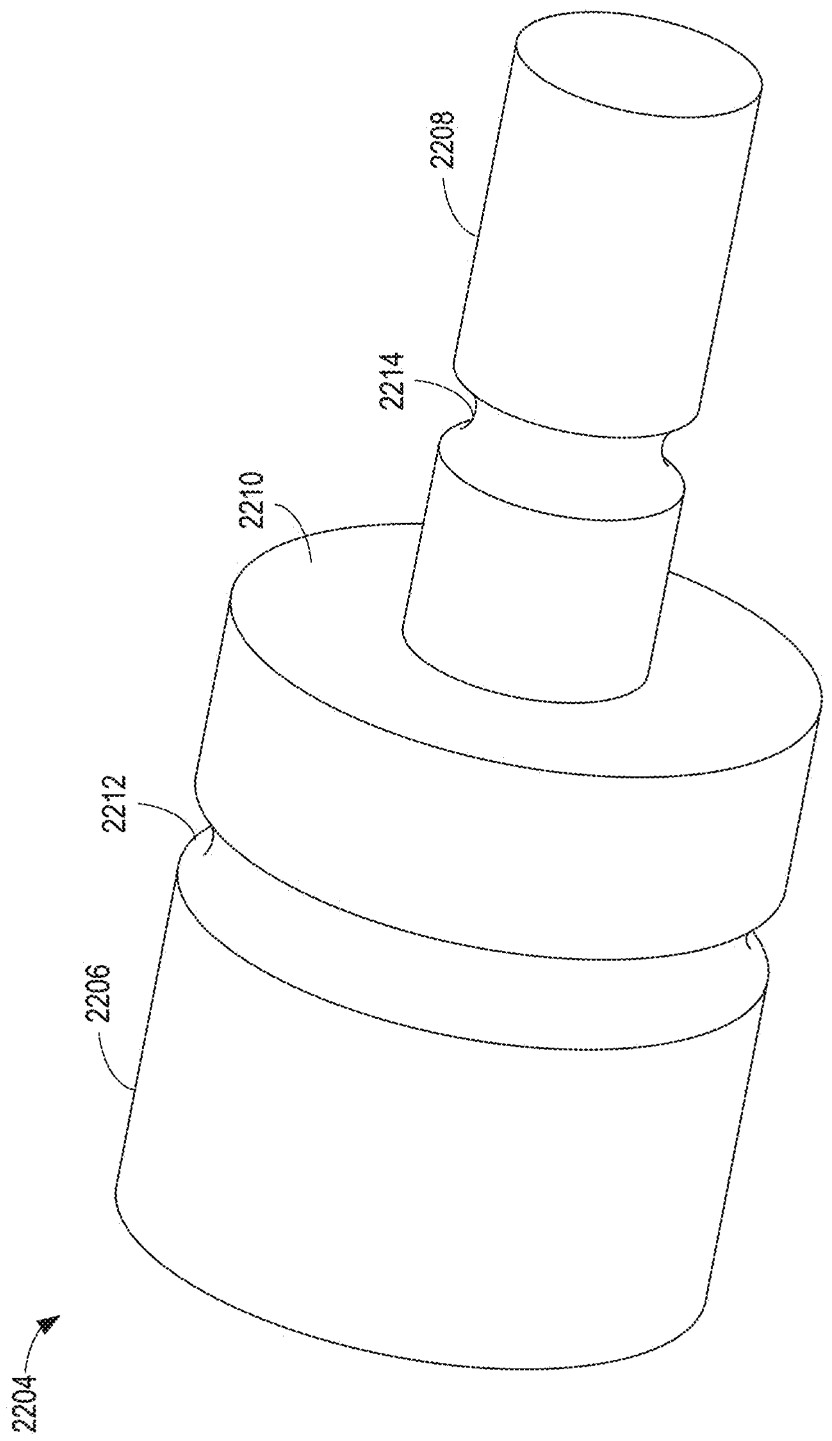
FIG. 23 is a perspective view of a sixth piston of the sixth valve of FIG. 22.

FIG. 23 is a perspective view of the sixth piston 2204 of the sixth valve 2200 of FIG. 22. In FIG. 23, the sixth piston 2204 includes a first cylindrical section 2206, and a second cylindrical section 2208 extending from an annular surface 2210 of the first cylindrical section 2206. A first diameter of the first cylindrical section 2206 is greater than a second diameter of the second cylindrical section 2208. In FIG. 23, a first groove 2212 is defined in a first surface of the first cylindrical section 2206 and extends along a first circumference of the first cylindrical section 2206. Similarly, a second groove 2214 is defined in a second surface of the second cylindrical section 2208 and extends along a second circumference of the second cylindrical section 2208. The first and second grooves 2212, 2214 have a semicircular and/or rounded shape. In some examples, a shape of the first groove 2212 and/or the second groove 2214 may be different (e.g., square, triangular, etc.).

Returning to FIG. 22, the sixth piston 2204 is positioned in a channel 2216 defined in the sixth housing 2202. The sixth housing 2202 includes a first port 2218 and a second port 2220 extending between the channel 2216 and a first surface 2222 of the sixth housing 2202. Further, the sixth housing 2202 includes a third port 2224 and a fourth port 2226 extending between the channel 2216 and a second surface 2227 of the sixth housing 2202. The first port 2218 is fluidly coupled to the first variable-pressure location 106, the second port 2220 is fluidly coupled to the second variable-pressure location 108, and the third and fourth ports 2224, 2226 are fluidly coupled to the control volume 110.

In FIG. 22, a third surface 2228 of the sixth piston 2204 is exposed to the third pressure from the control volume 110, and a fourth surface 2230 of the sixth piston 2204 (e.g., opposite the third surface 2228) is exposed to the second pressure from the second variable-pressure location 108. As a result of the second and third pressures being applied on the respective third surfaces 2228, 2230 of the sixth piston 2204, a first force (e.g., a first trust force) is applied on the sixth piston 2204 in a first direction 2232 (e.g., rightward in FIG. 22), and a second force (e.g., a second thrust force) is applied on the sixth piston 2204 in a second direction 2234 (e.g., leftward in FIG. 22) opposite the first direction 2232. The first force is based on the third pressure in the control volume 110 and a third surface area of the third surface 2228. Further, the second force is based on the second pressure of the second variable-pressure location 108 and a fourth surface area of the fourth surface 2230. In some examples, the sixth piston 2204 is sized such that a thrust balance on the sixth piston 2204 is approximately zero (e.g., the first force in the first direction 2232 is substantially equal to the second force in the second direction 2234) when the pressure ratio is substantially equal to the target pressure ratio (e.g., represented in example Equation 1 above).

In FIG. 22, the sixth piston 2204 is in a neutral position in which the pressure ratio between the first, second, and third pressures satisfies the target pressure ratio and a thrust force balance on the fifth piston 1804 (e.g., a net difference between the first force in the first direction 2232 and the second force in the second direction 2234) is substantially zero. When the sixth piston 2204 is in the neutral position of FIG. 22, the sixth piston 2204 restricts and/or prevents fluid flow into and/or out of the channel 2216 via the ports 2218, 2220, 2224, 2226. As a result, the sixth piston 2204 restricts and/or prevents fluid flow from the first variable-pressure location 106 to the control volume 110, and/or from the control volume 110 to the second variable-pressure location 108. The sixth piston 2204 can move from the neutral position of FIG. 22 when the third pressure in the control volume 110 increases or decreases (e.g., as a result of mass flow into and/or out of the control volume 110), resulting in a non-zero thrust force balance on the sixth piston 2204.

Figure 24:
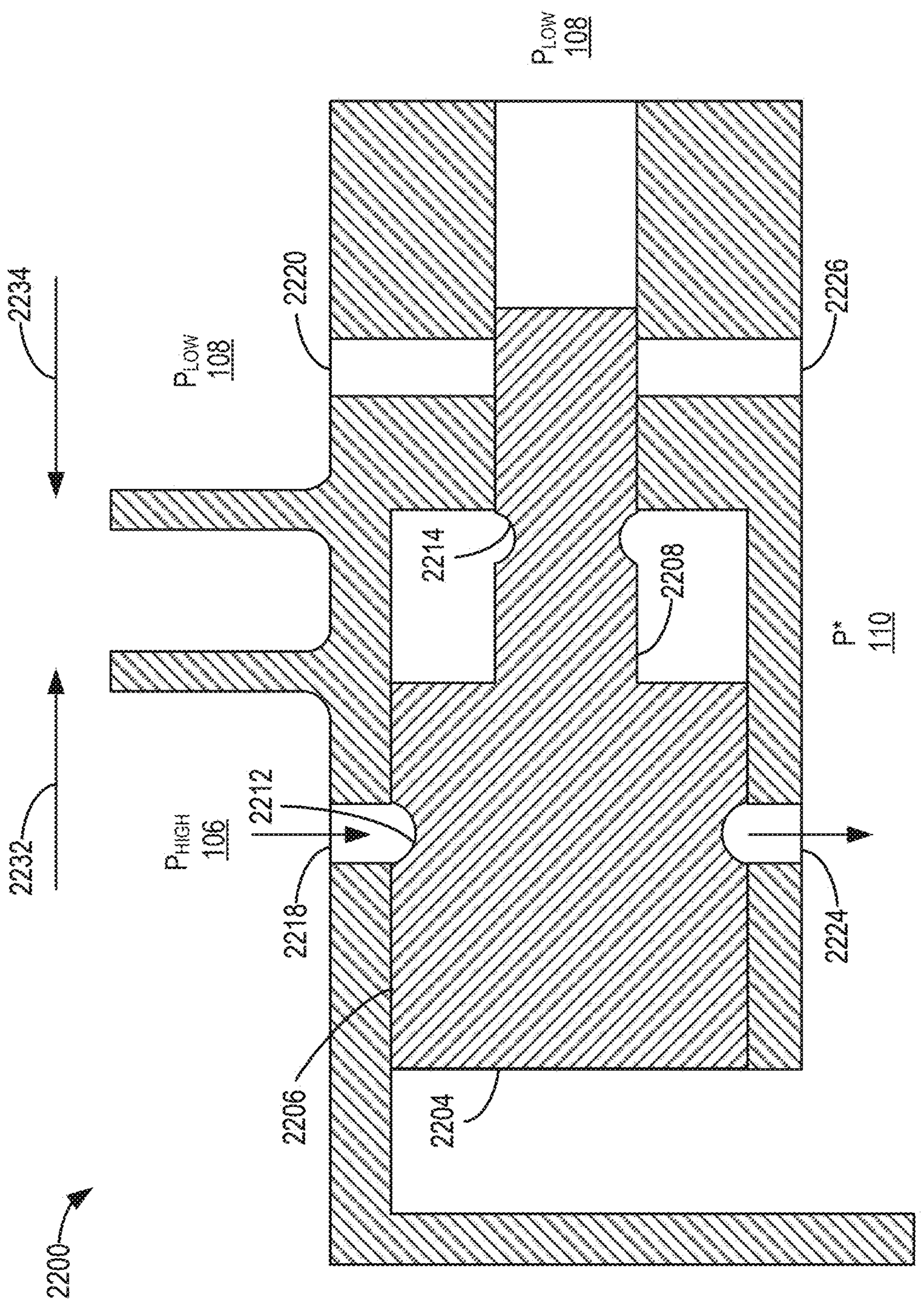
FIG. 24 illustrates the sixth valve of FIG. 22 with the sixth piston in a pressure increase position.

FIG. 24 illustrates the sixth valve 2200 of FIG. 22 with the sixth piston 2204 in a first position (e.g., a pressure increase position). The sixth piston 2204 moves to the first position of FIG. 24 (e.g., from the neutral position of FIG. 22) when the third pressure in the control volume 110 decreases (e.g., such that the first thrust force on the sixth piston 2204 in the first direction 2232 is less than the second thrust force on the sixth piston 2204 in the second direction 2234), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 24, when the sixth piston 2204 is in the first position, the first groove 2212 of the first cylindrical section 2206 overlaps with (e.g., is aligned with) the first and third ports 2218, 2224, such that the first and third ports 2218, 2224 are fluidly coupled via the first groove 2212. Conversely, the second groove 2214 of the second cylindrical section 2208 is offset from (e.g., does not overlap) the second and fourth ports 2220, 2226, such that the second cylindrical section 2208 restricts and/or prevents fluid flow between the second and fourth ports 2220, 2226 and, thus, between the second variable-pressure location 108 and the control volume 110. Further, when the sixth piston 2204 is in the first position of FIG. 24, first fluid from the first variable-pressure location 106 can flow to the control volume 110 via the first groove 2212 and, as a result, can increase the third pressure in the control volume 110.

Figure 25:
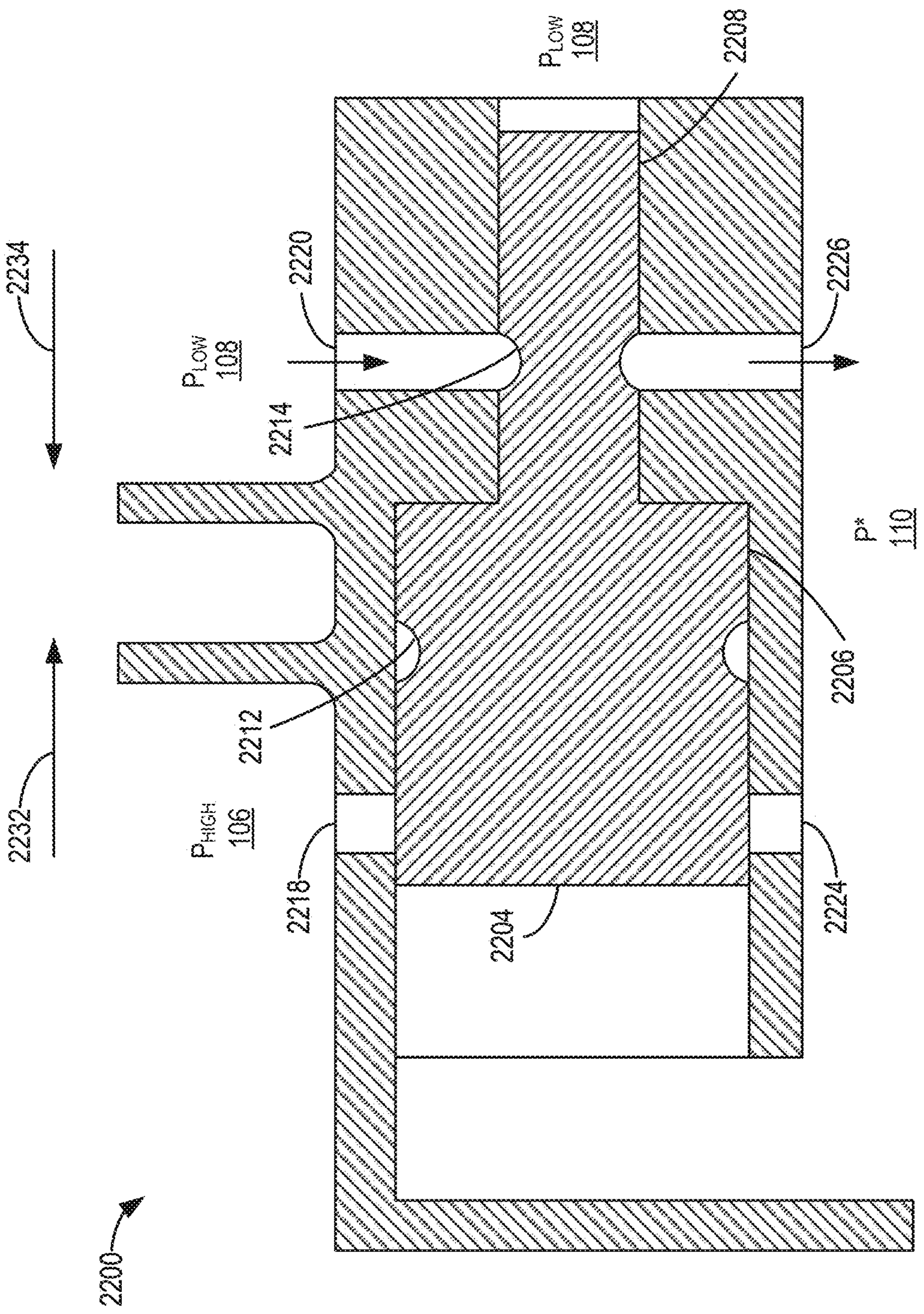
FIG. 25 illustrates the sixth valve of FIGS. 22 and/or 24 with the sixth piston in a pressure relief position.

FIG. 25 illustrates the sixth valve 2200 of FIGS. 22 and/or 24 with the sixth piston 2204 in a second position (e.g., a pressure relief position). The sixth piston 2204 moves to the second position of FIG. 25 (e.g., from the neutral position of FIG. 22 and/or the first position of FIG. 24) when the third pressure in the control volume 110 increases (e.g., such that the first thrust force on the sixth piston 2204 in the first direction 2232 is greater than the second thrust force on the sixth piston 2204 in the second direction 2234), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 25, when the sixth piston 2204 is in the second position, the second groove 2214 of the second cylindrical section 2208 overlaps with the second and fourth ports 2220, 2226, such that the second and fourth ports 2220, 2226 are fluidly coupled via the second groove 2214. Conversely, the first groove 2212 of the first cylindrical section 2206 is offset from (e.g., does not overlap) the first and third ports 2218, 2224, such that the first cylindrical section 2206 restricts and/or prevents fluid flow between the first and third ports 2218, 2224 and, thus, between the first variable-pressure location 106 and the control volume 110. Further, when the sixth piston 2204 is in the second position of FIG. 25, third fluid from the control volume 110 can flow to the second variable-pressure location 108 via the second groove 2214 and, as a result, can reduce the third pressure in the control volume 110.

Figure 26B:
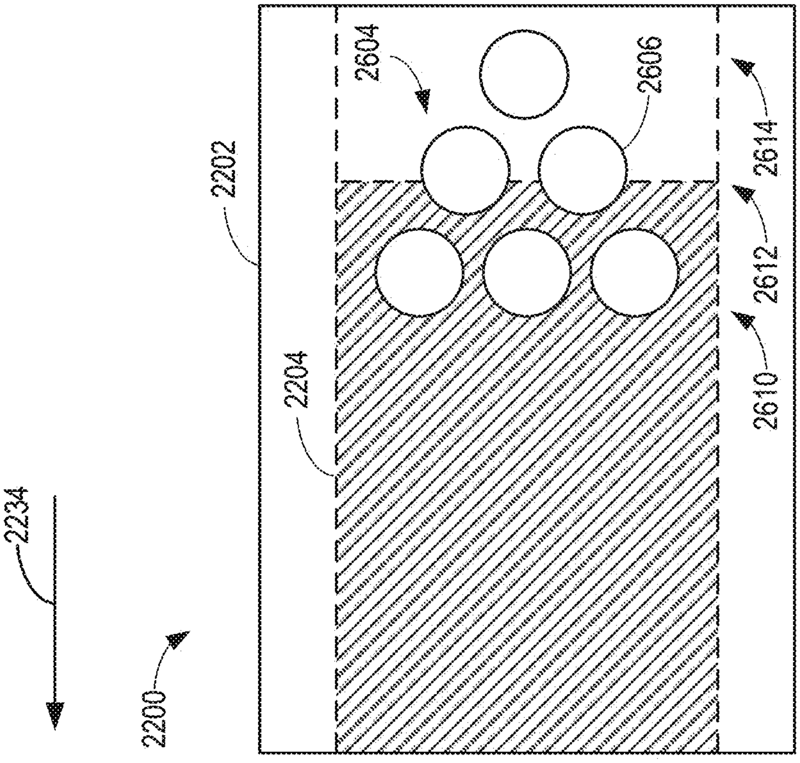
FIG. 26B is a top down view of a portion of the sixth valve of FIGS. 22, 24, and/or 25 including an array of ports.
Figure 26A:
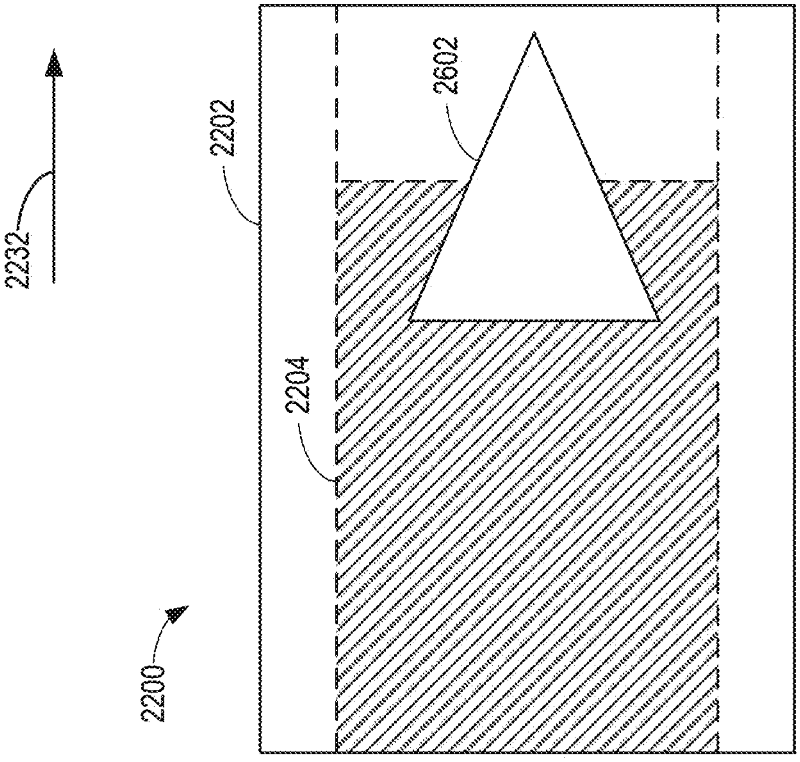
FIG. 26A is a top down view of a portion of the sixth valve of FIGS. 22, 24, and/or 25 including a triangular port.

In FIGS. 22, 24, and/or 25, the ports 2218, 2220, 2224, 2226 have a circular cross-sectional shape. In some examples, the cross-sectional shape of one or more of the ports 2218, 2220, 2224, 2226 may be different. For example, FIG. 26A is a top down view of a portion of the sixth valve 2200 of FIGS. 22, 24, and/or 25, where the sixth housing 2202 includes a triangular port (e.g., a triangular-shaped port) 2602. Additionally, FIG. 26B is a top down view of a portion of the sixth valve 2200 of FIGS. 22, 24, and/or 25, where the sixth housing 2202 includes an array 2604 of ports 2606. In some examples, the triangular port 2602 of FIG. 26A and/or the array 2604 of ports 2606 of FIG. 26B can be used for one(s) of the ports 2218, 2220, 2224, 2226 of FIGS. 22, 24, and/or 25.

In FIG. 26A, a width of the triangular port 2602 decreases along the first direction 2232 (e.g., increases along the second direction 2234). Similarly, in FIG. 26B, a width of the array 2604 decreases along the first direction 2232 (e.g., increases along the second direction 2234). For example, in FIG. 26B, the array 2604 includes three of the ports 2606 in a first column 2610 of the array 2604, two of the ports 2606 in a second column 2612 of the array 2604, and one of the ports 2606 in a third column 2614 of the array 2604, where the second column 2612 is offset from the first column 2610 in the first direction 2232, and the third column 2614 is offset from the second column 2612 in the first direction 2232. While the array 2604 of FIG. 26B includes six of the ports 2606, a different number of the ports 2606 may be used instead (e.g., ten, fifteen, etc.).

In some examples, when the sixth piston 2204 moves in the second direction 2234 in FIGS. 26A and/or 26B, the sixth piston 2204 gradually uncovers the triangular port 2602 and/or the array 2604 of ports 2606 to enable fluid flow therethrough. As such, an uncovered surface area of the triangular port 2602 and/or the array 2604 of ports 2606 gradually increases when the sixth piston 2204 moves in the second direction 2234. As a result, the fluid flow through the triangular port 2602 and/or the array 2604 of ports 2606 can gradually increase, which may reduce turbulence and/or other instabilities in the sixth valve 2200 (e.g., compared to when the fluid flow occurs suddenly and/or rapidly through the port(s) 2218, 2220, 2224, 2226 of FIGS. 22, 24, and/or 25).

Figure 27:
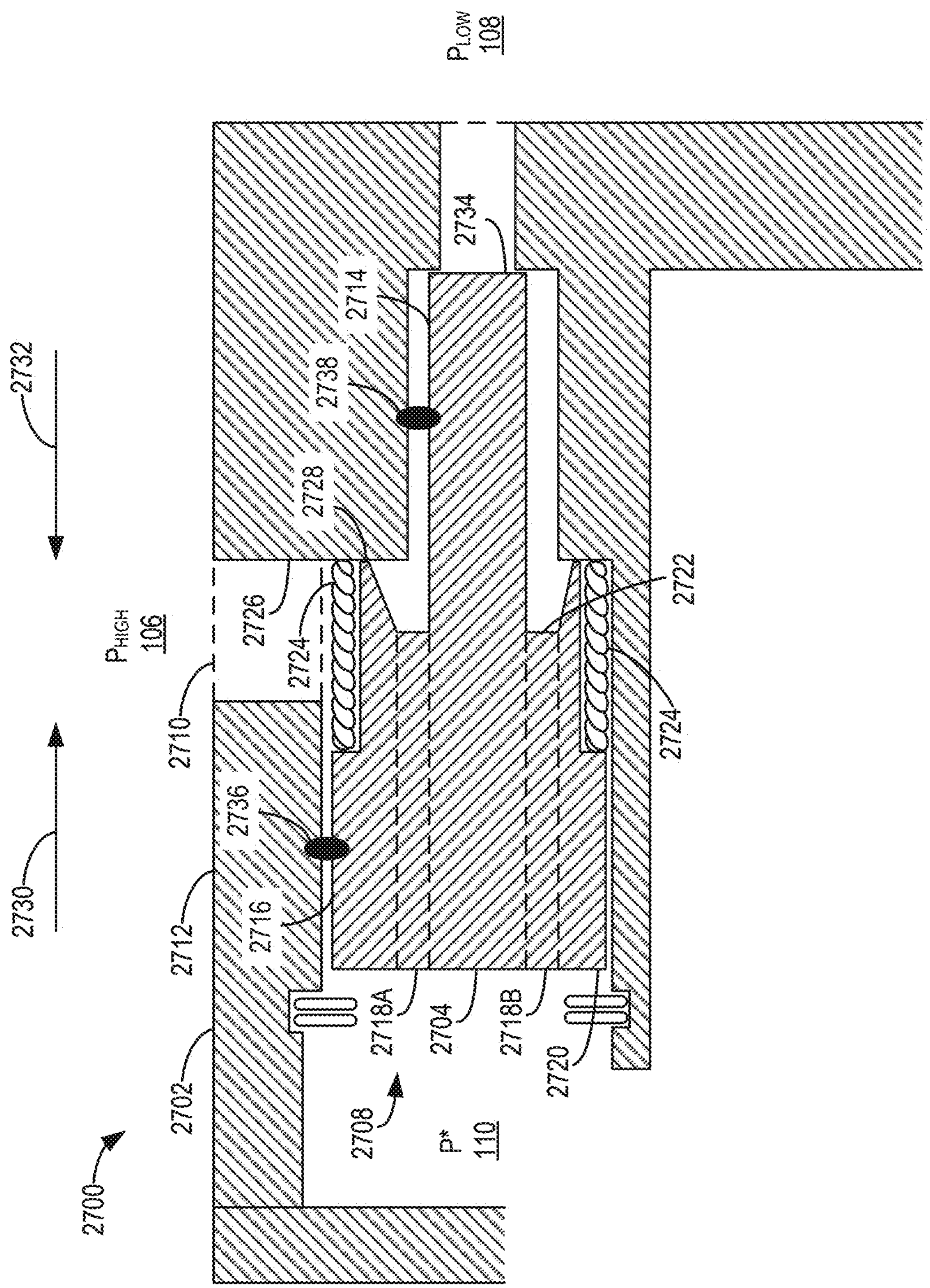
FIG. 27 is a cross-sectional view of a seventh example valve constructed in accordance with teachings of this disclosure.

FIG. 27 is a cross-sectional view of a seventh example valve (e.g., a seventh pressure regulation valve) 2700 constructed in accordance with teachings of this disclosure. The seventh valve 2700 of FIG. 27 can be used in addition to or instead of the first valve 100 of FIGS. 1, 2, and/or 3, the second valve 900 of FIGS. 9, 10, and/or 11, the third valve 1200 of FIGS. 12, 13, and/or 14, the fourth valve 1500 of FIGS. 15, 16, and/or 17, the fifth valve 1800 of FIGS. 18, 20, and/or 21, and/or the sixth valve 2200 of FIGS. 22, 24, and/or 25 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume 110. In FIG. 27, the seventh valve 2700 includes a seventh housing 2702, and a seventh piston (e.g., a stepped piston) 2704 positioned in and/or movable (e.g., slidable, translatable) within the seventh housing 2702.

In FIG. 27, the seventh piston 2704 is positioned in a channel 2708 defined in the seventh housing 2702. The seventh housing 2702 includes a port 2710 extending between the channel 2708 and an outer surface 2712 of the seventh housing 2702, where the port 2710 is fluidly coupled to the first variable-pressure location 106. In FIG. 27, the seventh piston 2704 includes an inner portion (e.g., an inner cylindrical portion) 2714 and an outer portion (e.g., an outer cylindrical portion) 2716 extending around the inner portion 2714. For example, the outer portion 2716 has a first diameter greater than a second diameter of the inner portion 2714. The seventh piston 2704 further includes through-holes 2718A, 2718B positioned between the inner and outer portions 2714, 2716 and extending between first and second surfaces 2720, 2722 of the seventh piston 2704. While two of the through-holes 2718A, 2718B are shown in FIG. 27, a different number (e.g., one, three or more) of through-holes can be used instead.

In FIG. 27, springs 2724 couple the outer portion 2716 of the seventh piston 2704 to an inner surface 2726 of the seventh housing 2702. The springs 2724 bias the seventh piston 2704 in a first direction 2730 (e.g., rightward in FIG. 27) to a first position (e.g., a neutral position) shown in FIG. 27. In some examples, the springs 2724 can bias the seventh piston 2704 in a second direction 2732 (e.g., leftward in FIG. 27) to a second position (e.g., shown in FIG. 28). In some examples, a third surface 2728 of the outer portion 2716 of the seventh piston 2704 contacts the inner surface 2726 when the seventh piston 2704 is in the first position of FIG. 27. When the seventh piston 2704 is in the first position of FIG. 27, the third surface 2728 contacts the inner surface 2726 to restrict and/or prevent fluid flow from the first variable-pressure location 106 to the control volume 110. Further, a fourth surface 2734 of the inner portion 2714 of the seventh piston 2704 contacts the seventh housing 2702 when the seventh piston 2704 is in the first position. As a result, fluid from the control volume 110 is restricted and/or prevented from flowing to the second variable-pressure location 108 when the seventh piston 2704 is in the first position. In FIG. 27, a first seal 2736 is coupled between the outer portion 2716 of the seventh piston 2704 and the seventh housing 2702, and a second seal 2738 is coupled between the inner portion 2714 of the seventh piston 2704 and the seventh housing 2702. In some examples, the first seal 2736 restricts and/or prevents leakage of first fluid from the first variable-pressure location 106 to the control volume 110, and the second seal 2738 restricts and/or prevents leakage of the first fluid from the first variable-pressure location 106 to the second variable-pressure location 108.

In FIG. 27, the first surface 2720 of the seventh piston 2704 is exposed to the third pressure from the control volume 110, and the fourth surface 2734 of the seventh piston 2704 is exposed to the second pressure from the second variable-pressure location 108. As a result, a first force (e.g., a first thrust force) is applied on the seventh piston 2704 in the first direction 2730 (e.g., rightward in FIG. 27), and a second force (e.g., a second thrust force) is applied on the seventh piston 2704 in the second direction 2732 (e.g., a second longitudinal direction, leftward in FIG. 27). The first force is based on the third pressure in the control volume 110 and a first surface area of the first surface 2720. Further, the second force is based on the second pressure from the second variable-pressure location 108 and a fourth surface area of the fourth surface 2734. The seventh piston 2704 is sized such that a thrust balance on the seventh piston 2704 is approximately zero (e.g., the first force in the first direction 2730 is substantially equal to the second force in the second direction 2732) when the pressure ratio between the first, second, and third pressures is substantially equal to the target pressure ratio (e.g., represented in example Equation 1 above).

In FIG. 27, the seventh piston 2704 is in the first position when the pressure ratio satisfies the target pressure ratio and a thrust force balance on the seventh piston 2704 (e.g., a net difference between the first force in the first direction 2730 and the second force in the second direction 2732) is substantially zero. The seventh piston 2704 can move from the first position of FIG. 27 when the third pressure in the control volume 110 increases or decreases (e.g., as a result of mass flow into and/or out of the control volume 110), resulting in a non-zero thrust force balance on the seventh piston 2704.

Figure 28:
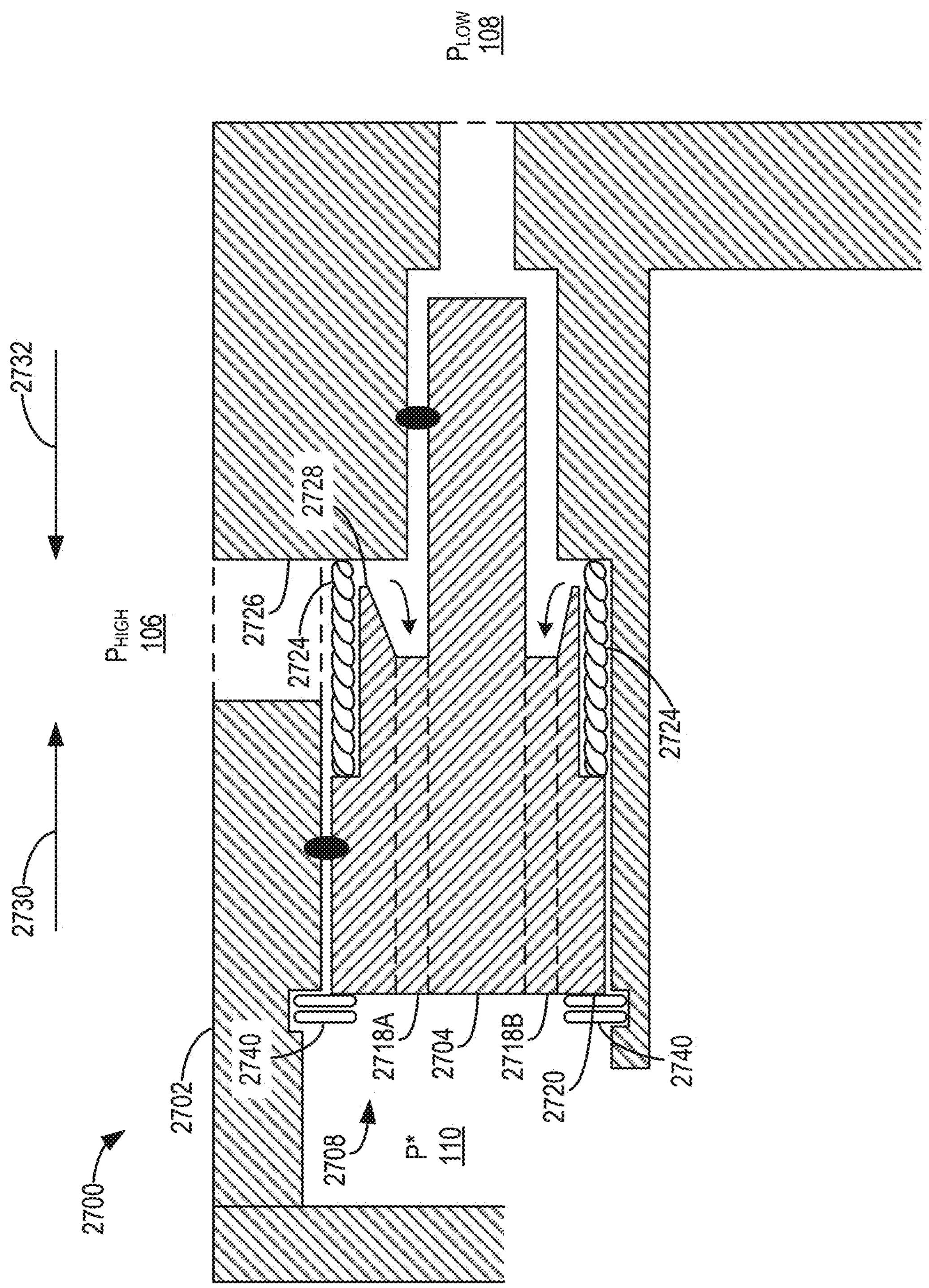
FIG. 28 illustrates the seventh example valve of FIG. 28 with a seventh piston in a pressure increase position.

FIG. 28 illustrates the seventh valve 2700 of FIG. 28 with the seventh piston 2704 in a second position (e.g., a pressure increase position). The seventh piston 2704 moves to the second position of FIG. 28 (e.g., from the first position of FIG. 27) when the third pressure in the control volume 110 decreases (e.g., such that the first thrust force on the seventh piston 2704 in the first direction 2730 is less than the second thrust force on the seventh piston 2704 in the second direction 2732), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio). When the seventh piston 2704 is in the second position of FIG. 28, the third surface 2728 of the seventh piston 2704 is spaced apart from the inner surface 2726 of the seventh housing 2702. As a result, first fluid from the first variable-pressure location 106 can flow to the control volume 110 via the through-holes 2718A, 2718B, such that the first fluid can increase the third pressure in the control volume 110. In FIG. 28, retaining rings 2740 are positioned in the seventh housing 2702. The retaining rings 2740 contact the first surface 2720 of the seventh piston 2704 to restrict and/or prevent further movement of the seventh piston 2704 in the second direction 2732. While the retaining rings 2740 are used in this example, one or more different devices (e.g., protruding surface(s) of the seventh housing 2702) may be used to retain the seventh piston 2704 in the channel 2708.

When the third pressure in the control volume 110 reaches (e.g., satisfies) a target pressure and/or target pressure ratio, a spring force of the springs 2724 pulls the seventh piston 2704 in the first direction 2730 to return the seventh piston 2704 to the first position of FIG. 27. In some examples, the seventh piston 2704 does not enable venting of the third fluid from the control volume 110 to the second variable-pressure location 108 in the first position. Instead, in some examples, the seventh housing 2702 may include one or more openings and/or one or more secondary valves (not shown) fluidly coupled between the control volume 110 and the second variable-pressure location 108 to enable venting of the third fluid from the control volume 110 (e.g., when the seventh piston 2704 is in the first position of FIG. 27).

Figure 29:
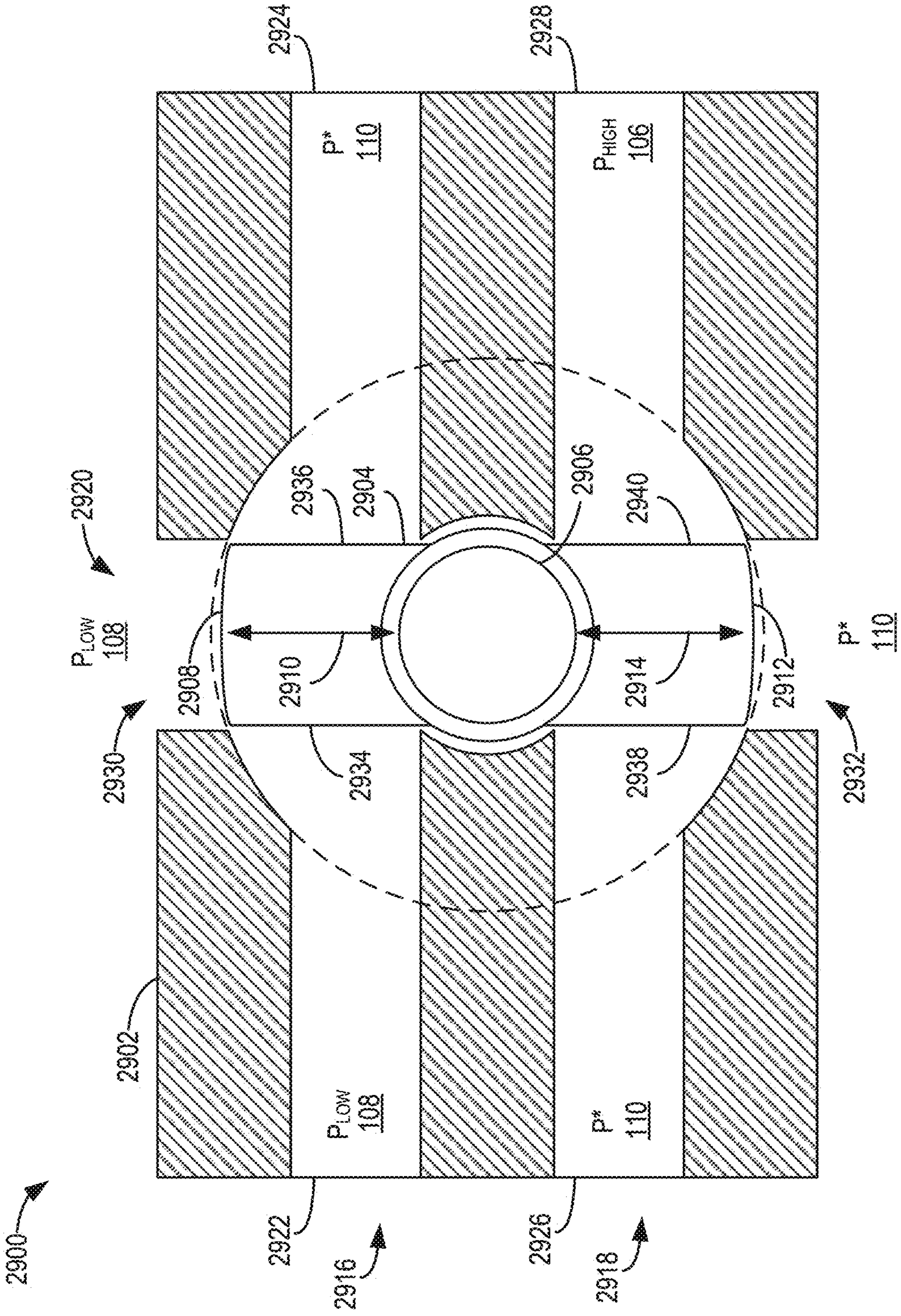
FIG. 29 is a cross-sectional view of an eighth example valve constructed in accordance with teachings of this disclosure.

FIG. 29 is a cross-sectional view of an eighth example valve (e.g., an eighth pressure regulation valve, a rotational valve) 2900 constructed in accordance with teachings of this disclosure. The eighth valve 2900 of FIG. 29 can be used in addition to or instead of the first valve 100 of FIGS. 1, 2, and/or 3, the second valve 900 of FIGS. 9, 10, and/or 11, the third valve 1200 of FIGS. 12, 13, and/or 14, the fourth valve 1500 of FIGS. 15, 16, and/or 17, the fifth valve 1800 of FIGS. 18, 20, and/or 21, the sixth valve 2200 of FIGS. 22, 24, and/or 25, and/or the seventh valve 2700 of FIGS. 27 and/or 28 to maintain a target pressure ratio (e.g., $P^*_{eta}$) between the first pressure (e.g., $P_{high}$) of the first variable-pressure location 106, the second pressure (e.g., $P_{low}$) of the second variable-pressure location 108, and the third pressure (e.g., P*) of the control volume 110. In FIG. 29, the eighth valve 2900 includes an eighth housing 2902, and a vane (e.g., a rotating vane) 2904 positioned in and/or movable (e.g., rotatable, pivotable) within the eighth housing 2902.

In FIG. 29, the vane 2904 is rotatable about a hub 2906, where a first vane portion 2908 of the vane 2904 extends a first length 2910 from the hub 2906, and a second vane portion 2912 of the vane 2904 extends a second length 2914 from the hub 2906. In some examples, the target pressure ratio can be adjusted by adjusting the first length 2910 of the first vane portion 2908 and/or the second length 2914 of the second vane portion 2912. In FIG. 29, the eighth valve 2900 includes a first channel 2916, a second channel 2918, and a third channel 2920 defined in the eighth housing 2902. A first end 2922 of the first channel 2916 is open to (e.g., is fluidly coupled to) the second variable-pressure location 108, a second end 2924 of the first channel 2916 is open to (e.g., is fluidly coupled to) the control volume 110, a third end 2926 of the second channel 2918 is open to (e.g., is fluidly coupled to) the control volume 110, a fourth end 2928 of the second channel 2918 is open to (e.g., is fluidly coupled to) the first variable-pressure location 106, a fifth end 2930 of the third channel 2920 is open to (e.g., is fluidly coupled to) the second variable-pressure location 108, and a sixth end 2932 of the third channel 2920 is open to (e.g., is fluidly coupled to) the control volume 110. In FIG. 29, the first and second channels 2916, 2918 are oriented along a first direction, and the third channel 2920 is oriented along a second direction different from (e.g., perpendicular to) the first direction, such that the third channel 2920 intersects the first and second channels 2916, 2918.

In FIG. 29, the first vane portion 2908 is positioned in the first channel 2916, and the second vane portion 2912 is positioned in the second channel 2918. A first surface 2934 of the first vane portion 2908 is exposed to the second pressure from the second variable-pressure location 108, and a second surface 2936 of the first vane portion 2908 (e.g., opposite the first surface 2934) is exposed to the third pressure from the control volume 110. Further, a third surface 2938 of the second vane portion 2912 is exposed to the third pressure from the control volume 110, and a fourth surface 2940 of the second vane portion 2912 is exposed to the first pressure from the first variable-pressure location 106. As a result, a first rotational force (e.g., a first trust force) is applied on the vane 2904 in a first rotational direction (e.g., clockwise in FIG. 29) about the hub 2906, and a second rotational force (e.g., a second thrust force) is applied on the vane 2904 in a second rotational direction (e.g., counterclockwise in FIG. 29) opposite the first rotational direction.

The first rotational force (e.g., in the clockwise direction of FIG. 29) is based on the second pressure (e.g., from the second variable-pressure location 108) and a first surface area of the first surface 2934, and is further based on the first pressure (e.g., from the first variable-pressure location 106) and a fourth surface area of the fourth surface 2940. Further, the second rotational force is based on the third pressure (e.g., from the control volume 110) and a second surface area of the second surface 2936, and is further based on the third pressure and a third surface area of the third surface 2938. In some examples, the vane 2904 is sized (e.g., the first and second lengths 2910, 2914 are selected) such that a thrust balance on the vane 2904 is approximately zero (e.g., the first rotational force in the clockwise direction of FIG. 29 is substantially equal to the second rotational force in the counterclockwise direction of FIG. 29) when the pressure ratio between the first, second, and third pressures is substantially equal to the target pressure ratio (e.g., represented in example Equation 1 above).

In FIG. 29, the vane 2904 is in a neutral position in which the pressure ratio satisfies the target pressure ratio and a thrust force balance on the vane 2904 (e.g., a net difference between the first rotational force in the clockwise direction of FIG. 29 and the second rotational force in the counterclockwise direction of FIG. 29) is substantially zero. When the vane 2904 is in the neutral position of FIG. 29, the vane 2904 is substantially aligned with the third channel 2920 (e.g., the vane 2904 is substantially perpendicular to the first and second channels 2916, 2918), such that the vane 2904 restricts and/or prevents fluid flow between the fifth and sixth ends 2930, 2932 of the third channel 2920. Further, the vane 2904 in the neutral position of FIG. 29 restricts and/or prevents fluid flow between the first and second ends 2922, 2924 of the first channel 2916 and/or between the first channel 2916 and the fifth end 2930 of the third channel 2920. Additionally, the vane 2904 in the neutral position of FIG. 29 restricts and/or prevents fluid flow between the third and fourth ends 2926, 2928 of the second channel 2918 and/or between the second channel 2918 and the sixth end 2932 of the third channel 2920. As a result, the vane 2904 restricts and/or prevents fluid flow between the first variable-pressure location 106, the second variable-pressure location 108, and the control volume 110 when the vane 2904 is in the neutral position of FIG. 29. In some examples, the vane 2904 can move from the neutral position of FIG. 29 when the third pressure in the control volume 110 increases or decreases (e.g., as a result of mass flow into and/or out of the control volume 110), resulting in a non-zero thrust force balance on the vane 2904.

Figure 30:
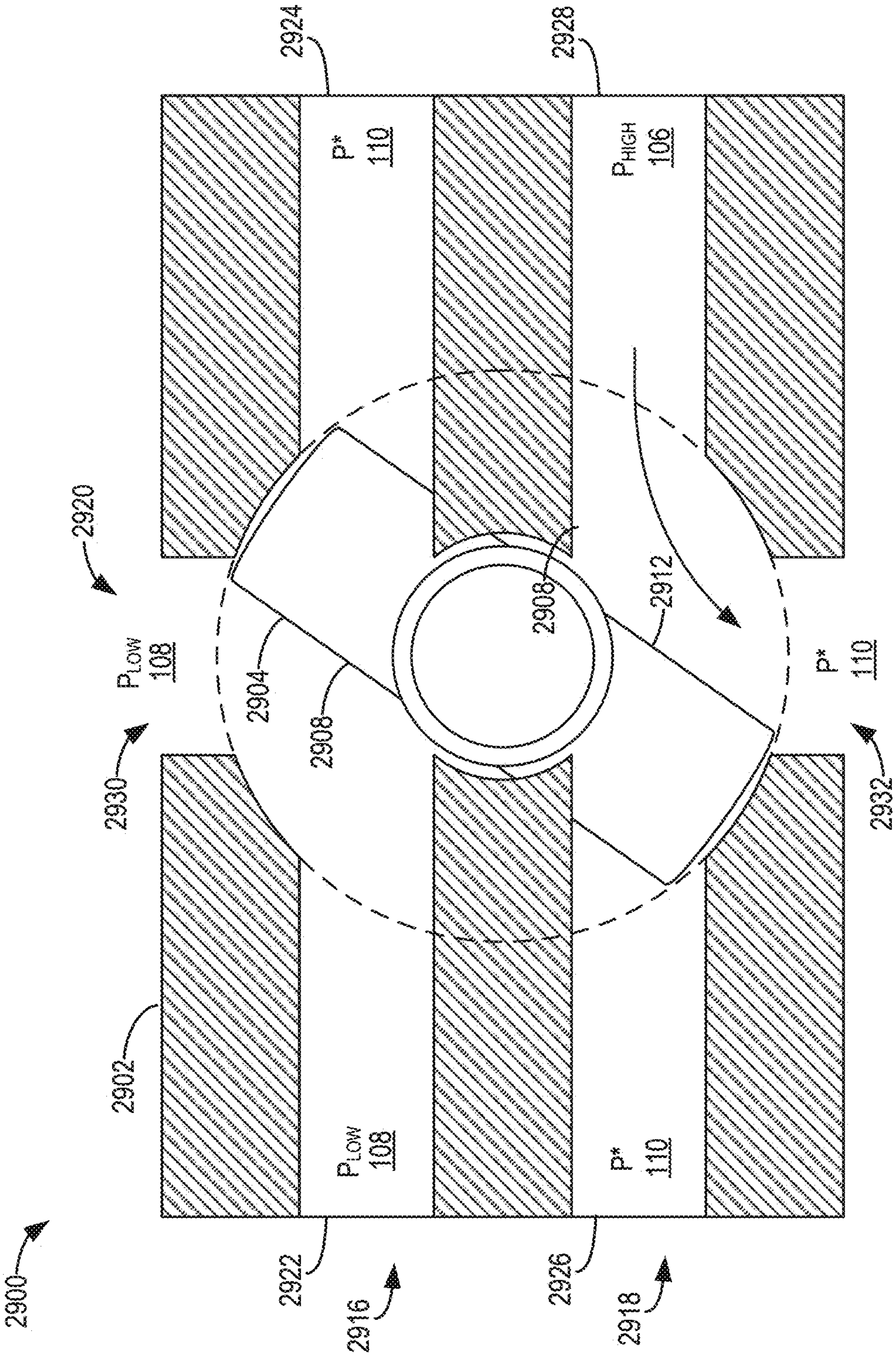
FIG. 30 illustrates the eighth valve of FIG. 29 with a vane in a pressure increase position.

FIG. 30 illustrates the eighth valve 2900 of FIG. 29 with the vane 2904 in a first position (e.g., a pressure increase position). In some examples, the vane 2904 moves (e.g., rotates) to the first position of FIG. 30 (e.g., from the neutral position of FIG. 29) when the third pressure in the control volume 110 decreases (e.g., such that the first rotational force on the vane 2904 in the clockwise direction of FIG. 30 is greater than the second rotational force on the vane 2904 in the counterclockwise direction of FIG. 30), and/or when a target pressure ratio between the first pressure of the first variable-pressure location 106, a second pressure of the second variable-pressure location 108, and the third pressure of the control volume 110 is not satisfied (e.g., an actual pressure ratio differs by a threshold amount from the target pressure ratio).

In FIG. 30, when the vane 2904 is in the first position, the first vane portion 2908 blocks and/or restricts fluid flow between the first and second ends 2922, 2924 of the first channel 2916 and/or between the second end 2924 of the first channel 2916 and the fifth end 2930 of the third channel 2920. Further, the second vane portion 2912 blocks and/or restricts fluid flow between the third and fourth ends 2926, 2928 of the second channel 2918 and/or between the third end 2926 of the second channel 2918 and the sixth end 2932 of the third channel 2920. In FIG. 30, the vane 2904 in the first position enables fluid flow between the first end 2922 of the first channel 2916 and the fifth end 2930 of the third channel 2920, and enables fluid flow between the fourth end 2928 of the second channel 2918 and the sixth end 2932 of the third channel 2920. As a result, first fluid from the first variable-pressure location 106 can flow to the control volume 110 (e.g., from the fourth end 2928 to the sixth end 2932) and, thus, can increase the third pressure in the control volume 110.

Figure 31:
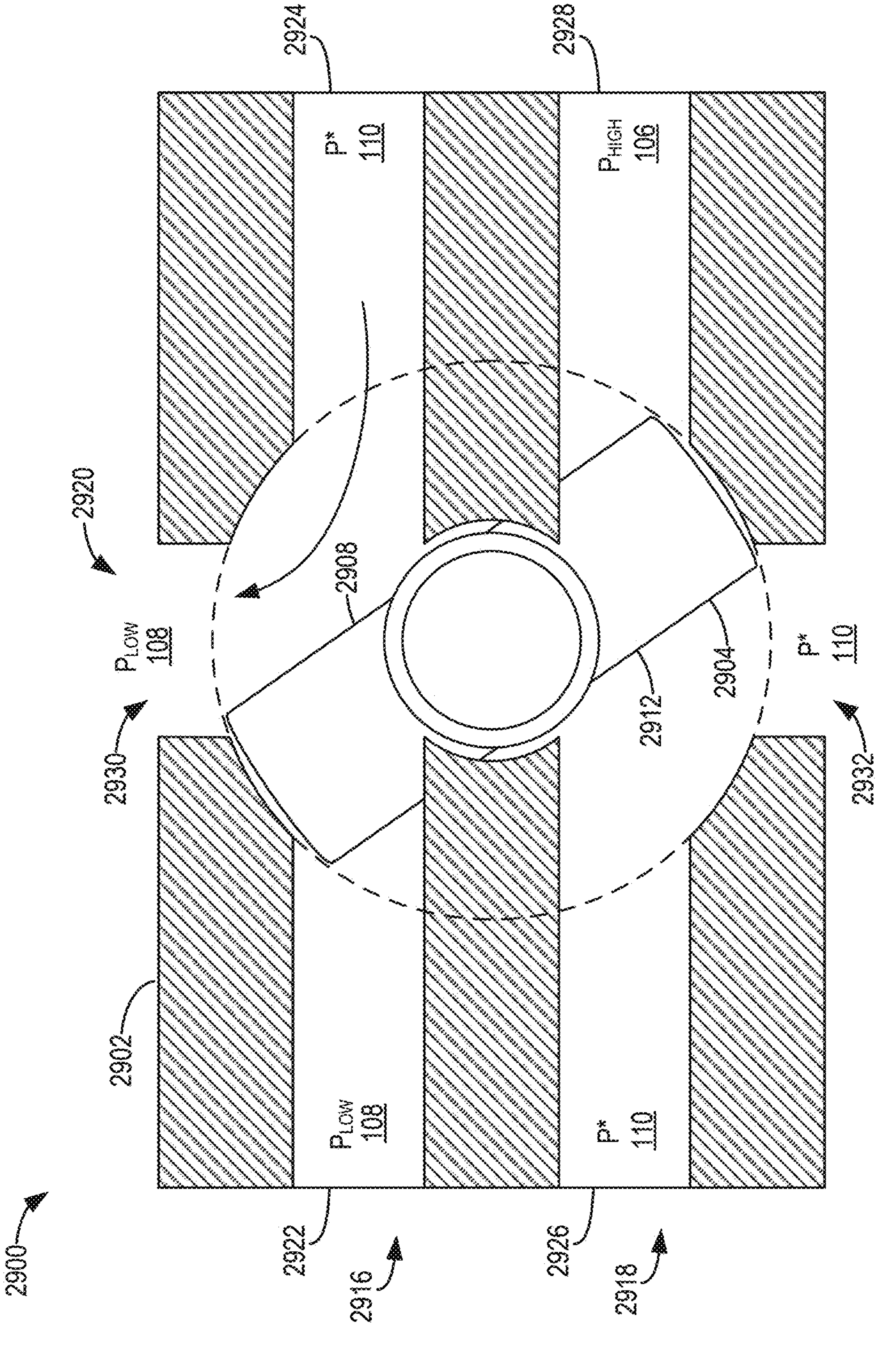
FIG. 31 illustrates the eighth valve of FIGS. 29 and/or 30 with the vane in a pressure relief position.

FIG. 31 illustrates the eighth valve 2900 of FIGS. 29 and/or 30 with the vane 2904 in a second position (e.g., a pressure relief position). In some examples, the vane 2904 moves (e.g., rotates) to the second position of FIG. 31 (e.g., from the neutral position of FIG. 29 and/or from the first position of FIG. 30) when the third pressure in the control volume 110 increases (e.g., such that the first rotational force on the vane 2904 in the clockwise direction of FIG. 31 is less than the second rotational force on the vane 2904 in the counterclockwise direction of FIG. 31), and/or when a target pressure ratio between the first pressure of the first variable-pressure location 106, a second pressure of the second variable-pressure location 108, and the third pressure of the control volume 110 is not satisfied (e.g., the pressure ratio differs by a threshold amount from the target pressure ratio).

In FIG. 31, when the vane 2904 is in the second position, the first vane portion 2908 blocks and/or restricts fluid flow between the first and second ends 2922, 2924 of the first channel 2916 and/or between the first end 2922 of the first channel 2916 and the fifth end 2930 of the third channel 2920. Further, the second vane portion 2912 blocks and/or restricts fluid flow between the third and fourth ends 2926, 2928 of the second channel 2918 and/or between the fourth end 2928 of the second channel 2918 and the sixth end 2932 of the third channel 2920. In FIG. 31, the vane 2904 in the second position enables fluid flow between the second end 2924 of the first channel 2916 and the fifth end 2930 of the third channel 2920, and enables fluid flow between the third end 2926 of the second channel 2918 and the sixth end 2932 of the third channel 2920. As a result, third fluid from the control volume 110 can flow to the first variable-pressure location 106 (e.g., from the second end 2924 to the fifth end 2930) and, thus, can reduce the third pressure in the control volume 110.

Figure 32:
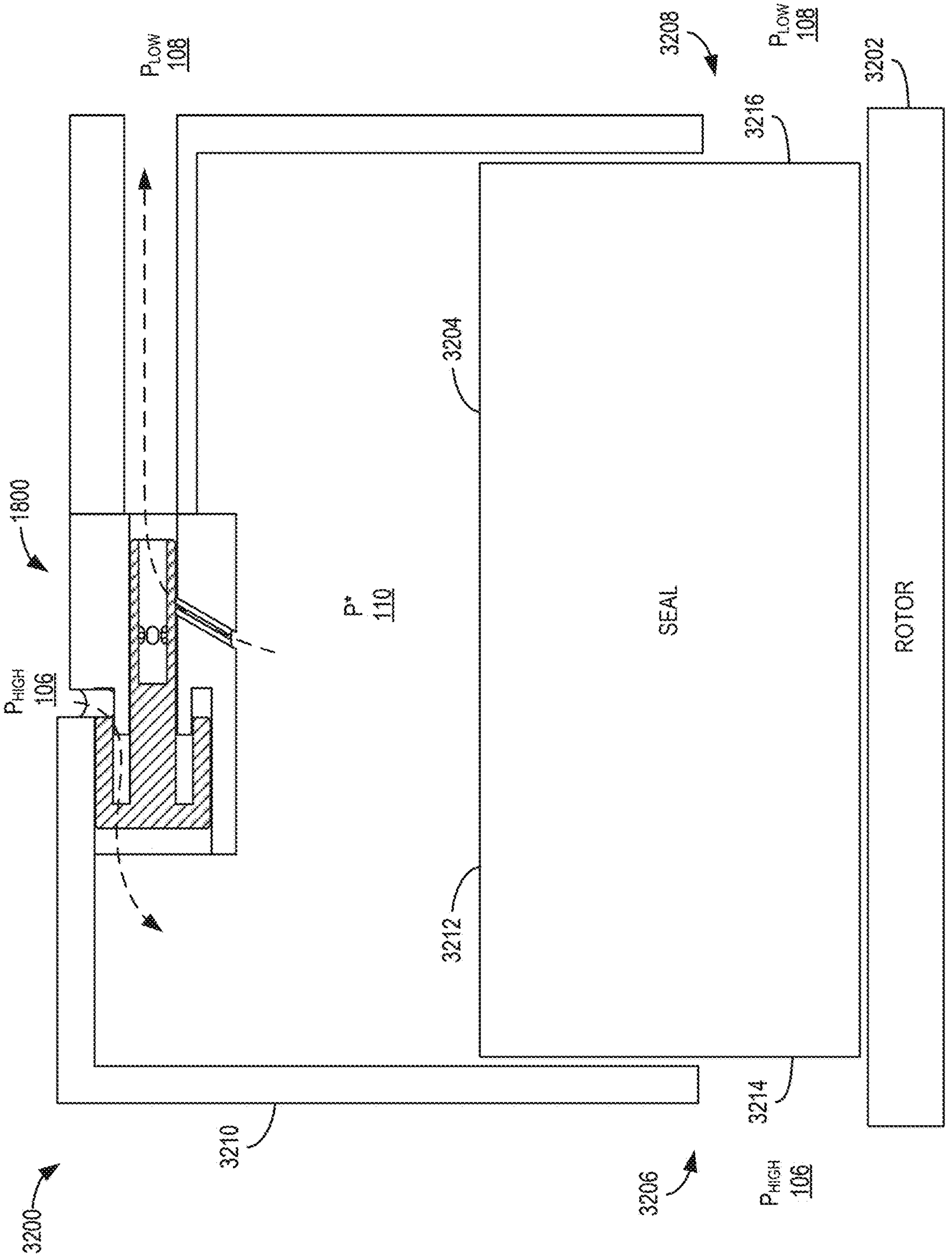
FIG. 32 illustrates an example system in which examples disclosed herein may be implemented.

FIG. 32 illustrates an example system (e.g., a seal system) 3200 in which examples disclosed herein may be implemented. In some examples, the system 3200 is implemented on a rotor 3202 of an example gas turbine engine. In the illustrated example of FIG. 32, the system 3200 includes a seal (e.g., a radial seal, a film-riding seal) 3204 operatively coupled to the rotor 3202 to restrict fluid flow between the first variable-pressure location 106 at a first side 3206 of the rotor 3202 and the second variable-pressure location 108 at a second side 3208 of the rotor 3202. In this example, the seal 3204 is positioned in a carrier 3210 defining the control volume 110. In FIG. 32, the fifth valve 1800 of FIGS. 18, 20, and/or 21 is positioned in the carrier 3210 and fluidly coupled between the first variable-pressure location 106, the second variable-pressure location 108, and the control volume 110. While the fifth valve 1800 is used in this example, any of the first valve 100 of FIGS. 1, 2, and/or 3, the second valve 900 of FIGS. 9, 10, and/or 11, the third valve 1200 of FIGS. 12, 13, and/or 14, the fourth valve 1500 of FIGS. 15, 16, and/or 17, the sixth valve 2200 of FIGS. 22, 24, and/or 25, the seventh valve 2700 of FIGS. 27 and/or 28, and/or the eighth valve 2900 of FIGS. 29, 30, and/or 31 may additionally or alternatively be used.

In FIG. 32, third pressure from the control volume 110 is applied on a first surface 3212 of the seal 3204 to maintain a target position of the seal 3204 relative to the rotor 3202. Additionally, first pressure from the first variable-pressure location 106 is applied on a second surface 3214 of the seal 3204, and second pressure from the second variable-pressure location 108 is applied on a third surface 3216 of the seal 3204. As a result of pressure variation(s) at the first variable-pressure location 106, the second variable-pressure location 108, and/or the control volume 110, a position of the seal 3204 with respect to the rotor 3202 may vary from the target position of the seal 3204. As a result of the pressure variation(s), the seal 3204 may move toward and/or away from the rotor 3202, and/or may rotate (e.g., clockwise and/or counterclockwise in FIG. 32) with respect to the rotor 3202. Movement of the seal 3204 away from the target position can reduce effectiveness of the seal 3204 in controlling fluid flow between the first and second sides 3206, 3208 of the rotor 3202.

In FIG. 32, the fifth valve 1800 can passively maintain a target pressure in the control volume 110 and/or a target pressure ratio between the first variable-pressure location 106, the second variable-pressure location 108, and the control volume 110. As a result, the fifth valve 1800 can facilitate maintaining the seal 3204 at or near the target position with respect to the rotor 3202 and, thus, can improve functioning of the seal 3204 in some examples.

In some examples, the housing 102 of FIGS. 1, 2, 3, and/or 5, the housing 702 of FIGS. 7, 8A, 8B, and/or 8C, the second housing 902 of FIGS. 9, 10, and/or 11, the third housing 1202 of FIGS. 12, 13, and/or 14, the fourth housing 1502 of FIGS. 15, 16, and/or 17, the fifth housing 1802 of FIGS. 18, 20, and/or 21, the sixth housing 2202 of FIGS. 22, 24, 25, 26A, and/or 26B, the seventh housing 2702 of FIGS. 27 and/or 28, and/or the eighth housing 2902 of FIGS. 29, 30, and/or 31 implement(s) means for receiving fluid. In some examples, the piston 104 of FIGS. 1, 2, 3, 4, 8A, 8B, and/or 8C, the second piston 904 of FIGS. 9, 10, and/or 11, the third piston 1204 of FIGS. 12, 13, and/or 14, the fourth piston 1504 of FIGS. 15, 16, and/or 17, the fifth piston 1804 of FIGS. 18, 19, 20, and/or 21, the sixth piston 2204 of FIGS. 22, 23, 24, 25, 26A, and/or 26B, the seventh piston 2704 of FIGS. 27 and/or 28, and/or the vane 2904 of FIGS. 29, 30, and/or 31 implement(s) means for controlling fluid flow.

From the foregoing, it will be appreciated that example systems, apparatus, articles of manufacture, and methods have been disclosed that enable passive pressure regulation in an example system (e.g., a gas turbine engine). Example pressure regulation valves disclosed herein include a housing and a flow control member (e.g., a piston, a vane, etc.) positioned in and/or movable (e.g., translatable, rotatable, etc.) within the housing. The control flow member can move within the housing based on a pressure ratio between two or more locations (e.g., a first variable-pressure location, a second variable-pressure location, and/or a control volume) to control fluid flow to and/or from the location(s) and, as a result, to maintain and/or return the pressure ratio to a target pressure ratio. Advantageously, examples disclosed herein can passively (e.g., without external control device(s) and/or control signal(s)) regulate the pressure ratio between the two or more locations and, therefore, can reduce part costs and/or complexity associated with system(s) (e.g., a seal and rotor of the gas turbine engine) that necessitate a constant and/or near constant pressure ratio. Disclosed systems, apparatus, articles of manufacture, and methods are accordingly directed to one or more improvement(s) in the operation of a machine or other electronic and/or mechanical device.

Pressure regulation valves are disclosed herein. Further aspects of the present disclosure are provided by the subject matter of the following clauses.

A pressure regulation valve comprising a valve housing, and a control body positioned in the valve housing, the control body movable between a first position and a second position based on (a) a first pressure differential between a first variable-pressure location and a second variable-pressure location and (b) a second pressure differential between the second variable-pressure location and a control volume of the valve housing, the control body in the first position to fluidly couple the first variable-pressure location to the control volume, the control body in the second position to restrict fluid flow between the first variable-pressure location and the control volume.

The pressure regulation valve according to the preceding clause, wherein the control body is movable to a third position between the first and second positions, the control body in the third position to restrict fluid flow between the first variable-pressure location and the control volume and between the second variable-pressure location and the control volume.

The pressure regulation valve according to any preceding clause, wherein the control body in the first position restricts fluid flow between the second variable-pressure location and the control volume, and the control body in the second position fluidly couples the second variable-pressure location to the control volume.

The pressure regulation valve according to any preceding clause, wherein the control body includes a first groove and a second groove, the first groove extending along a first circumference of the control body, the second groove extending along a second circumference of the control body, wherein the first groove fluidly couples first and second openings of the valve housing when the control body is in the first position, the first opening fluidly coupled to the first variable-pressure location, the second opening fluidly coupled to the control volume, wherein the second groove fluidly couples third and fourth openings of the valve housing when the control body is in the second position, the third opening fluidly coupled to the second variable-pressure location, the fourth opening fluidly coupled to the control volume.

The pressure regulation valve according to any preceding clause, wherein at least one of the first opening, the second opening, the third opening, or the fourth opening has a triangular cross-sectional shape.

The pressure regulation valve according to any preceding clause, wherein at least one of the first opening, the second opening, the third opening, or the fourth opening includes an array of ports, a width of the array decreasing in a longitudinal direction of the control body.

The pressure regulation valve according to any preceding clause, further including a sleeve surrounding the control body, the sleeve including a first port and a second port, the first port fluidly coupled to one of the first variable-pressure location or the second variable-pressure location, the second port fluidly coupled to the first port via a third groove in a surface of the sleeve, the first and second ports exposing first and second locations on the control body to a first pressure from the one of the first variable-pressure location or the second variable-pressure location.

The pressure regulation valve according to any preceding clause, wherein the first and second ports are diametrically opposed along a third circumference of the sleeve.

The pressure regulation valve according to any preceding clause, wherein the sleeve includes third and fourth ports offset from the first and second ports, the third and fourth ports exposing the control body to a second pressure from the control volume.

The pressure regulation valve according to any preceding clause, wherein a first pressure of the first variable-pressure location is greater than a second pressure of the second variable-pressure location, the first pressure is applied on a first surface of the control body, the second pressure is applied on a second surface of the control body, a third pressure of the control volume is applied on a third surface of the control body, a first area of the first surface and a second area of the second surface are less than a third area of the third surface.

The pressure regulation valve according to any preceding clause, wherein the control body includes a first cylindrical section and a second cylindrical section, a first diameter of the first cylindrical section greater than a second diameter of the second cylindrical section, and an aperture defined in a first surface of the first cylindrical section.

The pressure regulation valve according to any preceding clause, wherein the first cylindrical section includes at least one hole extending between the aperture and a second surface of the first cylindrical section, the second surface opposite the first surface.

The pressure regulation valve according to any preceding clause, wherein the at least one hole fluidly couples the aperture to a vent line, the vent line fluidly coupled to the second variable-pressure location.

The pressure regulation valve according to any preceding clause, wherein the control body is rotatable between the first position and the second position, the valve housing including a first channel extending in a first direction between the second variable-pressure location and the control volume, wherein a first portion of the control body is positioned in the first channel, a second channel extending in the first direction between the first variable-pressure location and the control volume, wherein a second portion of the control body is positioned in the second channel, and a third channel extending in a second direction between the second variable-pressure location and the control volume, wherein the second direction is different from the first direction, and wherein the third channel intersects the first and second channels.

The pressure regulation valve according to any preceding clause, further including at least one spring operatively coupled between the control body and the valve housing, wherein the at least one spring is configured to bias the control body to one of the first position or the second position.

The pressure regulation valve according to any preceding clause, further including at least one retaining ring positioned in the valve housing, wherein the at least one retaining ring restricts movement of the control body.

The pressure regulation valve of any preceding clause, wherein the control body includes an inner cylindrical portion, an outer cylindrical portion extending from the inner cylindrical portion at a first end of the control body, and a supply hole positioned between the inner and outer cylindrical portions, wherein the supply hole fluidly couples the first variable-pressure location to the control volume when the control body is in the first position.

The pressure regulation valve according to any preceding clause, wherein the control body includes an aperture extending into the inner cylindrical portion at a second end of the control body, the second end opposite the first end, and a vent hole extending radially from the aperture and an outer surface of the inner cylindrical portion, wherein the vent hole fluidly couples the second variable-pressure location to the control volume when the control body is in the second position.

The pressure regulation valve according to any preceding clause, wherein the valve housing is positioned in a carrier of a seal of a gas turbine engine.

The pressure regulation valve according to any preceding clause, wherein the control body is at least one of slidable or rotatable between the first position and the second position.

A pressure regulation valve comprising means for receiving fluid, and means for controlling fluid flow positioned in the means for receiving fluid, the means for controlling fluid flow movable between a first position and a second position based on (a) a first pressure differential between a first variable-pressure location and a second variable-pressure location and (b) a second pressure differential between the second variable-pressure location and a control volume of the means for receiving fluid, the means for controlling fluid flow in the first position to fluidly couple the first variable-pressure location to the control volume, the means for controlling fluid flow in the second position to restrict fluid flow between the first variable-pressure location and the control volume.

The pressure regulation valve according to the preceding clause, wherein the means for controlling fluid flow is movable to a third position between the first and second positions, the means for controlling fluid flow in the third position to restrict fluid flow between the first variable-pressure location and the control volume and between the second variable-pressure location and the control volume.

The pressure regulation valve according to any preceding clause, wherein the means for controlling fluid flow in the first position restricts fluid flow between the second variable-pressure location and the control volume, and the means for controlling fluid flow in the second position fluidly couples the second variable-pressure location to the control volume.

The pressure regulation valve according to any preceding clause, wherein the means for controlling fluid flow includes a first groove and a second groove, the first groove extending along a first circumference of the means for controlling fluid flow, the second groove extending along a second circumference of the means for controlling fluid flow, wherein the first groove fluidly couples first and second openings of the means for receiving fluid when the means for controlling fluid flow is in the first position, the first opening fluidly coupled to the first variable-pressure location, the second opening fluidly coupled to the control volume, wherein the second groove fluidly couples third and fourth openings of the means for receiving fluid when the means for controlling fluid flow is in the second position, the third opening fluidly coupled to the second variable-pressure location, the fourth opening fluidly coupled to the control volume.

The pressure regulation valve according to any preceding clause, wherein at least one of the first opening, the second opening, the third opening, or the fourth opening has a triangular cross-sectional shape.

The pressure regulation valve according to any preceding clause, wherein at least one of the first opening, the second opening, the third opening, or the fourth opening includes an array of ports, a width of the array decreasing in a longitudinal direction of the means for controlling fluid flow.

The pressure regulation valve according to any preceding clause, further including a sleeve surrounding the means for controlling fluid flow, the sleeve including a first port and a second port, the first port fluidly coupled to one of the first variable-pressure location or the second variable-pressure location, the second port fluidly coupled to the first port via a third groove in a surface of the sleeve, the first and second ports exposing first and second locations on the means for controlling fluid flow to a first pressure from the one of the first variable-pressure location or the second variable-pressure location.

The pressure regulation valve according to any preceding clause, wherein the first and second ports are diametrically opposed along a third circumference of the sleeve.

The pressure regulation valve according to any preceding clause, wherein the sleeve includes third and fourth ports offset from the first and second ports, the third and fourth ports exposing the means for controlling fluid flow to a second pressure from the control volume.

The pressure regulation valve according to any preceding clause, wherein a first pressure of the first variable-pressure location is greater than a second pressure of the second variable-pressure location, the first pressure is applied on a first surface of the means for controlling fluid flow, the second pressure is applied on a second surface of the means for controlling fluid flow, a third pressure of the control volume is applied on a third surface of the means for controlling fluid flow, a first area of the first surface and a second area of the second surface are less than a third area of the third surface.

The pressure regulation valve according to any preceding clause, wherein the means for controlling fluid flow includes a first cylindrical section and a second cylindrical section, a first diameter of the first cylindrical section greater than a second diameter of the second cylindrical section, and an aperture defined in a first surface of the first cylindrical section.

The pressure regulation valve according to any preceding clause, wherein the first cylindrical section includes at least one hole extending between the aperture and a second surface of the first cylindrical section, the second surface opposite the first surface.

The pressure regulation valve according to any preceding clause, wherein the at least one hole fluidly couples the aperture to a vent line, the vent line fluidly coupled to the second variable-pressure location.

The pressure regulation valve according to any preceding clause, wherein the means for controlling fluid flow is rotatable between the first position and the second position, the means for receiving fluid including a first channel extending in a first direction between the second variable-pressure location and the control volume, wherein a first portion of the means for controlling fluid flow is positioned in the first channel, a second channel extending in the first direction between the first variable-pressure location and the control volume, wherein a second portion of the means for controlling fluid flow is positioned in the second channel, and a third channel extending in a second direction between the second variable-pressure location and the control volume, wherein the second direction is different from the first direction, and wherein the third channel intersects the first and second channels.

The pressure regulation valve according to any preceding clause, further including at least one spring operatively coupled between the means for controlling fluid flow and the means for receiving fluid, wherein the at least one spring is configured to bias the means for controlling fluid flow to one of the first position or the second position.

The pressure regulation valve according to any preceding clause, further including at least one retaining ring positioned in the means for receiving fluid, wherein the at least one retaining ring restricts movement of the means for controlling fluid flow.

The pressure regulation valve of any preceding clause, wherein the means for controlling fluid flow includes an inner cylindrical portion, an outer cylindrical portion extending from the inner cylindrical portion at a first end of the means for controlling fluid flow, and a supply hole positioned between the inner and outer cylindrical portions, wherein the supply hole fluidly couples the first variable-pressure location to the control volume when the means for controlling fluid flow is in the first position.

The pressure regulation valve according to any preceding clause, wherein the means for controlling fluid flow includes an aperture extending into the inner cylindrical portion at a second end of the means for controlling fluid flow, the second end opposite the first end, and a vent hole extending radially from the aperture and an outer surface of the inner cylindrical portion, wherein the vent hole fluidly couples the second variable-pressure location to the control volume when the means for controlling fluid flow is in the second position.

The pressure regulation valve according to any preceding clause, wherein the means for receiving fluid is positioned in a carrier of a seal of a gas turbine engine.

The pressure regulation valve according to any preceding clause, wherein the means for controlling fluid flow is at least one of slidable or rotatable between the first position and the second position.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A pressure regulation valve comprising:
- a valve housing; and
- a control body positioned in the valve housing,
- the control body movable between a first position and a second position based on (a) a first pressure differential between a first variable-pressure location and a second variable-pressure location and (b) a second pressure differential between the second variable-pressure location and a control volume of the valve housing,
- the control body in the first position to fluidly couple the first variable-pressure location to the control volume and restrict fluid flow between the second variable-pressure location and the control volume,
- the control body in the second position to restrict fluid flow between the first variable-pressure location and the control volume and fluidly couple the second variable-pressure location to the control volume.

2. The pressure regulation valve of claim 1, wherein the control body is movable to a third position between the first and second positions, the control body in the third position to restrict fluid flow between the first variable-pressure location and the control volume and between the second variable-pressure location and the control volume.

3. The pressure regulation valve of claim 1, wherein the control body is at least one of slidable or rotatable between the first position and the second position.

4. The pressure regulation valve of claim 1, wherein the control body includes a first groove and a second groove, the first groove extending along a first circumference of the control body, the second groove extending along a second circumference of the control body,
- wherein the first groove fluidly couples first and second openings of the valve housing when the control body is in the first position, the first opening fluidly coupled to the first variable-pressure location, the second opening fluidly coupled to the control volume,
- wherein the second groove fluidly couples third and fourth openings of the valve housing when the control body is in the second position, the third opening fluidly coupled to the second variable-pressure location, the fourth opening fluidly coupled to the control volume.

5. The pressure regulation valve of claim 4, wherein at least one of the first opening, the second opening, the third opening, or the fourth opening has a triangular cross-sectional shape.

6. The pressure regulation valve of claim 4, wherein at least one of the first opening, the second opening, the third opening, or the fourth opening includes an array of ports, a width of the array decreasing in a longitudinal direction of the control body.

7. The pressure regulation valve of claim 4, further including a sleeve surrounding the control body, the sleeve including a first port and a second port, the first port fluidly coupled to one of the first variable-pressure location or the second variable-pressure location, the second port fluidly coupled to the first port via a third groove in a surface of the sleeve, the first and second ports exposing first and second locations on the control body to a first pressure from the one of the first variable-pressure location or the second variable-pressure location.

8. The pressure regulation valve of claim 7, wherein the first and second ports are diametrically opposed along a third circumference of the sleeve.

9. The pressure regulation valve of claim 7, wherein the sleeve includes third and fourth ports offset from the first and second ports, the third and fourth ports exposing the control body to a second pressure from the control volume.

10. The pressure regulation valve of claim 1, wherein a first pressure of the first variable-pressure location is greater than a second pressure of the second variable-pressure location, the first pressure is applied on a first surface of the control body, the second pressure is applied on a second surface of the control body, a third pressure of the control volume is applied on a third surface of the control body, a first area of the first surface and a second area of the second surface are less than a third area of the third surface.

11. The pressure regulation valve of claim 1, wherein the control body includes:
- a first cylindrical section and a second cylindrical section, a first diameter of the first cylindrical section greater than a second diameter of the second cylindrical section; and
- an aperture defined in a first surface of the first cylindrical section.

12. The pressure regulation valve of claim 11, wherein the first cylindrical section includes at least one hole extending between the aperture and a second surface of the first cylindrical section, the second surface opposite the first surface.

13. The pressure regulation valve of claim 12, wherein the at least one hole fluidly couples the aperture to a vent line, the vent line fluidly coupled to the second variable-pressure location.

14. The pressure regulation valve of claim 1, wherein the control body is rotatable between the first position and the second position, the valve housing including:

a first channel extending in a first direction between the second variable-pressure location and the control volume, wherein a first portion of the control body is positioned in the first channel;

a second channel extending in the first direction between the first variable-pressure location and the control volume, wherein a second portion of the control body is positioned in the second channel; and a third channel extending in a second direction between the second variable-pressure location and the control volume, wherein the second direction is different from the first direction, and wherein the third channel intersects the first and second channels.

15. The pressure regulation valve of claim 1, further including at least one spring operatively coupled between the control body and the valve housing, wherein the at least one spring is configured to bias the control body to one of the first position or the second position.

16. The pressure regulation valve of claim 1, further including at least one retaining ring positioned in the valve housing, wherein the at least one retaining ring restricts movement of the control body.

17. The pressure regulation valve of claim 1, wherein the control body includes:

an inner cylindrical portion;

an outer cylindrical portion extending from the inner cylindrical portion at a first end of the control body; and a supply hole positioned between the inner and outer cylindrical portions, wherein the supply hole fluidly couples the first variable-pressure location to the control volume when the control body is in the first position.

18. The pressure regulation valve of claim 17, wherein the control body includes:

an aperture extending into the inner cylindrical portion at a second end of the control body, the second end opposite the first end; and a vent hole extending radially from the aperture and an outer surface of the inner cylindrical portion, wherein the vent hole fluidly couples the second variable-pressure location to the control volume when the control body is in the second position.

19. A pressure regulation valve comprising:

a valve housing positioned in a carrier of a seal of a gas turbine engine; and a control body positioned in the valve housing, the control body movable between a first position and a second position based on (a) a first pressure differential between a first variable-pressure location and a second variable-pressure location and (b) a second pressure differential between the second variable-pressure location and a control volume of the valve housing, the control body in the first position to fluidly couple the first variable-pressure location to the control volume, the control body in the second position to restrict fluid flow between the first variable-pressure location and the control volume.

* * * * *